(12) United States Patent
Border et al.

(10) Patent No.: US 7,596,802 B2
(45) Date of Patent: Sep. 29, 2009

(54) METHOD AND SYSTEM FOR PROVIDING CONNECTION HANDLING

(75) Inventors: John Border, Poolesville, MD (US); Douglas Dillon, Gaithersburg, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 1358 days.

(21) Appl. No.: 09/905,215

(22) Filed: Jul. 13, 2001

(65) Prior Publication Data

US 2002/0071436 A1 Jun. 13, 2002

Related U.S. Application Data

(60) Provisional application No. 60/225,630, filed on Aug. 15, 2000, provisional application No. 60/220,026, filed on Jul. 21, 2000.

(51) Int. Cl.
*H04L 9/00* (2006.01)
(52) U.S. Cl. .................. 726/1; 709/228; 709/238
(58) Field of Classification Search .................. 713/201
See application file for complete search history.

(56) References Cited

U.S. PATENT DOCUMENTS

| | | | | |
|---|---|---|---|---|
| 5,577,105 | A * | 11/1996 | Baum et al. | 379/93.05 |
| 6,327,626 | B1 * | 12/2001 | Schroeder et al. | 709/236 |
| 6,598,034 | B1 * | 7/2003 | Kloth | 706/47 |
| 6,823,387 | B1 * | 11/2004 | Srinivas | 709/227 |
| 2002/0099854 | A1 * | 7/2002 | Jorgensen | 709/249 |

FOREIGN PATENT DOCUMENTS

| | | |
|---|---|---|
| EP | 0903 905 A2 | 9/1998 |
| WO | WO 01/65805 A2 | 9/2001 |

OTHER PUBLICATIONS

J. S. Baras, S. Corson, S. Papademetriou, I. Secka, and N. Suphasindhu, Center for Satellite and Hybrid Communication Networks, Institute for Systems Research, University of Maryland at College Park, "Fast Asymmetric Internet Over Wireless Satellite-Terrestrial Networks", XP-000799704, pp. 372-377.
R. Braden, D. Clark, S. Shenker, Network Working Group, Request for Comments: 1633, Category: Informational, "Integrated Services In The Internet Architecture: an Overview", XP-002105144, pp. 1-33.

* cited by examiner

*Primary Examiner*—Nasser Moazzami
*Assistant Examiner*—Brandon S Hoffman
(74) *Attorney, Agent, or Firm*—Bell, Boyd & Lloyd LLP

(57) ABSTRACT

A communication system having a proxy architecture is disclosed. The system includes a platform that provides performance enhancing functions. The platform includes a spoofing apparatus that routes the information within the communication system. The spoofing apparatus receives spoofing selection and spoofing parameters from the platform and maintains the current parameters in one or more spoofing profiles. The spoofing apparatus routes packets of information throughout the communication system based on the spoofing selection and/or spoofing profile. The spoofing apparatus may also compensate for maximum segment size mismatches during the routing of information. This compensation may include dynamically resizing data segments or disabling three-way handshake spoofing. The above arrangement has particular applicability to a bandwidth constrained communication system, such as a satellite network.

44 Claims, 41 Drawing Sheets

A - Local IP Packets
B - Local TCP Segments
C - Non-spoofed TCP Segments
D - Spoofed TCP Data
E - PBP Segments
F - WAN IP Packets ⟨P⟩ - Prioritization Point

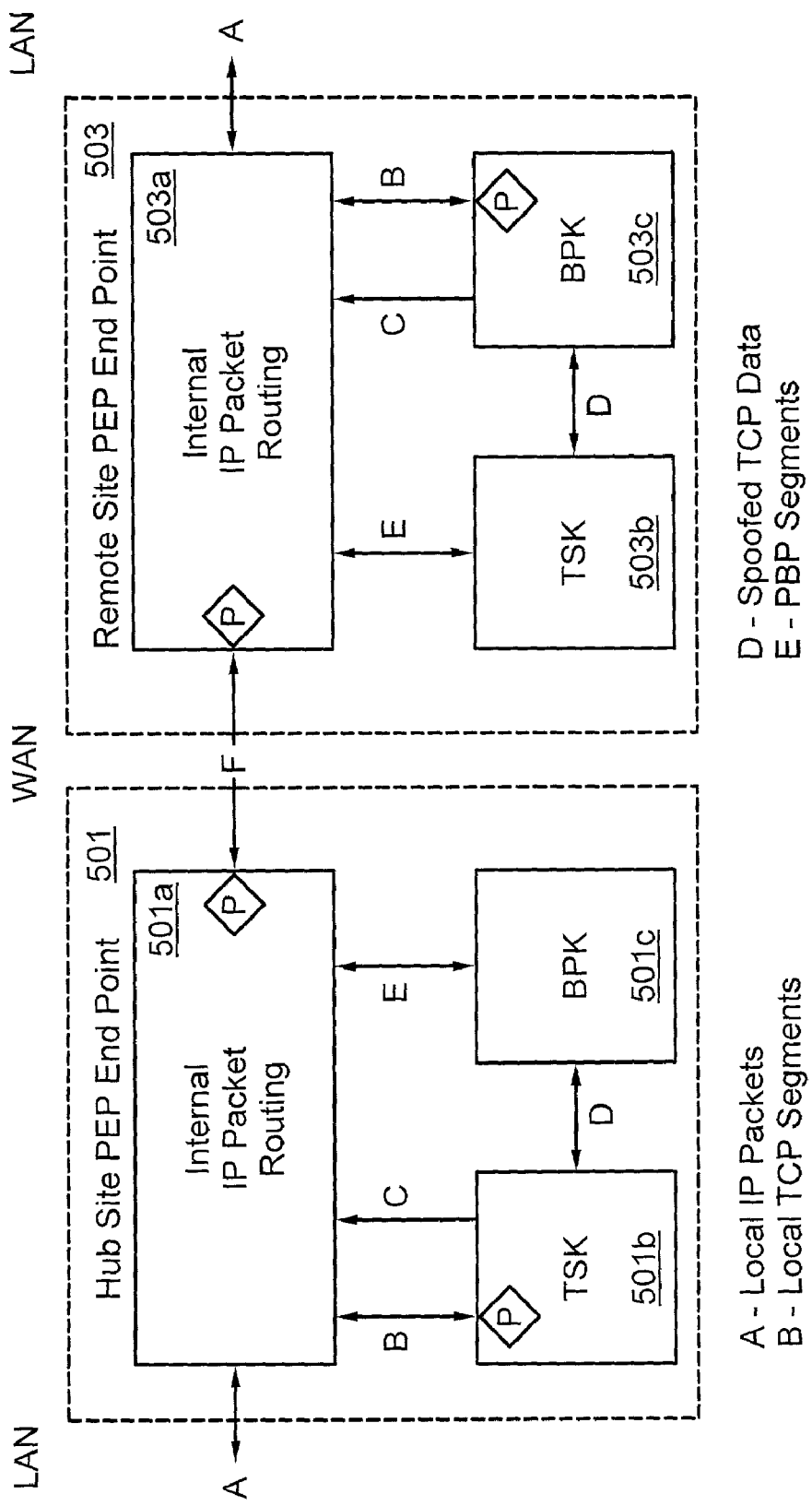

FIG. 21

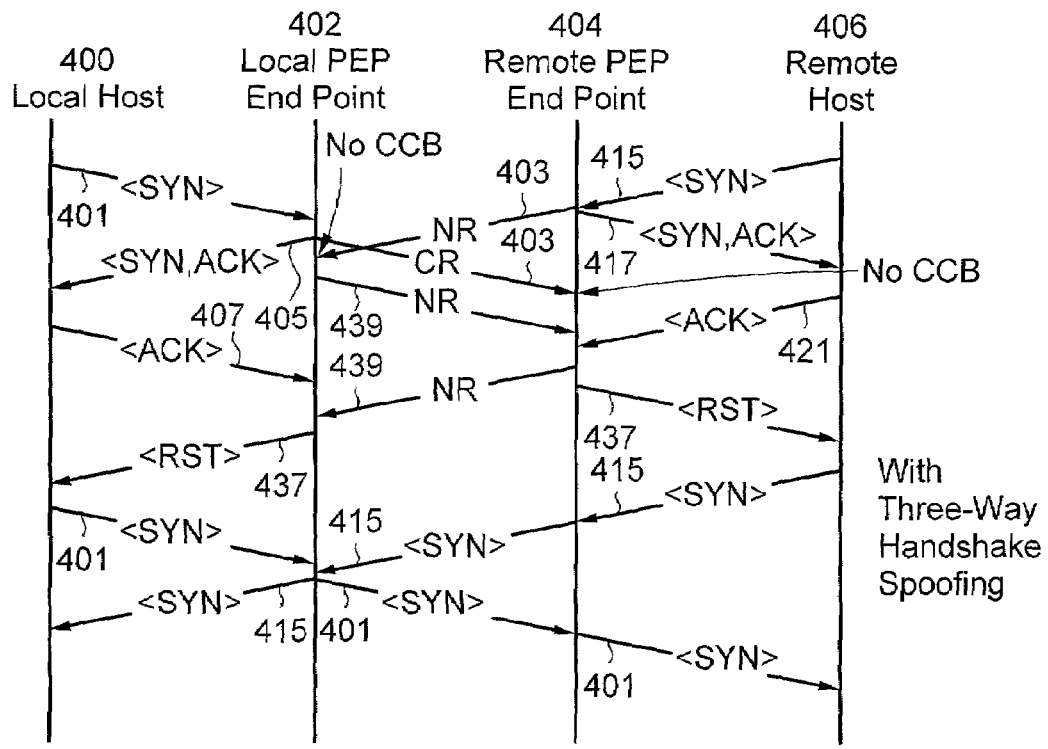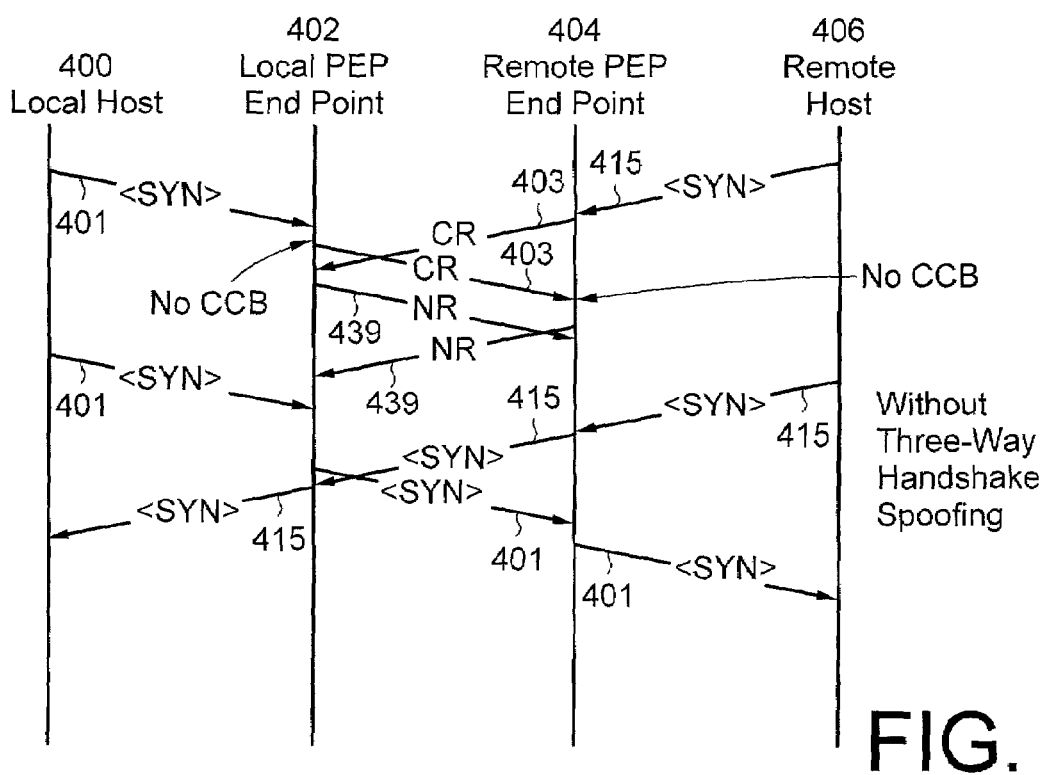
FIG. 24

METHOD AND SYSTEM FOR PROVIDING CONNECTION HANDLING

CROSS-REFERENCES TO RELATED APPLICATIONS

This application is related to and claims the benefit of priority to: (i) U.S. Provisional Patent Application (Ser. No. 60/220,026), filed Jul. 21, 2000, entitled "Performance Enhancing Proxy," and (ii) U.S. Provisional Patent Application (Ser. No. 60/225,630), filed Aug. 15, 2000, entitled "Performance Enhancing Proxy"; all of which are incorporated herein by reference in their entirety.

BACKGROUND OF THE INVENTION

1. Field of the Invention

The present invention is generally directed to a method and system for improving performance of a network, and more particularly, to a method and system which performs spoofing to improve network performance.

2. Description of the Background

The entrenchment of data networking into the routines of modern society, as evidenced by the prevalence of the Internet, particularly the World Wide Web, has placed ever-growing demands on service providers to continually improve network performance. To meet this challenge, service providers have invested heavily in upgrading their networks to increase system capacity (i.e., bandwidth). In many circumstances, such upgrades may not be feasible economically or the physical constraints of the communication system does not permit simply "upgrading." Accordingly, service providers have also invested in developing techniques to optimize the performance of their networks. Because much of today's networks are either operating with or are required to interface with the Transmission Control Protocol/Internet Protocol (TCP/IP) suite, attention has been focused on optimizing TCP/IP based networking operations.

As the networking standard for the global Internet, TCP/IP has earned such acceptance among the industry because of its flexibility and rich heritage in the research community.

The transmission control protocol (TCP) is the dominant protocol in use today on the Internet. TCP is carried by the Internet protocol (IP) and is used in a variety of applications including reliable file transfer and Internet web page access applications. The four layers of the TCP/IP protocol suite are illustrated in FIG. 39. As illustrated, the link layer (or the network interface layer) 3710 includes device drivers in the operating system and any corresponding network interface cards. Together, the device driver and the interface cards handle hardware details of physically interfacing with any cable or whatever type of media is being used. The network layer (also called the Internet layer) 3712 handles the movement of packets around the network. Routing of packets, for example, takes place at the network layer 3712. IP, Internet control message protocol (ICMP), and Internet group management protocol (IGMP) may provide the network layer in the TCP/IP protocol suite. The transport layer 3714 provides a flow of data between two hosts, for the application layer 3716 above.

In the TCP/IP protocol suite, there are at least two different transport protocols, TCP and a user datagram protocol (UDP). TCP, which provides a reliable flow of data between two hosts, is primarily concerned with dividing the data passed to it from the application layer 16 into appropriately sized chunks for the network layer 3712 below, acknowledging received packets, setting timeouts to make certain the other end acknowledges packets that are sent, and so on. Because this reliable flow of data is provided by the transport layer 3714, the application layer 3716 can ignore these details. UDP, on the other hand, provides a much simpler service to the application layer 3716. UDP just sends packets of data called datagrams from one host to another, but there is no guarantee that the datagrams reach the other end. Any desired reliability must be added by the application layer 3716.

The application layer 3716 handles the details of the particular application. There are many common TCP/IP applications that almost every implementation provides. These include telnet for remote log-in, the file transfer protocol (FTP), the simple mail transfer protocol (SMTP) or electronic mail, the simple network management protocol (SNMP), the hypertext transfer protocol (HTTP), and many others.

As described above, TCP provides reliable, in-sequence delivery of data between two IP hosts. The IP hosts set up a TCP connection, using a conventional TCP three-way handshake and then transfer data using a window based protocol with the successfully received data acknowledged.

To understand where optimizations may be made, it is instructive to consider a typical TCP connection establishment.

FIG. 40 illustrates an example of the conventional TCP three-way handshake between IP hosts 3820 and 3822. First, the IP host 3820 that wishes to initiate a transfer with IP host 3822, sends a synchronize (SYN) signal to IP host 3822. The IP host 3822 acknowledges the SYN signal from IP host 3820 by sending a SYN acknowledgement (ACK). The third step of the conventional TCP three-way handshake is the issuance of an ACK signal from the IP host 3820 to the IP host 3822. IP host 3822 is now ready to receive the data from IP host 3820 (and vice versa). After all the data has been delivered, another handshake (similar to the handshake described to initiate the connection) is used to close the TCP connection.

TCP was designed to be very flexible and works over a wide variety of communication links, including both slow and fast links, high latency links, and links with low and high error rates. However, while TCP (and other high layer protocols) works with many different kinds of links, TCP performance, in particular, the throughput possible across the TCP connection, is affected by the characteristics of the link in which it is used. There are many link layer design considerations that should be taken into account when designing a link layer service that is intended to support Internet protocols. However, not all characteristics can be compensated for by choices in the link layer design. TCP has been designed to be very flexible with respect to the links which it traverses. Such flexibility is achieved at the cost of sub-optimal operation in a number of environments vis-à-vis a tailored protocol. The tailored protocol, which is usually proprietary in nature, may be more optimal, but greatly lacks flexibility in terms of networking environments and interoperability.

An alternative to a tailored protocol is the use of performance enhancing proxies (PEPs), to perform a general class of functions termed "TCP spoofing," in order to improve TCP performance over impaired (i.e., high latency or high error rate) links. TCP spoofing involves an intermediate network device (the performance enhancing proxy (PEP)) intercepting and altering, through the addition and/or deletion of TCP segments, the behavior of the TCP connection in an attempt to improve its performance.

Conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of TCP connections either by using larger windows over the link or by using compression to reduce the amount of data which needs to be sent, or both.

Many TCP PEP implementations are based on TCP ACK manipulation. These may include TCP ACK spacing where ACKs which are bunched together are spaced apart, local TCP ACKs, local TCP retransmissions, and TCP ACK filtering and reconstruction. Other PEP mechanisms include tunneling, compression, and priority-based multiplexing.

In addition network performance may be improved utilizing techniques such as connection establishment spoofing.

Based on the foregoing, there is a clear need for improved techniques for spoofing information. Therefore, an approach for improving network performance utilizing techniques such as spoofing is highly desirable. In particular, an approach for implementing spoofing rules within a PEP environment is highly desirable.

SUMMARY OF THE INVENTION

The present invention addresses the above-stated need by providing a communication system with performance enhancing functionality. A spoofing apparatus communicates with a performance enhancing proxy (PEP) end point platform to configure the platform by utilizing profiles corresponding to the PEP end point platform. According to one aspect of the invention, a method for routing information in the communication system that includes a platform and a spoofing apparatus configured to perform a plurality of performance enhancing functions is provided. The method includes receiving information from the platform and receiving at least one of spoofing selection parameters and spoofing parameters, wherein the spoofing apparatus maintains a profile that contains at least one of spoofing selection and spoofing parameters and routing the information in accordance with the profile.

According to another aspect of the invention, a communication system includes a platform that is configured to provide performance enhancing functions. The platform includes a communication system including a platform configured to provide performance enhancing functions, the platform supplying information and at least one of spoofing selection and spoofing parameters and a spoofing apparatus communicating with the platform. The spoofing apparatus is configured to receive the information and the at least one of spoofing selection and spoofing parameters from the platform, wherein the spoofing apparatus has a profile which specifies at least one of spoofing selection and spoofing parameters, wherein the communication system is configured to route the information in accordance with the profile.

According to another aspect of the present invention, a spoofing apparatus for monitoring a communication system that includes a platform configured to perform a plurality of performance enhancing functions is disclosed. The apparatus includes means for receiving the information and the at least one of spoofing selection and spoofing parameters and means for maintaining a profile containing the at least one of the spoofing selection and spoofing parameters and means for routing the information in accordance with the profile.

In yet another aspect of the invention, a computer-readable medium carrying one or more sequences of one or more instructions for routing information in a communication system that includes a platform configured to perform a plurality of performance enhancing functions is disclosed. The computer-readable medium carries one or more sequences of one or more instructions, which, when executed by one or more processors, cause the one or more processors to perform the steps of receiving the information from the platform and receiving at least one of spoofing selection parameters and spoofing parameters, wherein the spoofing apparatus maintains a profile that contains the at least one of the spoofing selection and spoofing parameters and routing the information in accordance with the profile.

The method, communication system, spoofing apparatus, and computer-readable medium also are capable of compensating for maximum segment size mismatches. This compensation may be achieved by dynamically resizing the data segments which comprise the information which is being routed or may include disabling three-way handshake spoofing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a diagram of a PEP packet flow between two PEP end points, according to an embodiment of the present invention;

FIG. 21 is a diagram of the startup of the same TCP connection using the same backbone connection, according to an embodiment of the present invention;

FIG. 24 is a diagram of simultaneous startup using the last CCB, according to an embodiment of the present invention;

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to the Internet and the TCP/IP protocol suite, the present invention has applicability to other packet switched networks and equivalent protocols.

Figure 1:
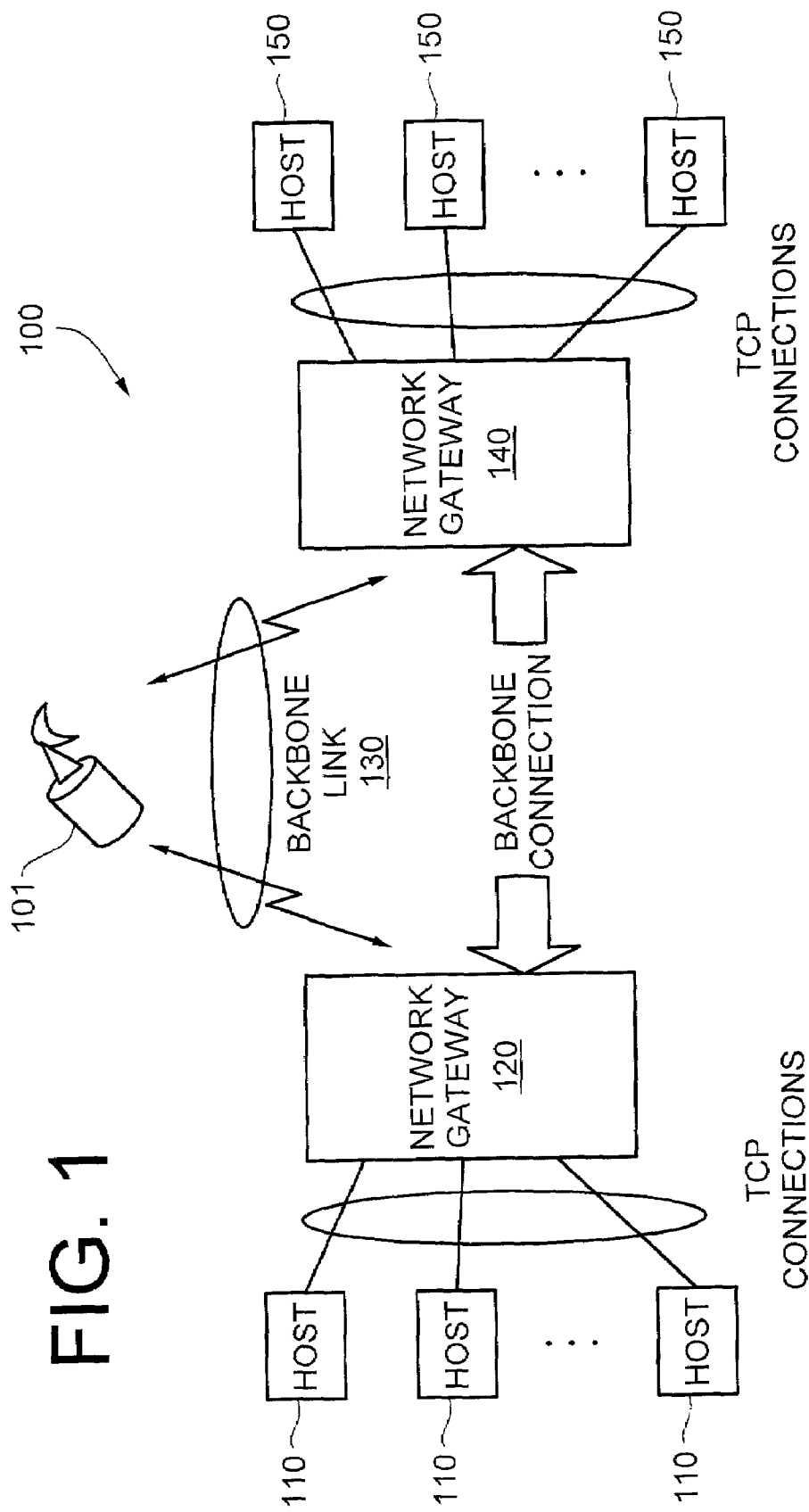
FIG. 1 is a diagram of a communication system in which the performance enhancing proxy (PEP) of the present invention is implemented.

FIG. 1 illustrates an exemplary network 100 in which the performance enhancing proxy (PEP) of the present invention may be utilized. The network 100 in FIG. 1 includes one or more hosts 110 connected to a network gateway 120 via TCP connections. The network gateway 120 is connected to another network gateway 140 via a backbone connection on a backbone link 130. As seen in FIG. 1, the backbone link 130, in an exemplary embodiment, is shown as a satellite link that is established over a satellite 101; however, it is recognized by one of ordinary skill in the art that other network connections may be implemented. For example, these network connections may be established over a wireless communications system, in general, (e.g., radio networks, cellular networks, etc.) or a terrestrial communications system. The network gateway 140 is further connected to a second group of hosts 150, also via TCP connections. In the arrangement illustrated in FIG. 1, the network gateways 120, 140 facilitate communication between the groups of hosts 110, 150.

The network gateways 120, 140 facilitate communication between the two groups of hosts 110, 150 by performing a number of performance enhancing functions. These network gateways 120, 140 may perform selective TCP spoofing, which allows flexible configuration of the particular TCP connections that are to be spoofed. Additionally, gateways 120, 140 employ a TCP three-way handshake, in which the TCP connections are terminated at each end of the backbone link 130. Local data acknowledgements are utilized by the network gateways 120, 140, thereby permitting the TCP windows to increase at local speeds.

The network gateways 120, 140 further multiplex multiple TCP connections across a single backbone connection; this capability reduces the amount of acknowledgement traffic associated with the data from multiple TCP connections, as a single backbone connection acknowledgement may be employed. The multiplexing function also provides support for high throughput TCP connections, wherein the backbone connection protocol is optimized for the particular backbone link that is used. The network gateways 120, 140 also support data compression over the backbone link 130 to reduce the amount of traffic to be sent, further leveraging the capabilities of the backbone connection. Further, the network gateways 120, 140 utilize data encryption in the data transmission across the backbone link 130 to protect data privacy, and provide prioritized access to backbone link 130 capacity on a per TCP connection basis. Each of the network gateways 120, 140 may select a particular path for the data associated with a connection to flow. The above capabilities of the network gateways 120, 140 are more fully described below.

Figure 2:
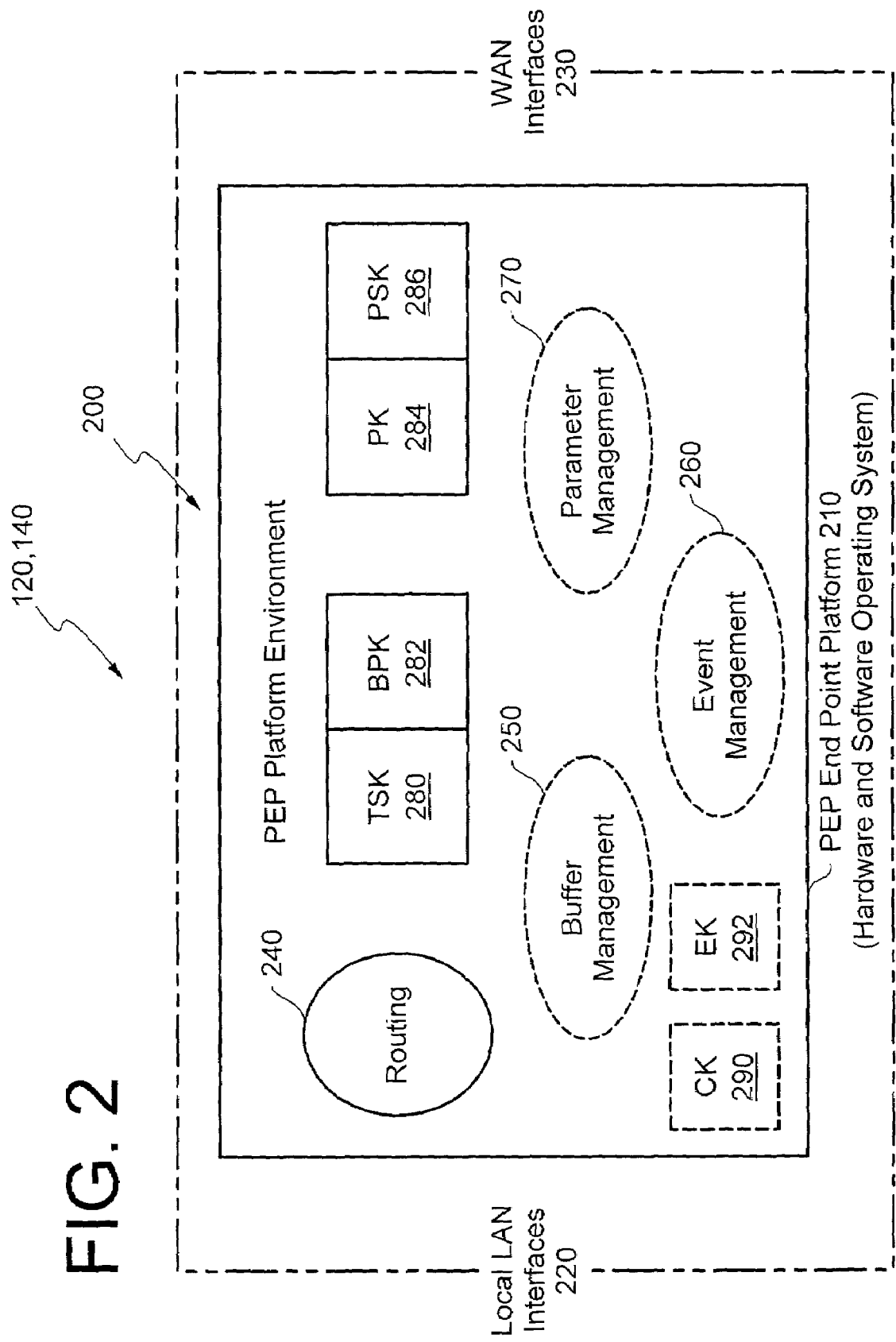
FIG. 2 is a diagram of a PEP end point platform environment, according to an embodiment of the present invention.

FIG. 2 illustrates a performance enhancing proxy (PEP) 200 as implemented in a network gateway 120, 140, according to one embodiment of the present invention. In this embodiment, the PEP 200 has a platform environment 210, which includes the hardware and software operating system.

The PEP 200 also includes local area network (LAN) interfaces 220 and wide area network (WAN) interfaces 230. In the example in FIG. 1, the network gateway 120 may establish the TCP connections with the IP hosts 110, via a local LAN interface 220 and may establish the backbone connection with the network gateway 140 via a WAN interface 230. The PEP platform environment 210 may also include general functional modules: routing module 240, buffer management module 250, event management module 260, and parameter management module 270. As illustrated in FIG. 2, the network gateway also includes a TCP spoofing kernel (TSK) 280, a backbone protocol kernel (BPK) 282, a prioritization kernel (PK) 284, and a path selection kernel (PSK) 286. These four kernels essentially make up the functionality of the performance enhancing proxy 200.

The platform environment 210 performs a number of functions. One such function is to shield the various PEP kernels 280, 282, 284, 286 from implementation specific constraints. That is, the platform environment 210 performs functions that the various PEP kernels 280, 282, 284, 286 cannot perform directly because the implementation of the function is platform specific. This arrangement has the advantageous effect of hiding platform specific details from the PEP kernels 280, 282, 284, 286, making the PEP kernels 280, 282, 284, 286 more portable. An example of a platform specific function is the allocation of a buffer. In some platforms, buffers are created as they are needed, while in other platforms, buffers are created at start-up and organized into linked lists for later use. It is noted that platform specific functions are not limited to functions generic to all of the kernels 280, 282, 284, 286. A function specific to a particular kernel, for example, the allocation of a control block for TCP spoofing, may also be implemented in the platform environment to hide platform specific details from the kernel.

In one exemplary embodiment, the platform environment 210 provides the task context in which the PEP kernels 280, 282, 284, 286 run. In another exemplary embodiment, all PEP kernels 280, 282, 284, 286 can run in the same task context for efficiency; however, this is not required.

Furthermore, the platform environment 210, in an exemplary embodiment, provides an interface between the PEP functionality (embodied in kernels 280, 282, 284, 286) and the other functionality of the network gateway 120, 140. The platform environment 210 may provide the interface between the PEP functionality and the routing function 240, as seen in FIG. 2. It is noted that the platform specific functions illustrated in FIG. 2 are examples and are not considered an exhaustive list. It is further noted that the PEP kernels shown touching each other (280, 282 and 284, 286) in FIG. 2 may have a direct procedural interface to each other. Further, the kernels 280, 282, 284, 286 may include direct interfaces to improve performance, as opposed to routing everything through the platform environment 210 (as shown in FIG. 2).

In addition to the PEP kernels 280, 282, 284, and 286, the PEP end point platform 210 may utilize a data compression kernel (CK) 290 and an encryption kernel (EK) 292. These kernels 280, 282, 284, 286, 290, and 292, as described above, facilitate communication between the two groups of hosts 110, 150, by performing a variety of performance enhancing functions, either singly or in combination. These performance enhancing functions include selective TCP spoofing, three-way handshake spoofing, local data acknowledgement, TCP connection to backbone connection multiplexing, data compression/encryption, prioritization, and path selection.

Selective TCP Spoofing is performed by the TSK 280 and includes a set of user configurable rules that are used to determine which TCP connections should be spoofed. Selective TCP spoofing improves performance by not tying up TCP spoofing-related resources, such as buffer space, control blocks, etc., for TCP connections for which the user has determined that spoofing is not beneficial or required and by supporting the use of tailored parameters for TCP connections that are spoofed.

In particular, the TSK 280 discriminates among the various TCP connections based on the applications using them. That is, TSK 280 discriminates among these TCP connections to determine which connection should be spoofed as well as the manner in which the connection is spoofed; e.g., whether to spoof the three-way handshake, the particular timeout parameters for the spoofed connections, etc. TCP spoofing is then performed only for those TCP connections that are associated with applications for which high throughput or reduced connection startup latency (or both) is required. As a result, the TSK 280 conserves TCP spoofing resources for only those TCP connections for which high throughput or reduced connection startup latency (or both) is required. Further, the TSK 280 increases the total number of TCP connections which can be active before running out of TCP spoofing resources, since any active TCP connections which do not require high throughput are not allocated resources.

One criterion for identifying TCP connections of applications for which TCP spoofing should and should not be performed is the TCP port number field contained in the TCP packets being sent. In general, unique port numbers are assigned to each type of application. Which TCP port numbers should and should not be spoofed can be stored in the TSK 280. The TSK 280 is also re-configurable to allow a user or operator to reconfigure the TCP port numbers which should and should not be spoofed. The TSK 280 also permits a user or operator to control which TCP connections are to be spoofed based on other criteria. In general, a decision on whether to spoof a TCP connection may be based on any field within a TCP packet. The TSK 280 permits a user to specify which fields to examine and which values in these fields identify TCP connections that should or should not be spoofed. Another example of a potential use for this capability is for the user or operator to select the IP address of the TCP packet in order to control for which users TCP spoofing is performed. The TSK 280 also permits a user to look at multiple fields at the same time. As a result, the TSK 280 permits a user or operator to use multiple criteria for selecting TCP connections to spoof. For example, by selecting both the IP address and the TCP port number fields, the system operator can enable TCP spoofing for only specific applications from specific users.

The user configurable rules may include five exemplary criteria which can be specified by the user or operator in producing a selective TCP spoofing rule: Destination IP address; Source IP address; TCP port numbers (which may apply to both the TCP destination and source port numbers); TCP options; and IP differentiated services (DS) field. However, as indicated above, other fields within the TCP packet may be used.

As discussed above, in addition to supporting selective TCP spoofing rules for each of these criteria, AND OR combination operators can be used to link criteria together. For example, using the AND combination operator, a rule can be defined to disable TCP spoofing for FTP data received from a specific host. Also, the order in which the rules are specified may be significant. It is possible for a connection to match the criteria of multiple rules. Therefore, the TSK 280 can apply rules in the order specified by the operator, taking the action of the first rule that matches. A default rule may also be set which defines the action to be taken for TCP connections which do not match any of the defined rules. The set of rules selected by the operator may be defined in a selective TCP spoofing selection profile.

As an example, assuming sufficient buffer space has been allocated to spoof five TCP connections, if four low speed applications (i.e., applications which, by their nature, do not require high speed) bring up connections along with one high speed application, the high speed connection has access to only ⅕ of the available spoofing buffer space. Further, if five low speed connections are brought up before the high speed connection, the high speed connection cannot be spoofed at all. Using the TSK 280 selective spoofing mechanism, the low speed connections are not allocated any spoofing buffer space. Therefore, the high speed connection always has access to all of the buffer space, improving its performance with respect to an implementation without the selective TCP spoofing feature of the TSK 280.

The TSK 280 also facilitates spoofing of the conventional three-way handshake. Three-Way Handshake Spoofing involves locally responding to a connection request to bring up a TCP connection in parallel with forwarding the connection requests across the backbone link 130 (FIG. 1). This allows the originating IP host (for example, 110) to reach the point of being able to send the data it must send at local speeds, i.e. speeds that are independent of the latency of the backbone link 130. Three-way Handshake Spoofing allows the data that the IP host 110 needs to send to be sent to the destination IP host 150 without waiting for the end-to-end establishment of the TCP connection. For backbone links 130 with high latency, this significantly reduces the time it takes to bring up the TCP connection and, more importantly, the overall time it takes to get a response (from an IP host 150) to the data the IP host 110 sends.

A specific example in which this technique is useful relates to an Internet web page access application. With three-way handshake spoofing, an IP host's request to retrieve a web page can be on its way to a web server without waiting for the end-to-end establishment of the TCP connection, thereby reducing the time it takes to download the web page.

With Local Data Acknowledgement, the TSK 280 in the network gateway 120 (for example) locally acknowledges data segments received from the IP host 110. This allows the sending IP host 110 to send additional data immediately. More importantly, TCP uses received acknowledgements as signals for increasing the current TCP window size. As a result, local sending of the acknowledgements allows the sending IP host 110 to increase its TCP window at a much faster rate than supported by end to end TCP acknowledgements. The TSK 280 (the spoofer) takes on the responsibility for reliable delivery of the data which it has acknowledged.

In the BPK 282, multiple TCP connections are multiplexed onto and carried by a single backbone connection. This improves system performance by allowing the data for multiple TCP connections to be acknowledged by a single backbone connection acknowledgement (ACK), significantly reducing the amount of acknowledgement traffic required to maintain high throughput across the backbone link 130. In addition, the BPK 282 selects a backbone connection protocol that is optimized to provide high throughput for the particular link. Different backbone connection protocols can be used by the BPK 282 with different backbone links without changing the fundamental TCP spoofing implementation. The backbone connection protocol selected by the BPK 282 provides appropriate support for reliable, high speed delivery of data over the backbone link 130, hiding the details of the impairments (for example high latency) of the link from the TCP spoofing implementation.

The multiplexing by the BPK 282 allows for the use of a backbone link protocol which is individually tailored for use with the particular link and provides a technique to leverage the performance of the backbone link protocol with much less dependency upon the individual performance of the TCP connections being spoofed than conventional methods. Further, the ability to tailor the backbone protocol for different backbone links makes the present invention applicable to many different systems.

The PEP 200 may optionally include a data compression kernel 290 for compressing TCP data and an encryption kernel 292 for encrypting TCP data. Data compression increases the amount of data that can be carried across the backbone connection. Different compression algorithms can be supported by the data compression kernel 290 and more than one type of compression can be supported at the same time. The data compression kernel 290 may optionally apply compression on a per TCP connection basis, before the TCP data of multiple TCP connections is multiplexed onto the backbone connection or on a per backbone connection basis, after the TCP data of multiple TCP connections has been multiplexed onto the backbone connection. Which option is used is dynamically determined based on user configured rules and the specific compression algorithms being utilized. Exemplary data compression algorithms are disclosed in U.S. Pat. Nos. 5,973,630, 5,955,976, the entire contents of which are hereby incorporated by reference. The encryption kernel 292 encrypts the TCP data for secure transmission across the backbone link 130. Encryption may be performed by any conventional technique. It is also understood that the corresponding spoofer (in the example outlined above, the network gateway 140) includes appropriate kernels for decompression and decryption, both of which may be performed by any conventional technique.

The PK 284 provides prioritized access to the backbone link capacity. For example, the backbone connection can actually be divided into N (N>1) different sub-connections, each having a different priority level. In one exemplary embodiment, four priority levels can be supported. The PK 284 uses user-defined rules to assign different priorities, and therefore different sub-connections of the backbone connection, to different TCP connections. It should be noted that PK 284 may also prioritize non-TCP traffic (e.g., UDP (User Datagram Protocol) traffic) before sending the traffic across the backbone link 130.

The PK 284 also uses user-defined rules to control how much of the backbone link 130 capacity is available to each priority level. Exemplary criteria which can be used to determine priority include the following: Destination IP address; Source IP address; IP next protocol; TCP port numbers (which may apply to both the TCP destination and source port numbers); UDP port numbers (which may apply to both the UDP destination and source port numbers); and IP differentiated services (DS) field. The type of data in the TCP data packets may also be used as a criterion. For example, video data could be given highest priority. Mission critical data could also be given high priority. As with selective TCP spoofing, any field in the IP packet can be used by PK 284 to determine priority. However, it should be noted that under some scenarios the consequence of using such a field may cause different IP packets of the same flow (e.g., TCP connection) to be assigned different priorities; these scenarios should be avoided.

As mentioned above, in addition to supporting selective prioritization rules for each of these criteria, AND and OR combination operators can be used to link criteria together. For example, using the AND combination operator, a rule can be defined to assign a priority for SNMP data received from a specific host. Also, the order in which the rules are specified may be significant. It is possible for a connection to match the criteria of multiple rules. Therefore, the PK 284 can apply rules in the order specified by the operator, taking the action of the first rule that matches. A default rule may also be set which defines the action to be taken for IP packets which do not match any of the defined rules. The set of rules selected by the operator may be defined in a prioritization profile.

As regards the path selection functionality, the PSK 286 is responsible for determining which path an IP packet should take to reach its destination. The path selected by the PSK 286 can be determined by applying path selection rules. The PSK 286 also determines which IP packets should be forwarded using an alternate path and which IP packets should be dropped when one or more primary paths fail. Path selection parameters can also be configured using profiles. The path selection rules may be designed to provide flexibility with respect to assigning paths while making sure that all of the packets related to the same traffic flow (e.g., the same TCP connection) take the same path (although it is also possible to send segments of the same TCP connection via different paths, this segment "splitting" may have negative side effects). Exemplary criteria that can be used to select a path include the following: priority of the IP packet as set by the PK 284 (should be the most common criterion): Destination IP address; Source IP address; IP next protocol; TCP port numbers (which may apply to both the TCP destination and source port numbers); UDP port numbers (which may apply to both the UDP destination and source port numbers); and IP differentiated services (DS) field. Similar to selective TCP spoofing and prioritization, the PSK 284 may determine a path by using any field in the IP packet.

As with the prioritization criteria (rules) the AND and OR combination operators can be used to link criteria together. For example, using the AND combination operator, a rule can be defined to select a path for SNMP data received from a specific host. Also, the order in which the rules are specified may be significant. It is possible for a connection to match the criteria of multiple rules. Therefore, the PSK 286 can apply rules in the order specified by the operator, taking the action of the first rule that matches. A default rule may also be set which defines the action to be taken for IP packets which do not match any of the defined rules. The set of rules selected by the operator may be defined in a path selection profile.

By way of example, a path selection rule may select the path based on any of the following path information in which IP packets match the rule: a primary path, a secondary path, and a tertiary path. The primary path is specified in any path selection rule. The secondary path is used only when the primary path has failed. If no secondary path is specified, any IP packets that match the rule can be discarded when the primary path fails. The tertiary path is specified only if a secondary path is specified. The tertiary path is selected if both the primary and secondary paths have failed. If no tertiary path is specified, any IP packets that match the rule can be discarded when both the primary and secondary paths fail. Path selection may be generalized such that the path selection rule can select up to N paths where the Nth path is used only if the (N−1) the path fails. The example above where N=3 is merely illustrative, although N is typically a fairly small number.

By way of example, the operation of the system 100 is described as follows. First, a backbone connection is established between the PEPs 200 of two network gateways 120, 140 (i.e., the two spoofers), located at each end of the backbone link 130 for which TCP spoofing is desired. Whenever an IP host 110 initiates a TCP connection, the TSK 280 of the PEP 200 local to the IP host 110 checks its configured selective TCP spoofing rules. If the rules indicate that the connection should not be spoofed, the PEP 200 allows the TCP connection to flow end-to-end unspoofed. If the rules indicate that the connection should be spoofed, the spoofing PEP 200 locally responds to the IP host's TCP three-way handshake. In parallel, the spoofing PEP 200 sends a message across the backbone link 130 to its partner network gateway 140 asking it to initiate a TCP three-way handshake with the IP host 150 on its side of the backbone link 130. Data is then exchanged between the IP host 110, 150 with the PEP 200 of the network gateway 120 locally acknowledging the received data and forwarding it across the backbone link 130 via the high speed backbone connection, compressing the data as appropriate based on the configured compression rules. The priority of the TCP connection is determined when the connection is established. The BPK 282 can multiplex the connection with other received connections over a single backbone connection, the PK 284 determines the priority of the connection and the PSK 286 determines the path the connection is to take.

The PEP 200, as described above, advantageously improves network performance by allocating TCP spoofing-related resources, such as buffer space, control blocks, etc., only to TCP connections for which spoofing is beneficial; by spoofing the three-way handshake to decrease data response time; by reducing the number of ACKs which are transmitted by performing local acknowledgement and by acknowledging multiple TCP connections with a single ACK; by performing data compression to increase the amount of data that can be transmitted; by assigning priorities to different connections; and by defining multiple paths for connections to be made.

Figure 3:
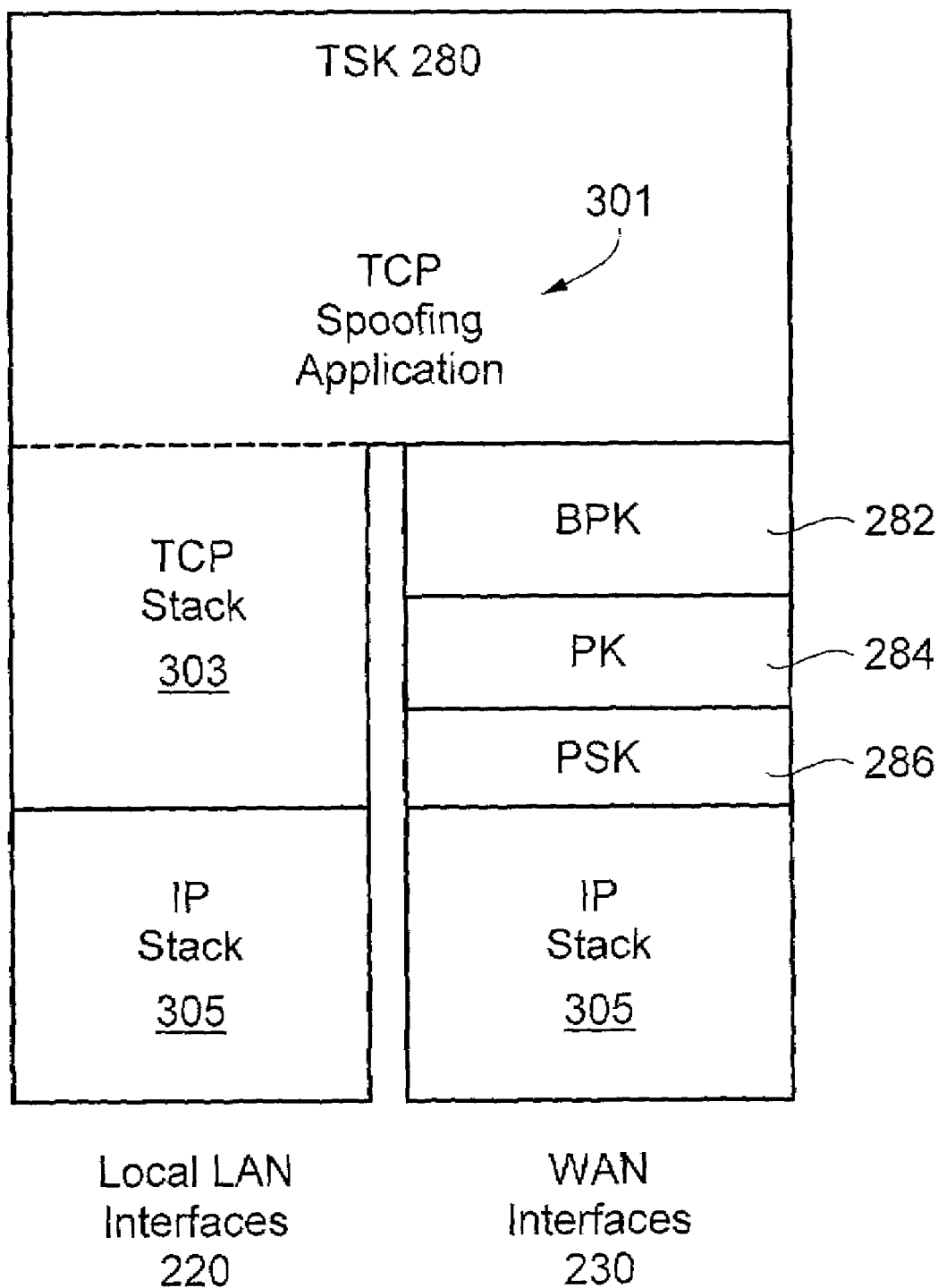
FIG. 3 is a diagram of a TCP Spoofing Kernel (TSK) utilized in the environment of FIG. 2.

FIG. 3 shows an exemplary stack, which illustrates the relationship between the TCP stack and the PEP kernels 280, 282, 284, 286 of the present invention. The TSK 280 is primarily responsible for functions related to TCP spoofing. The TSK 280, in an exemplary embodiment, includes two basic elements: a transport layer that encompasses a TCP stack 303 and an IP stack 305; and a TCP spoofing application 301. The transport layer is responsible for interacting with the TCP stacks (e.g., 303) of IP hosts 110 connected to a local LAN interface 220 of a PEP 210.

The TSK 280 implements the TCP protocol, which includes the appropriate TCP state machines and terminates spoofed TCP connections. The TCP spoofing application 301 rests on top of the transport layer and act as the application that receives data from and sends data to the IP hosts 110 applications. Because of the layered architecture of the protocol, the TCP spoofing application 301 isolates the details of TCP spoofing from the transport layer, thereby allowing the transport layer to operate in a standard fashion.

As shown in FIG. 3, the TCP spoofing application 301 can also interface to the BPK 282 associated with the WAN interfaces 230. The BPK 282 performs backbone protocol maintenance, implementing the protocol by which the network gateways 120, 140 (in FIG. 1) communicate. The BPK 282 provides reliable delivery of data, uses a relatively small amount of acknowledgement traffic, and supports generic backbone use (i.e., use not specific to the TSK 280). An example of a protocol implemented by BPK 282 is the reliable data protocol (RDP).

The BPK 282 lies above the PK 284 and the PSK 286, according to an exemplary embodiment. The PK 284 is responsible for determining the priority of IP packets and then allocating transmission opportunities based on priority. The PK 284 can also control access to buffer space by controlling the queue sizes associated with sending and receiving IP packets. The PSK 286 determines which path an IP packet should take to reach its destination. The path selected by the PSK 286 can be determined applying path selection rules. PSK 286 may also determine which IP packet should be forwarded using an alternate path and which packets should be dropped when one or more primary paths fail. It is noted that the above arrangement is merely exemplary; other arrangements would be evident to one skilled in the art.

Figure 4A:
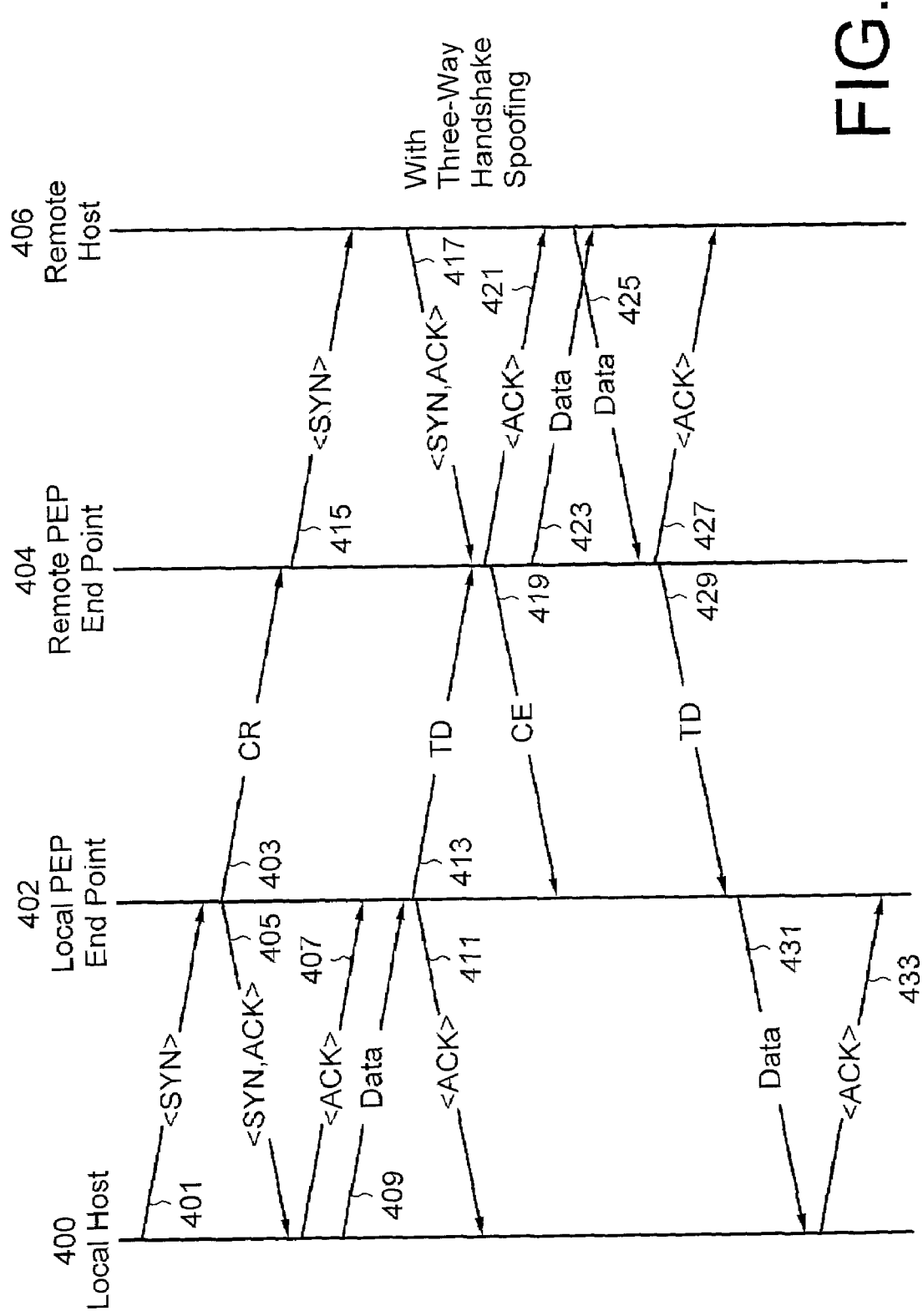
FIGS. 4A and 4B are flow diagrams of the connection establishment with three-way handshake spoofing and without three-way handshake spoofing, respectively.
Figure 4B:
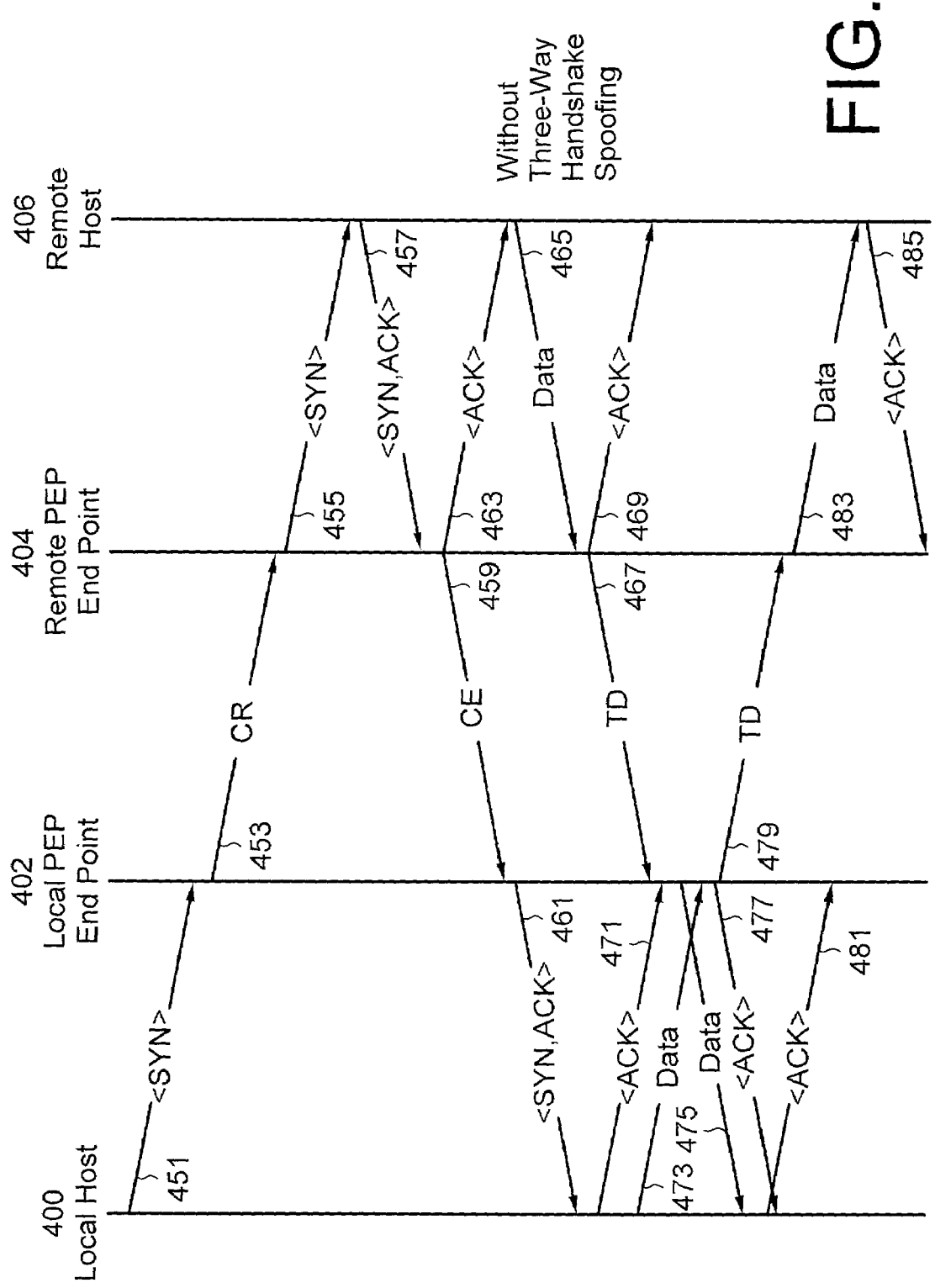

FIGS. 4A and 4B show flow diagrams of the establishment of a spoofed TCP connection utilizing three-way handshake spoofing and without three-way handshake spoofing, respectively. The TCP Spoofing Kernel 280 establishes a spoofed TCP connection when a TCP <SYN> segment is received from its local LAN or a Connection Request message from its TSK peer. It is noted that the three-way handshake spoofing may be disabled to support an end to end maximum segment size (MSS) exchange, which is more fully described below. For the purpose of explanation, the spoofed TCP connection establishment process is described with respect to a local host 400, a local PEP end point 402, a remote PEP end point 404, and a remote host 406. As mentioned previously, the TSK 280 within each of the PEP end points 402 and 404 provides the spoofing functionality.

In step 401, the local host 400 transmits a TCP <SYN> segment to the local PEP end point 402 at a local LAN interface 220. When a TCP segment is received from the local LAN interface 220, the platform environment 402 determines whether there is already a connection control block (CCB) assigned to the TCP connection associated with the TCP segment. If there is no CCB, the environment 402 checks whether the TCP segment is a <SYN> segment that is being sent to a non-local destination. If so, the <SYN> segment represents an attempt to bring up a new (non-local) TCP connection, and the environment 402 passes the segment to the TCP Spoofing Kernel 280 to determine the TCP connection's disposition. When a TCP <SYN> segment is received from the local LAN interface 220 for a new TCP connection, the TCP Spoofing Kernel 280 first determines if the connection should be spoofed. If the connection should be spoofed, TSK 280 uses (in an exemplary embodiment) the priority indicated in the selected TCP spoofing parameter profile and the peer index (provided by the environment 210 with the TCP <SYN> segment) to construct the handle of the backbone connection which should be used to carry this spoofed TCP connection. In the exemplary embodiment, the peer index is used as the 14 high order bits of the handle and the priority is used as the two low order bits of the handle. The backbone connection handle is then used (via the TSK control block (TCB) mapping table) to find the TCB associated with the backbone connection. TSK 280 of PEP end point 402 then checks whether the backbone connection is up. If the backbone connection is up, TSK 280 determines whether the number of spoofed TCP connections that are already using the selected backbone connection is still currently below the TCP connection control block (CCB) resource limit. The CCB resource limit is the smaller of the local number of CCBs (provided as a parameter by the platform environment 210) and the peer number of CCBs (received in the latest TSK peer parameters (TPP) message from the TSK peer) available for this backbone connection. If the number of connections is still below the limit, TSK 280 of PEP end point 402 assigns a unique TCP connection identifier (e.g., a free CCB mapping table entry index) to the connection and calls the environment 210 to allocate a TCP connection control block for the connection.

TSK 280 of PEP end point 402 returns the TCP <SYN> segment back to the environment 210 to be forwarded unspoofed if any of the above checks fail. In other words, the following conditions result in the TCP connection being unspoofed. First, if the selective TCP spoofing rules indicate that the connection should not be spoofed. Also, there is no backbone connection for the priority at which the TCP connection should be spoofed (indicated by the absence of a TCB for the backbone connection). No spoofing is performed if the backbone connection is down. Additionally, if the number of spoofed TCP connections that are already using the backbone connection reaches or exceeds a predetermined threshold, then no spoofing is performed. Further, if there is no CCB mapping table entry available or there is no CCB available from the CCB free pool, then the TCP connection is forwarded unspoofed. For the case in which there is no backbone connection, TSK 280 of PEP end point 402 may also post an event to alert the operator that there is a mismatch between the configured TCP spoofing parameter profiles and the configured set of backbone connections.

Continuing with the example, if all of the above checks pass, TSK 280 of PEP end point 402 writes the backbone connection handle into the buffer holding the TCP <SYN> segment. It is noted that this is not done until a CCB is successfully allocated by the platform environment 402, because the environment does not count the buffer unless a CCB is successfully allocated. TSK 280 then copies the parameters from the selected TCP spoofing parameter profile into the CCB. Consequently, relevant information (e.g., the maximum segment size that is advertised by the host (if smaller than the configured MSS), the initial sequence number, and etc.) is copied out of the TCP <SYN> segment and stored in the CCB. It is noted that the source and destination IP addresses and source and destination TCP port numbers will already have been placed into the CCB by the platform environment 402 when the CCB was allocated; the environment 402 uses this information to manage CCB hash function collisions.

After allocating and setting up the CCB, the TCP Spoofing Kernel 280 of PEP end point 402 constructs a Connection Request (CR) message, per step 403, and sends it to its TSK peer associated with the remote PEP end point 404. The CR message basically contains all of the information extracted from the TCP spoofing parameter profile and the TCP <SYN> segment and stored in the local CCB, e.g., the source and destination IP addresses, the source and destination TCP port numbers, the MSS value, etc., with the exception of fields that have only local significance, such as the initial sequence number. (The IP addresses and TCP port numbers are placed into a TCP connection header.) In other words, the CR message contains all of the information that the peer TSK of PEP end point 404 requires to set up its own CCB. To complete the local connection establishment, the TCP Spoofing Kernel 280 of the local PEP end point 402 sends a TCP <SYN,ACK> segment to the local host 400 in response to the <SYN> segment received, per step 405. TSK 280 of PEP end point 402 performs step 405 simultaneously with the step of sending the Connection Request message (i.e., step 403), if three-way handshake spoofing is enabled. Otherwise, TSK 280 of 402 waits for a Connection Established (CE) message from its TSK peer of the remote PEP end point 404 before sending the <SYN,ACK> segment. In an exemplary embodiment, TSK 280 of PEP end point 402 selects a random initial sequence number (as provided in IETF (Internet Engineering Task Force) RFC 793, which is incorporated herein by reference in its entirety) to use for sending data.

If three-way handshake spoofing is disabled, the MSS value sent in the <SYN,ACK> segment is set equal to the MSS value received in the CE message. If three-way handshake spoofing is enabled, the MSS value is determined from the TCP spoofing parameter profile selected for the connection (and the configured path maximum transmission unit (MTU)). For this case, TSK 280 of PEP end point 402 then compares the MSS value received in the Connection Established message, when it arrives, to the value it sent to the local host in the TCP <SYN,ACK> segment. If the MSS value received in the CE message is smaller than the MSS value sent to the local host, a maximum segment size mismatch exists. (If an MSS mismatch exists, TSK may need to adjust the size of TCP data segments before sending them.) After sending the TCP <SYN,ACK> segment (step 405), TSK 280 of the local PEP end point 402 is ready to start accepting data from the local host 400. In step 407, the local host 400 transmits an <ACK> segment to the TSK 280 of PEP end point 402; thereafter, the local host forwards, as in step 409, data to the TSK 280 of PEP end point 402 as well. When three-way handshake spoofing is being used, TSK 280 does not need to wait for the Connection Established message to arrive from its TSK peer before accepting and forwarding data. As seen in FIG. 4A, in step 411, TSK 280 of the local PEP end point 402 sends an <ACK> segment to the local host and simultaneously sends the TCP data (TD) from the local host 400 to the peer TSK of PEP end point 404 (per step 413) prior to receiving a CE message from the peer TSK of PEP end point 404.

However, TSK 280 of PEP end point 402 does not accept data from its TSK peer of PEP end point 404 until after the CE message has been received. TSK 280 of PEP end point 402 does not forward any data received from its TSK peer of PEP end point 404 to the local host 400 until it has received the TCP <ACK> segment indicating that the local host has received the <SYN,ACK> segment (as in step 407).

When a Connection Request message is received from a peer TSK (step 403), the TCP Spoofing Kernel 280 allocates a CCB for the connection and then stores all of the relevant information from the CR message in the CCB. TSK 280 of PEP end point 404 then uses this information to generate a TCP <SYN> segment, as in step 415, to send to the remote host 406. The MSS in the <SYN> segment is set to the value received from the TSK peer of PEP end point 404. When the remote host responds with a TCP <SYN,ACK> segment (step 417), TSK 280 of PEP end point 402 sends a Connection Established message to its TSK peer of the remote PEP end point 404 (step 419), including in the CE message the MSS that is sent by the local host in the <SYN,ACK> segment. TSK 280 of PEP end point 402 also responds, as in step 421, with a TCP <ACK> segment to complete the local three-way handshake. The peer TSK of PEP end point 404 then forwards the data that is received from TSK 280 to the host, per step 423. Concurrently, in step 425, the remote host 406 sends data to the peer TSK of PEP end point 404, which acknowledges receipt of the data by issuing an <ACK> segment to the remote PEP end point 404, per step 427. Simultaneously with the acknowledgement, the data is sent to TSK 280 of PEP end point 402 (step 429).

At this point, TSK 280 is ready to receive and forward data from either direction. TSK 280 forwards the data, as in step 431 to the local host, which, in turn, sends an <ACK> segment (step 433). If the data arrives from its TSK peer before a <SYN,ACK> segment response is received from the local host, the data is queued and then sent after the <ACK> segment is sent in response to the <SYN,ACK> segment (when it arrives).

Turning now to FIG. 4B, a spoofed TCP connection is established with the three-way handshake spoofing disabled. Under this scenario, the local host 400 transmits a TCP <SYN> segment, as in step 451, to the TSK 280 within the local PEP end point 402. Unlike the TCP connection establishment of FIG. 4A, the local PEP end point 402 does not respond to the a TCP <SYN> segment with a <SYN,ACK> segment, but merely forwards a CR message to the remote PEP end point 404 (step 453). Next, in step 455, sends a TCP <SYN> segment to the remote host 406. In response, the remote host 406 transmit a TCP <SYN,ACK> segment back to the remote PEP end point 404 (per step 457). Thereafter, the remote PEP end point 404, as in step 459, forwards a CE message to the local PEP end point 402, which subsequently issues a <SYN,ACK> segment to the local host 400, per step 461. Simultaneous with step 459, the remote PEP end point 404 issues an <ACK> segment to the remote host 406 (step 463).

Upon receiving the <ACK> segment, the remote host 406 may begin transmission of data, as in step 465. Once the PEP end point 404 receives the data from the remote host 406, the remote PEP end point 404 simultaneously transmits, as in step 467, the TD message to the local PEP end point 402 and transmits an <ACK> segment to the remote host 406 to acknowledge receipt of the data (step 469).

Because the local host 400 has received a <SYN,ACK> segment from the local PEP end point 402, the local host 400 acknowledges the message, per step 471. Thereafter, the local host 400 transmits data to the local PEP end point 402. In this example, before the local PEP end point 402 receives the data from the local host 400, the local PEP end point 402 forwards the data that originated from the remote host 406 via the TD message (step 467) to the local host 400, per step 475.

In response to the data received (in step 473), the local PEP end point 402 issues an <ACK> segment, as in step 477, and forwards the data in a TD message to the remote PEP end point 404, per step 479. The local host 400 responds to the received data of step 475 with an <ACK> segment to the local PEP end point 402 (step 481). The remote PEP end point 404 sends the data from the local host 400, as in step 483, upon receipt of the TD message. After receiving the data, the remote host 406 acknowledges receipt by sending an <ACK> segment back to the remote PEP end point 404, per step 485.

FIG. 5 shows the flow of packets with the PEP architecture, according to one embodiment of the present invention. As shown, a communication system 500 includes a hub site (or local) PEP end point 501 that has connectivity to a remote site PEP end point 503 via a backbone connection. By way of example, at the hub site (or local site) and at each remote site, PEP end points 501 and 503 handle IP packets. PEP end point 501 includes an internal IP packet routing module 501a that receives local IP packets and exchanges these packets with a TSK 501b and a BPK 501c. Similarly, the remote PEP end point 503 includes an internal IP packet routing module 503a that is in communication with a TSK 503b and a BPK 503c. Except for the fact that the hub site PEP end point 501 may support many more backbone protocol connections than a remote site PEP end point 503, hub and remote site PEP processing is symmetrical.

For local-to-WAN traffic (i.e., upstream direction), the PEP end point 501 receives IP packets from its local interface 220 (FIG. 2). Non-TCP IP packets are forwarded (as appropriate) to the WAN interface 230 (FIG. 2). TCP IP packets are internally forwarded to TSK 501b. TCP segments which belong to connections that are not be spoofed are passed back by the spoofing kernel 501b to the routing module 501a to be forwarded unmodified to the WAN interface 230. For spoofed TCP connections, the TCP spoofing kernel 501*a* locally terminates the TCP connection. TCP data that is received from a spoofed connection is passed from the spoofing kernel 501*a* to the backbone protocol kernel 501*c*, and then multiplexed onto the appropriate backbone protocol connection. The backbone protocol kernel 501*c* ensures that the data is delivered across the WAN.

For WAN-to-local traffic (i.e., downstream direction), the remote PEP end point 503 receives IP packets from its WAN interface 230 (FIG. 2). IP packets that are not addressed to the end point 503 are simply forwarded (as appropriate) to the local interface 220 (FIG. 2). IP packets addressed to the end point 503, which have a next protocol header type of "PBP" are forwarded to the backbone protocol kernel 503*c*. The backbone protocol kernel 503*c* extracts the TCP data and forwards it to the TCP spoofing kernel 503*b* for transmission on the appropriate spoofed TCP connection. In addition to carrying TCP data, the backbone protocol connection is used by the TCP spoofing kernel 501*b* to send control information to its peer TCP spoofing kernel 503*b* in the remote PEP end point 503 to coordinate connection establishment and connection termination.

Prioritization may be applied at four points in the system 500 within routing 501*a* and TSK 501*b* of PEP end point 501, and within routing 503*a*, and TSK 503*b* of PEP end point 503. In the upstream direction, priority rules are applied to the packets of individual TCP connections at the entry point to the TCP spoofing kernel 501*b*. These rules allow a customer to control which spoofed applications have higher and lower priority access to spoofing resources. Upstream prioritization is also applied before forwarding packets to the WAN. This allows a customer to control the relative priority of spoofed TCP connections with respect to unspoofed TCP connections and non-TCP traffic (as well as to control the relative priority of these other types of traffic with respect to each other). On the downstream side, prioritization is used to control access to buffer space and other resources in the PEP end point 503, generally and with respect to TCP spoofing.

At the hub (or local) site, the PEP end point 501 may be implemented in a network gateway (e.g. an IP Gateway), according to one embodiment of the present invention. At the remote site, the PEP end point 503 may be implemented in the remote site component, e.g. a satellite terminal such as a Multimedia Relay, a Multimedia VSAT or a Personal Earth Station (PES) Remote.

The architecture of system 500 provides a number of advantages. First, TCP spoofing may be accomplished in both upstream and downstream directions. Additionally, the system supports spoofing of TCP connection startup, and selective TCP spoofing with only connections that can benefit from spoofing actually spoofed. Further, system 500 enables prioritization among spoofed TCP connections for access to TCP spoofing resources (e.g., available bandwidth and buffer space). This prioritization is utilized for all types of traffic that compete for system resources.

With respect to the backbone connection, the system 500 is suitable for application to a satellite network as the WAN. That is, the backbone protocol is optimized for satellite use in that control block resource requirements are minimized, and efficient error recovery for dropped packets are provided. The system 500 also provides a feedback mechanism to support maximum buffer space resource efficiency. Further, system 500 provides reduced acknowledgement traffic by using a single backbone protocol ACK to acknowledge the data of multiple TCP connections.

Figure 6:
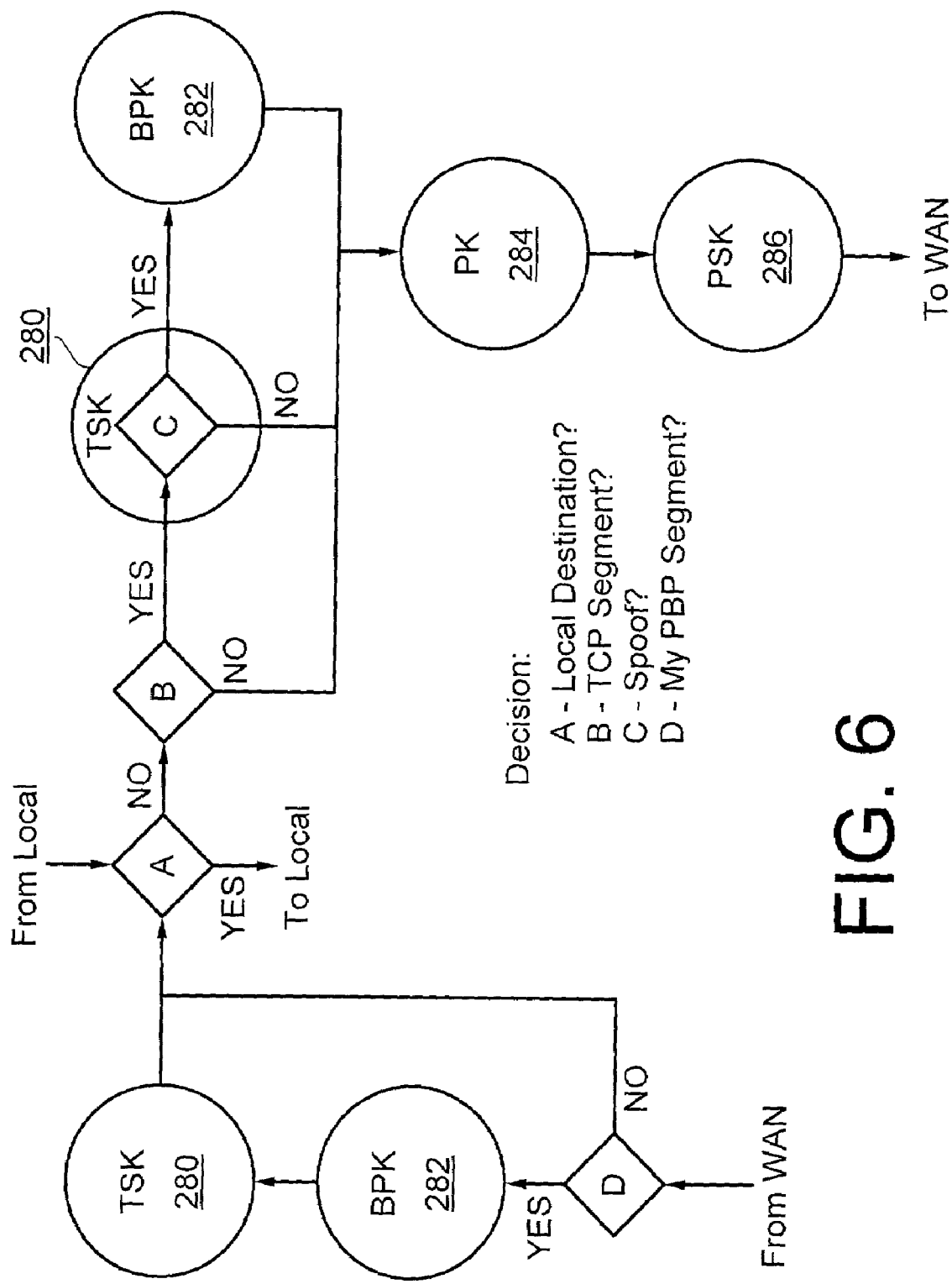
FIG. 6 is a diagram of an IP (Internet Protocol) packet flow through a PEP end point, in accordance with an embodiment of the present invention.

FIG. 6 illustrates the flow of IP packets through a PEP end point, according to an embodiment of the present invention. When IP packets are received at the local LAN interface 220, the PEP end point 210 determines (as shown by decision point A), whether the packets are destined for a host that is locally situated; if so, the IP packets are forwarded to the proper local LAN interface 220. If the IP packets are destined for a remote host, then the PEP end point 210 decides, per decision point B, whether the traffic is a TCP segment. If the PEP end point 210 determines that in fact the packets are TCP segments, then the TSK 280 determines whether the TCP connection should be spoofed. However, if the PEP end point 210 determines that the packets are not TCP segments, then the BPK 282 processes the traffic, along with the PK 284 and the PSK 286 for eventual transmission out to the WAN. It should be noted that the BPK 282 does not process unspoofed IP packets; i.e., the packets flow directly to PK 284. As seen in FIG. 6, traffic that is received from the WAN interface 230 is examined to determine whether the traffic is a proper PBP segment (decision point D) for the particular PEP end point 210; if the determination is in the affirmative, then the packets are sent to the BPK 282 and then the TSK 280.

Routing support includes routing between the ports of the PEP End Point 210 (FIG. 2), e.g., from one Multimedia VSAT LAN port to another. Architecturally, the functionalities of TCP spoofing, prioritization and path selection, fit between the IP routing functionality and the WAN. PEP functionality need not be applied to IP packets which are routed from local port to local port within the same PEP End Point 210. TCP spoofing, prioritization and path selection are applied to IP packets received from a local PEP End Point interface that have been determined to be destined for another site by the routing function.

Figure 7:
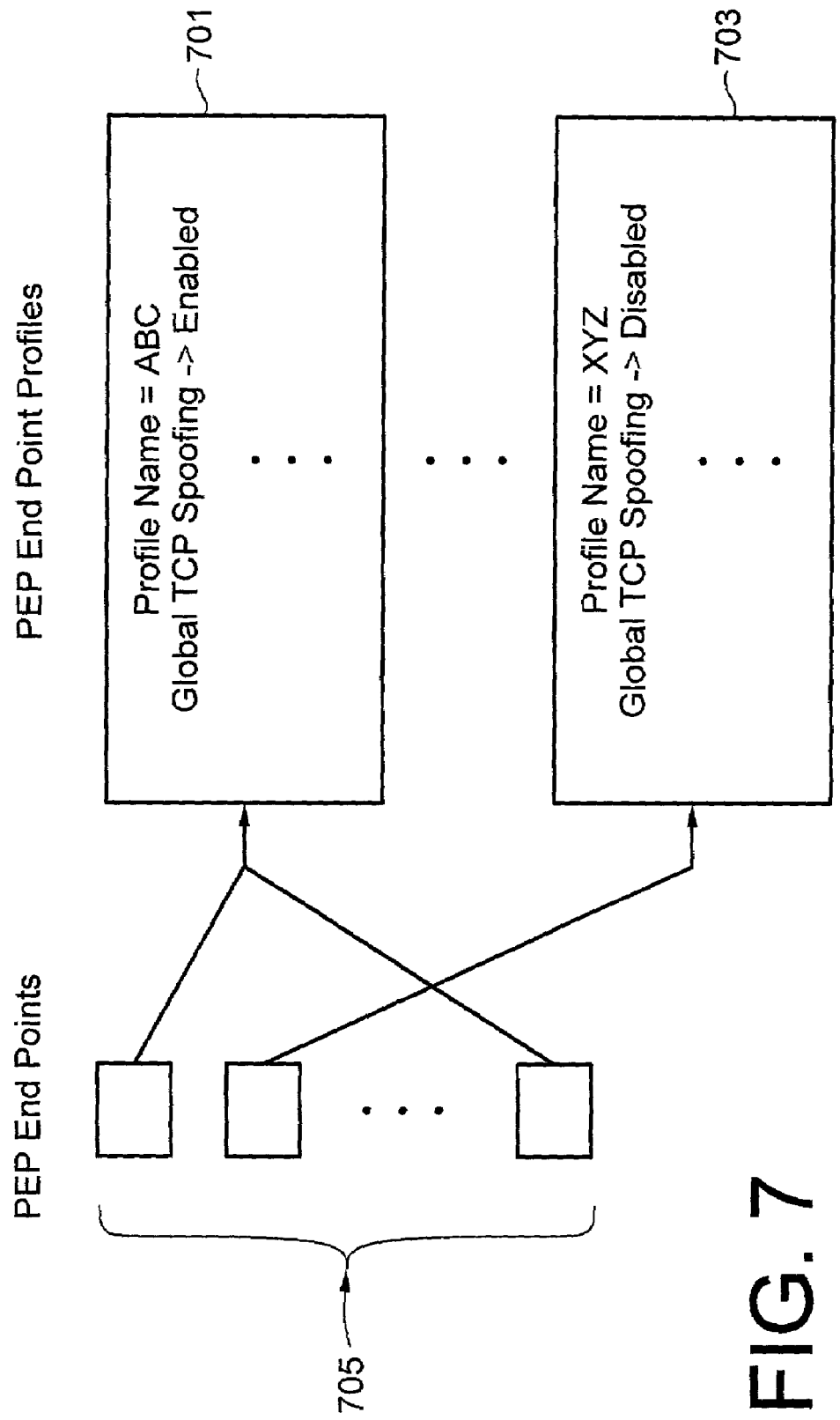
FIG. 7 is a diagram of PEP end point profiles utilized in the platform of FIG. 2.

FIG. 7 shows the relationship between PEP End Points and PEP End Point profiles, in accordance with an embodiment of the present invention. PEP parameters are primarily configured via a set of profiles 701 and 703, which are associated with one or more PEP end points 705. In an exemplary embodiment, PEP parameters are configured on a per PEP End Point basis, such as whether TCP spoofing is globally enabled. These parameters are configured in the PEP End Point profiles 701 and 703. It is noted that parameters that apply to specific PEP kernels may be configured via other types of profiles. Profiles 701 and 703 are a network management construct; internally, a PEP End Point 705 processes a set of parameters that are received via one or more files.

Whenever the PEP End Point 705 receives new parameters, the platform environment compares the new parameters to the existing parameters, figures out which of the PEP kernels are affected by the parameter changes, and then passes the new parameters to the affected kernels. In an exemplary embodiment, all parameters are installed dynamically. With the exception of parameters that are component specific (such as the IP addresses of a component), all parameters may be defined with default values.

As mentioned previously, the PEP end point 210 may be implemented in a number of different platforms, in accordance with the various embodiments of the present invention. These platforms may include an IP gateway, a Multimedia Relay, a Multimedia VSAT (Very Small Aperture Terminal), and a Personal Earth Station (PES) Remote, as shown in FIGS. 8-11, respectively. In general, as discussed in FIG. 2, the PEP end point 210 defines a local LAN interface 220 an interface through which the PEP End Point 210 connects to IP hosts located at the site. A WAN interface 230 is an interface through which the PEP End Point 210 connects to other sites. It is noted that a WAN interface 230 can physically be a LAN port. FIGS. 8-11, below, describe the specific LAN and WAN interfaces of the various specific PEP End Point platforms.

The particular LAN and WAN interfaces that are employed depend on which remote site PEP End Points are being used, on the configuration of the hub and remote site PEP End Points and on any path selection rules which may be configured.

Figure 8:
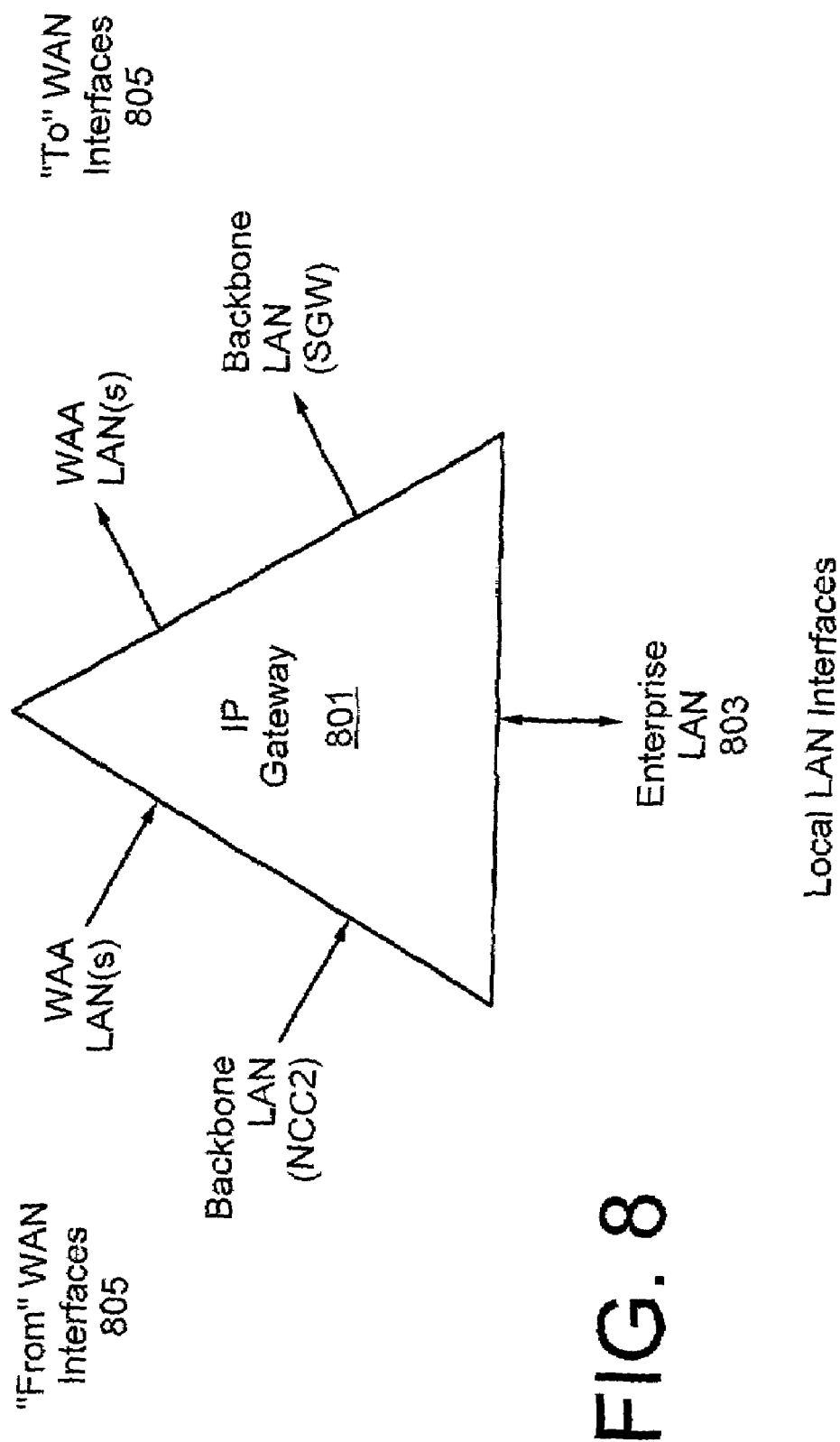
FIG. 8 is a diagram of the interfaces of a PEP end point implemented as an IP gateway, according to an embodiment of the present invention.

FIG. 8 shows the interfaces of the PEP end point implemented as an IP gateway, according to one embodiment of the present invention. By way of example, an IP Gateway 801 has a single local LAN interface, which is an enterprise interface 803. The IP Gateway 803 employs two WAN interfaces 805 for sending and receiving IP packets to and from remote site PEP End Points: a backbone LAN interface and a wide area access (WAA) LAN interface.

The backbone LAN interface 805 is used to send IP packets to remote site PEP End Points via, for example, a Satellite Gateway (SGW) and a VSAT outroute. A VSAT outroute can be received directly by Multimedia Relays (FIG. 9) and Multimedia VSATs (FIG. 10) (and is the primary path used with these End Points); however, IP packets can be sent to a PES Remote (FIG. 11) via a VSAT outroute.

Figure 9:
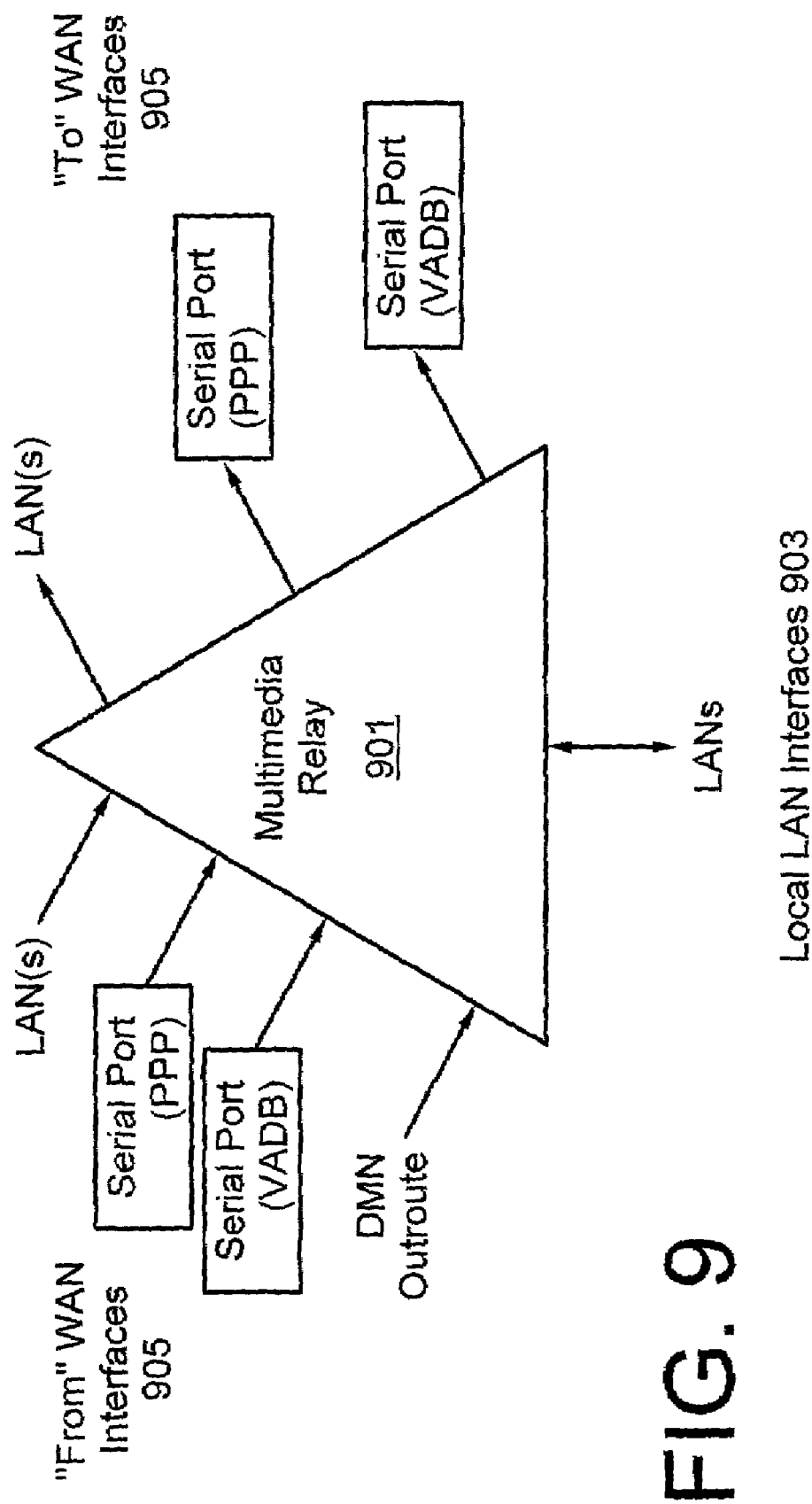
FIG. 9 is a diagram of the interfaces of a PEP end point implemented as a Multimedia Relay, according to an embodiment of the present invention.

FIG. 9 shows a Multimedia Relay implementation of a PEP end point, in accordance with an embodiment of the present invention. A Multimedia Relay has two or three local LAN interfaces 903. A Multimedia Relay 901 has up to two WAN interfaces 905 for sending IP packets to hub site PEP End Points: one of its LAN interfaces and a PPP serial port interface, and four or five interfaces for receiving IP packets from hub site PEP End Points, a VSAT out route, all of its LAN interfaces, and a PPP serial port interface. It is noted that a PPP (Point-to-Point Protocol) serial port interface and a LAN interface are generally not be used at the same time.

A Multimedia Relay 901 supports the use of all of its LAN interfaces 903 at the same time for sending and receiving IP packets to and from hub site PEP End Points. Further, a Multimedia Relay 905 supports the use of a VADB (VPN Automatic Dial Backup) serial port interface for sending and receiving IP packets to and from the hub site PEP End Points.

Figure 10:
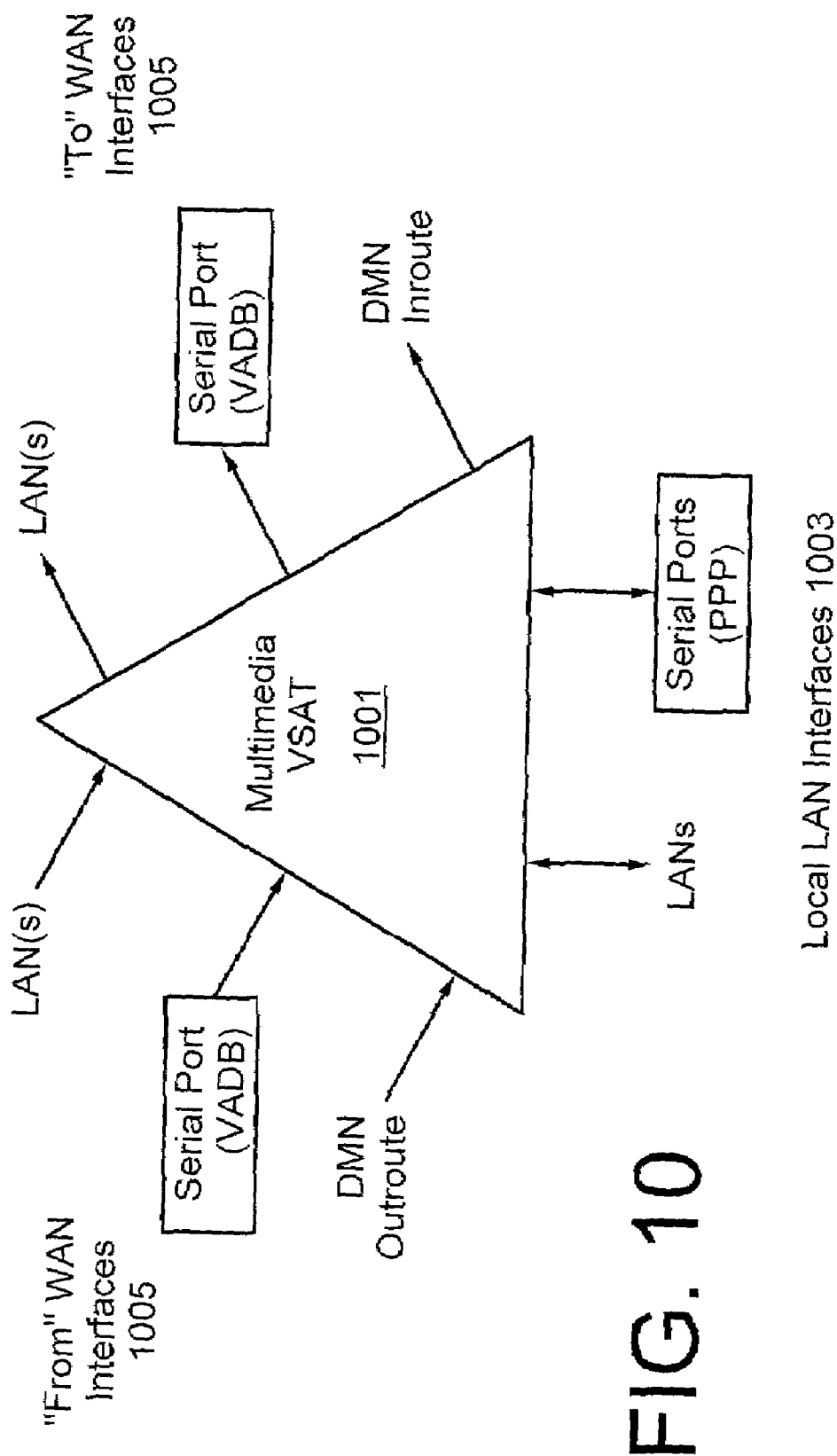
FIG. 10 is a diagram of the interfaces of a PEP end point implemented as a Multimedia VSAT (Very Small Aperture Terminal), according to an embodiment of the present invention.

FIG. 10 shows a Multimedia VSAT implementation of the PEP end point, according to one embodiment of the present invention. A Multimedia VSAT 1001, in an exemplary embodiment, has two local LAN interfaces 1003. Support for one or more local PPP serial port interfaces may be utilized. The Multimedia VSAT 1001 has two WAN interfaces 1005 for sending IP packets to hub site PEP End Points: a VSAT inroute and one of its LAN interfaces. The Multimedia VSAT 1001 thus has three interfaces for receiving IP packets from hub site PEP End Points, the VSAT outroute and both of its LAN interfaces 1003. A Multimedia VSAT 1003 may support uses of both of its LAN interfaces 1003 at the same time for sending and receiving IP packets to and from hub site PEP End Points. The Multimedia VSAT 1003 further supports the use of a VADB serial port interface for sending and receiving IP packets to and from the hub site PEP End Points.

Figure 11:
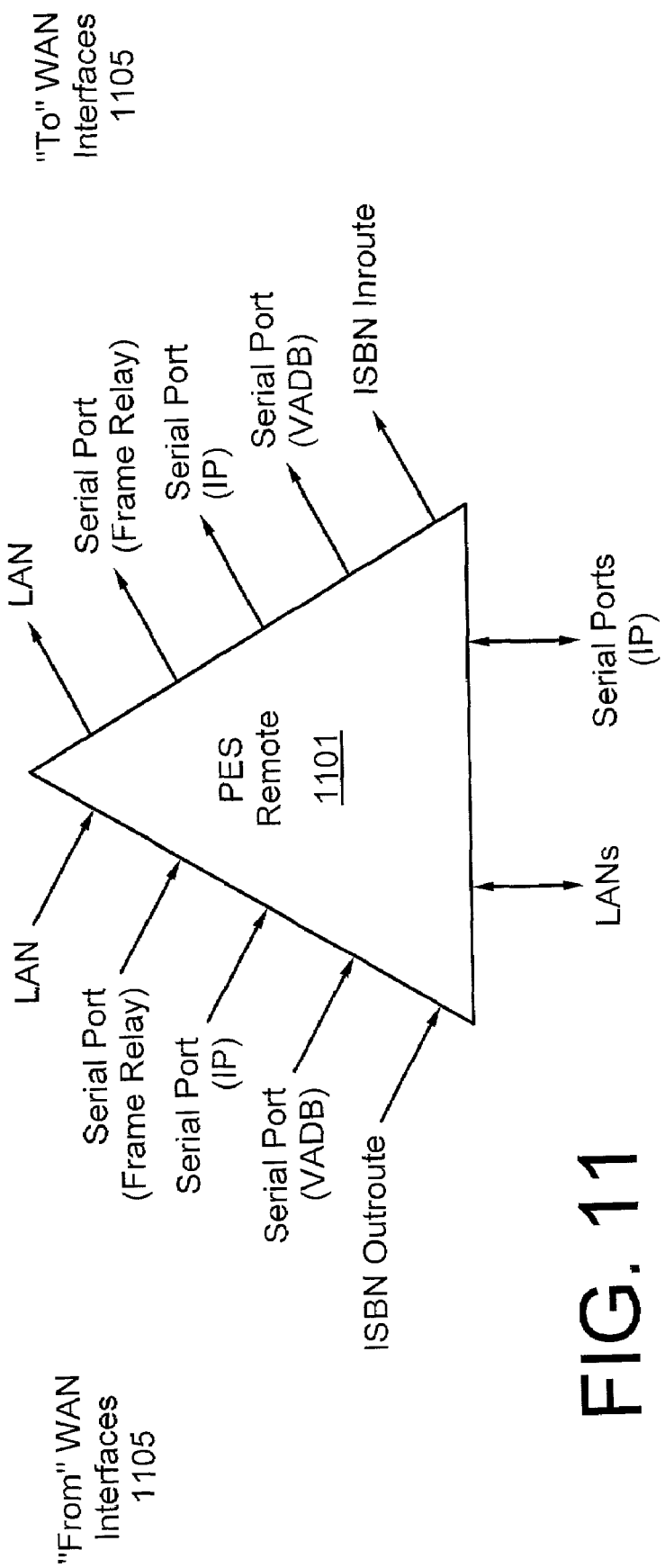
FIG. 11 is a diagram of the interfaces of a PEP end point implemented in an earth station, according to an embodiment of the present invention.

FIG. 11 shows a PES Remote implementation of a PEP end point, according to one embodiment of the present invention. A PES Remote 1101 may have a local LAN interface and/or several local IP (e.g. PPP, SLIP, etc.) serial port interfaces, collectively denoted as LAN interfaces 1103. The particular LAN interfaces 1103 depend on the specific PES Remote platform. PES Remote 1101, in an exemplary embodiment, has up to five WAN interfaces 1105 for sending IP packets to hub site PEP End Points, an ISBN inroute, a LAN interface, a VADB serial port interface, a Frame Relay serial port interface and an IP serial port interface, and up to five existing interfaces for receiving IP packets from hub site PEP End Points: an ISBN outroute, a LAN interface, a VADB serial port interface, a Frame Relay serial port interface, and an IP serial port interface. The physical Frame Relay serial port interface may be supporting multiple Permanent Virtual Circuits (PVCs); some of which are equivalent to local interfaces 1103 and some of which are WAN interfaces 1105.

The TSK 280 is responsible for all of the functions related to TCP spoofing. The TSK 280 includes at least two basic parts, a TCP stack 303 and a TCP spoofing application 301 as illustrated in FIG. 3. The TCP stack 303 can be responsible for interacting with the TCP stacks of IP hosts connected to a PEP End Point's local LAN interface(s) 803, 903, 1003, 1103. The TCP stack 303 can also implement the TCP protocol including the appropriate TCP state machines and terminates spoofed TCP connections. The TCP spoofing application 301 can sit on top of the TCP stack 303 and act as the application receiving data from and sending data to the IP host applications. The TCP spoofing application 301 can also hide the details of TCP spoofing from the TCP stack 303 as much as possible, allowing the TCP stack 303 to function as much like a standard TCP stack as possible. The TCP spoofing application 301 can also be responsible for interfacing to the BPK 282.

TSK 280 parameters can be configured via profiles. Backbone connection parameters can be configured using connectivity profiles. TCP spoofing selection parameters and spoofing parameters can be defined in TCP spoofing selection and TCP spoofing parameters profiles, respectively. TCP spoofing selection profiles can define which TCP spoofing parameters profiles are being used. The other TSK 280 parameters and which TCP-spoofing selection profile is being used can be defined in PEP End Point profiles 701, 703. Which PEP End Point profile 701, 703 is being used by a PEP End Point 705 can be configured as part of an individual PEP End Point's specific configuration.

Profiles can be a network management construct. TSK 280 may receive its parameters, except for parameters related to backbone connections, as a data structure passed to TSK 280 by the platform environment 210. Backbone connection parameters can be passed to TSK 280 by the platform environment 210 on a per backbone connection basis. The platform environment 210, in turn, can receive the parameters via files sent to it by a network manager.

The TSK 280 can receive parameters from the platform environment 210 at startup and whenever the platform environment 210 receives new parameters which include changes to TSK 280 related parameters. When TSK 280 receives new parameters, it can compare the new parameters to the existing parameters and then takes action to install the new parameters based on which parameters have changed. All parameters can be installed dynamically. In some cases the changes will only affect new TCP connections and not TCP connections already in the process of being spoofed. On the other hand, some parameter changes, such as the deletion of a backbone connection, might require that existing spoofed TCP connections be terminated. If TCP spoofing is disabled, TCP connections which are already in the process of being spoofed may be terminated because all the backbone connections will be closed when the platform environment 210 invokes TSK 280's shut down procedure.

Figure 12:
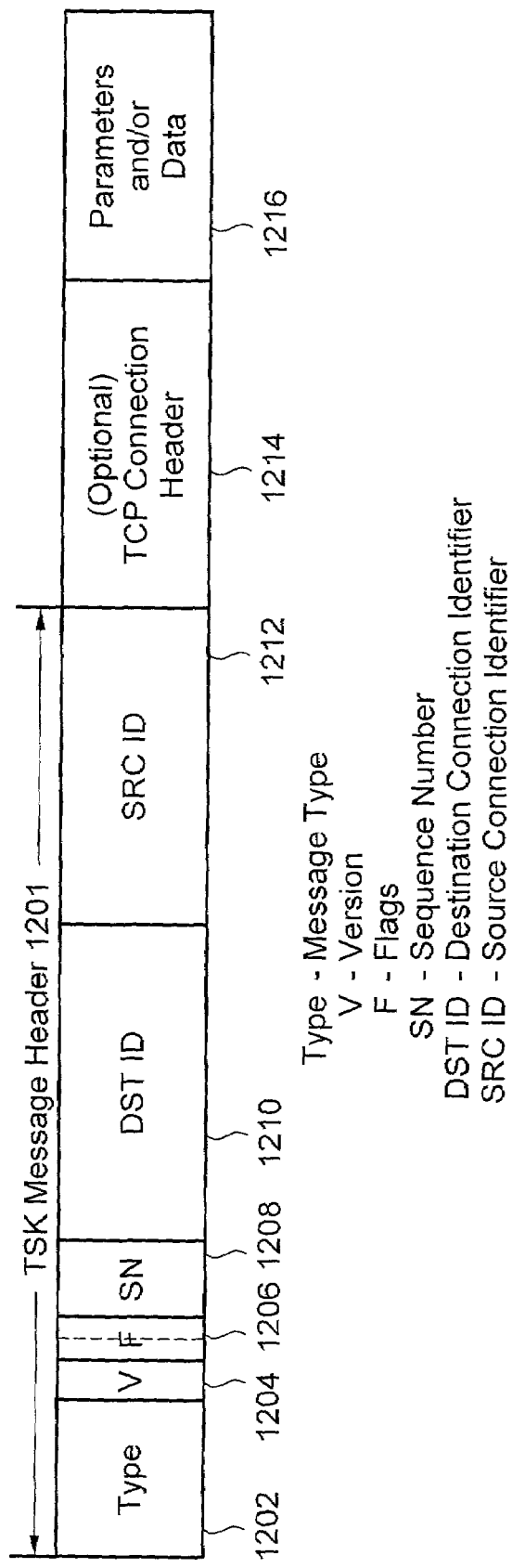
FIG. 12 is a diagram of a TCP spoofing kernel message, according to an embodiment of the present invention.

TSK peers can exchange messages in order to coordinate their spoofing functions. FIG. 12 illustrates an exemplary format of a TSK message 1200. Tables A and B describe exemplary message fields in FIG. 12. Other message formats may be used, if required for the particular application. For example, if a peer is being used in an environment where more backbone connections may exist than can be supported by a 16 bit connection identifier, a 32 bit connection identifier can be implemented instead. Table C lists exemplary reason codes associated with the various message types. Reason codes can be assigned to be unique across all message types to facilitate troubleshooting.

TABLE A

Exemplary TSK Message Field Descriptions

| Field | Size | Description |
|---|---|---|
| Message Type 1202 | 1 Byte | Indicates the type of TSK message. Exemplary message types are defined in Table B. Any message type value not defined in Table B can be reserved for future use. |
| Version 1204 | 2 Bits | Indicates the current version of the TSK "protocol". |
| Flags 1206 | 2 Bits | The flags field includes at least two flag bits: The first (MSB) flag bit can hold the PUSH flag. The second (LSB) flag bit can hold the optional TCP connection header flag. A value of 1 can indicate that the header is present. |
| Sequence Number 1208 | 4 bits | A unique sequence number can be tracked for each TCP connection being spoofed with the sequence number incremented by 1 each time a TSK message is sent. Since the PEP Backbone Protocol should guarantee in order delivery of messages, TSK may choose to use this field as additional flags. |
| Destination Connection ID 1210 | 2 Bytes | Connection identifiers. |
| Source Connection ID 1212 | 2 Bytes | Connection identifiers. |
| Optional TCP Connection Header 1214 | 12 Bytes | The TCP connection header is described below. Table C provides examples of types of TSK messages that included a TCP connection header (and when). |
| Parameters and/or Data 1216 | N Bytes | For TCP Data messages, this field can contain TCP data. For Urgent Data messages, this field can contain a TCP Urgent Pointer followed by TCP data. For all other types of messages, this field can contain parameters which are specific to the Message Type. |

TABLE B

Exemplary TCP Connection Related TSK

| Message Type 1202 | Value | TCP Connection Header 1201 Included When: | Description |
|---|---|---|---|
| TCP Data (TD) | 0 | DST ID = 0xFFFF and Header Fits | A TD message can carry the data from a TCP connection data segment. |
| Urgent Data (UD) | 1 | DST ID = 0xFFFF and Header Fits | A UD message can carry the data from a TCP connection <URG> segment. A UD message can include an extra two byte header in front of the data to carry the TCP Urgent Pointer field. |
| Connection Request (CR) | 2 | Always | A CR message can be sent when a TCP <SYN> segment is received to trigger the sending of a TCP <SYN> segment by the TSK peer. |
| Connection Established (CE) | 3 | DST ID = 0xFFFF (or Always) | A CE message can be sent when a TCP <SYN, ACK> segment is received to indicate successful establishment of the TCP connection. |
| Connection Terminated | 4 | Always | A CT message can be sent to terminate a TCP connection. A CT message may include a reason code which indicates the reason for the termination. Exemplary termination reason codes are listed in Table C. |
| No Resources (NR) | 5 | Always | An NR message can be sent to refuse a TCP connection due to a lack of resources for spoofing the connection. An NR message can include a reason code which indicates which resource is unavailable. Exemplary no resource reason codes are listed in Table C. |
| Termination Pending (TP) | 6 | DST ID = 0xFFFF (or Always) | A TP message can be sent to indicate that a TCP <FIN> segment has been received and termination of the TCP connection is pending. |

TABLE C

Exemplary Termination Reason Codes

| Message Type(s) | Description |
|---|---|
| CT | Connection terminated due to a <RST> segment received from the local host. |
| CT | Connection terminated due to no response from local host. |
| CT | Connection terminated due to the detection of a simultaneous startup condition using different backbone connections. |
| CT | Connection refused because the previous incarnation of the same connection has not yet terminated. |
| NR | Connection refused because no CID (i.e., CCB mapping table entry) for the connection is available. |

Figure 13:
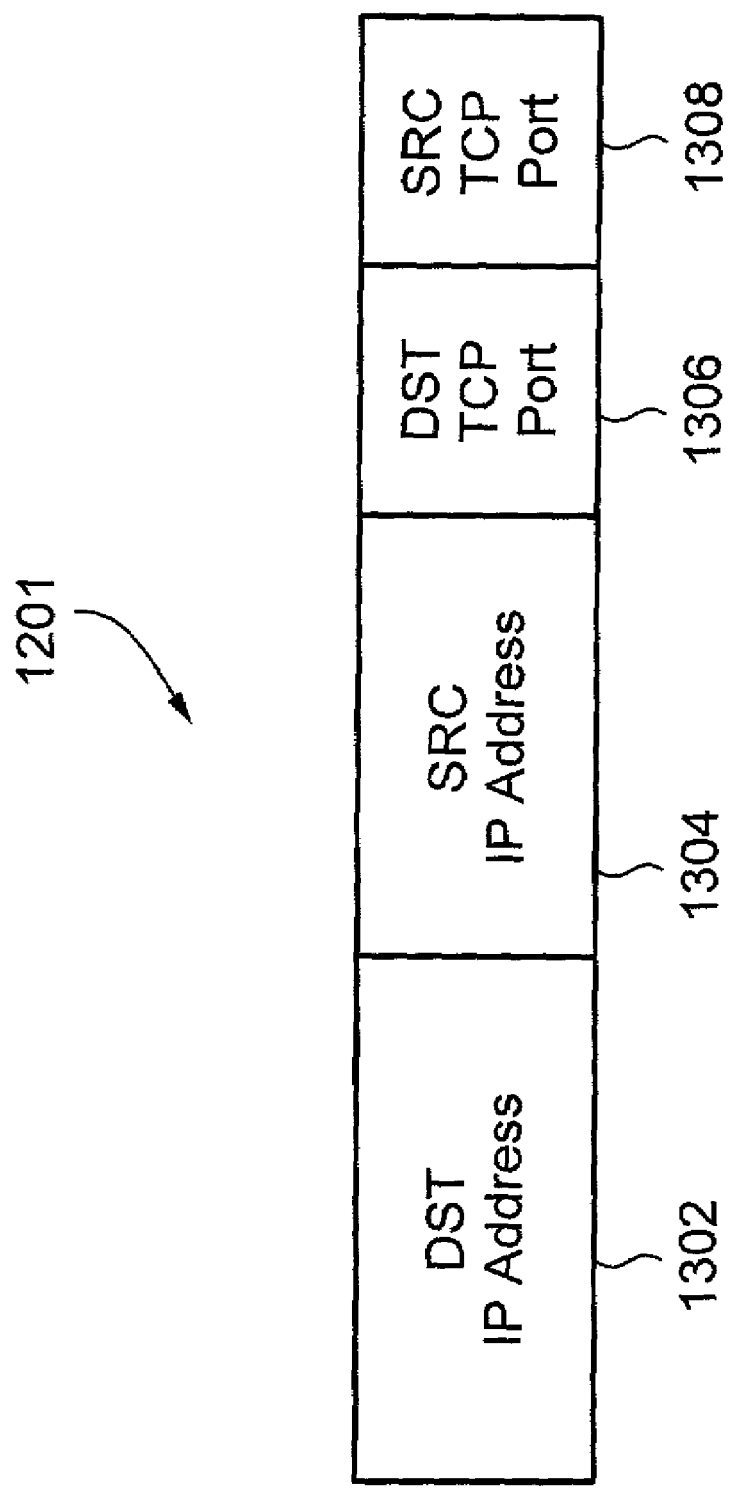
FIG. 13 is a diagram of a TCP connection header, according to an embodiment of the present invention.

FIG. 13 illustrates an exemplary format of a TCP connection header 1201. Table D describes exemplary fields of the TCP connection header 1201. A TCP connection header 1201 may contain the IP addresses 1302, 1304 and TCP port numbers 1306, 1308 which uniquely identify a TCP connection. TCP connection headers 1201 can be included in a TSK message when the TCP connection identifier used as the destination connection identifier field in the TSK message is set equal to 0xFFFF. A TCP connection header 1201 need not be used in a Data or Urgent Data message unless the data segment size is at least 12 bytes (the size of an exemplary header) smaller than the selected maximum segment size being used for the TCP connection. This can ensure that TSK 280 does not accidentally generate a TSK message which is larger than can be handled by the path being used by the backbone connection to the TSK peer. TCP connection headers 1201 can also be included in TSK control messages to help ensure that a control message is mapped to the correct TCP connection. This may not be necessary for some types of TSK control messages but including the header can simplify control message processing and may also help when debugging problems.

There are at least two types of connection identifiers used by the TSK 280. A TSK peer connection identifier (TID) can be assigned to each TSK backbone connection. A TCP connection identifier (CID) can be assigned to each spoofed TCP connection. Exemplary TIDs and CIDs are described below.

TABLE D

Exemplary TCP Connection Header Field Descriptions

| Field | Size | Description |
| --- | --- | --- |
| Destination IP Address 1302 | 4 Bytes | The destination IP address of the TCP connection, i.e. the IP address of the host not local to the sender of the TSK message. |
| Source IP Address 1304 | 4 Bytes | The source IP address of the TCP connection, i.e. the IP address of the host local to the sender of the TSK message. |
| Destination TCP Port 1306 | 2 Bytes | The destination TCP port number of the TCP connection, i.e. the source TCP port number of the host not local to the sender of the TSK message. |
| Source TCP Port 1308 | 2 Bytes | The source TCP port number of the TCP connection, i.e. the source TCP port number of the host local to the sender of the TSK message. |

Figure 14:
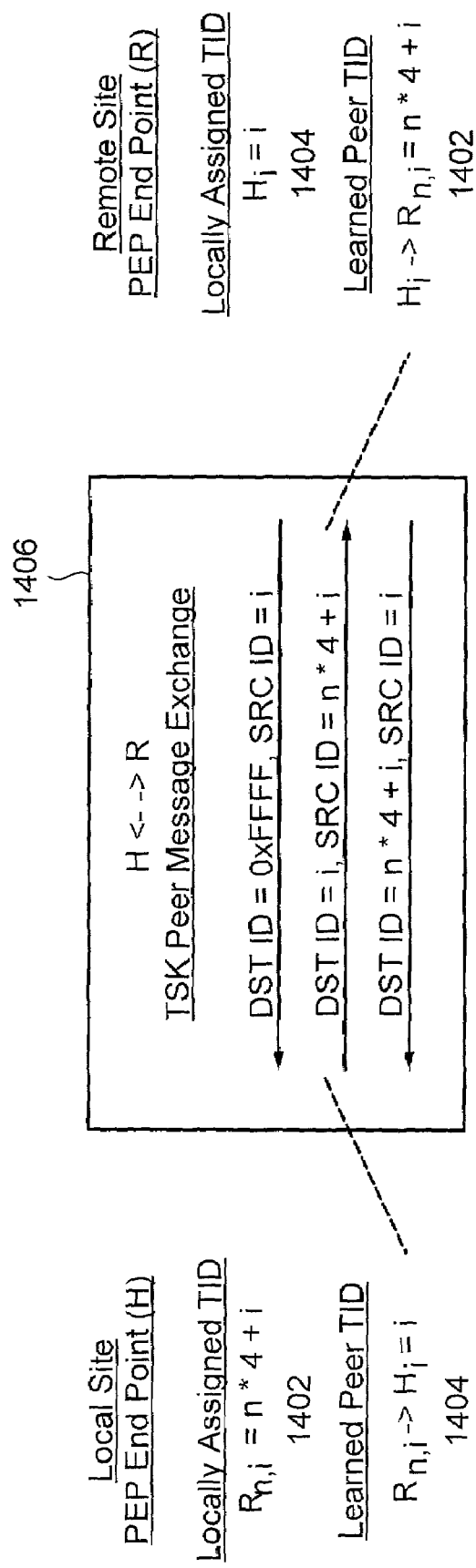
FIG. 14 is a diagram of TSK peers learning TSK backbone connection identifiers, according to an embodiment of the present invention.

FIG. 14 illustrates the learning of TSK backbone connection identifiers by a TSK peer as described below.

A TSK 280 which has more than one configured TSK peer can use a unique, non-zero local TSK peer connection identifier (TID) to each of its TSK peers. The TID can be assigned by the platform environment 210 in order to allow it correspond to the environment's identifier for the peer. The value assigned can be used as an index into a table of TSK peer control block pointers. The local TID 1402, 1404 can be used by TSK 280 as the source connection ID value in messages which are not associated with any particular TCP connection.

Since there may be a one to one mapping between TIDs and backbone connections (by definition), a backbone connection's handle, assigned by the platform environment 210, can simply be used as the backbone connection's TID. The TID is used as an index into a table of TSK backbone connection control block (TCB) pointers, the TCB mapping table 1406. The local TID 1402, 1404 is used by TSK as the source connection ID value in messages which are not associated with any particular TCP connection, e.g., TSK Peer Parameter (TPP) messages. TSK 280 learns the TID being used for the backbone connection by its TSK peer when it receives a TPP message from its peer and uses this value as the destination connection ID value in messages sent across the backbone connection which are not associated with any particular TCP connection. (Learning the TID being used by a TSK peer is not a critical requirement for communication. Learning the peer TID is only done as a performance optimization to allow easy mapping of messages to TCBs and for east of debugging. Note that 0xFFFF should not be used as a TID because 0xFFFF is sent as the destination connection ID when TSK 280 has not yet learned its TSK peer's local TID.

When a TSK 280 needs to forward a message for a TCP connection prior to learning the TCP CID assigned to the connection by its TSK peer, the TSK 280 can set the destination connection ID field in the TSK message to 0xFFFF (exemplary). (Thus, 0xFFFF is not a valid TCP CID.) And, if doing so does not cause the size of the message to exceed the TCP connection's selected maximum segment size, TSK 280 also can include a TCP connection header 1201. Note that this does not necessarily apply only to Connection Request messages. If the three-way handshake is being spoofed, TSK 280 may need to forward data messages to its TSK peer prior to receiving the Connection Established message. And, if an error occurs, TSK 280 may need to send a Connection Terminated (CT) message to its TSK peer to abort a connection.

Figure 15:
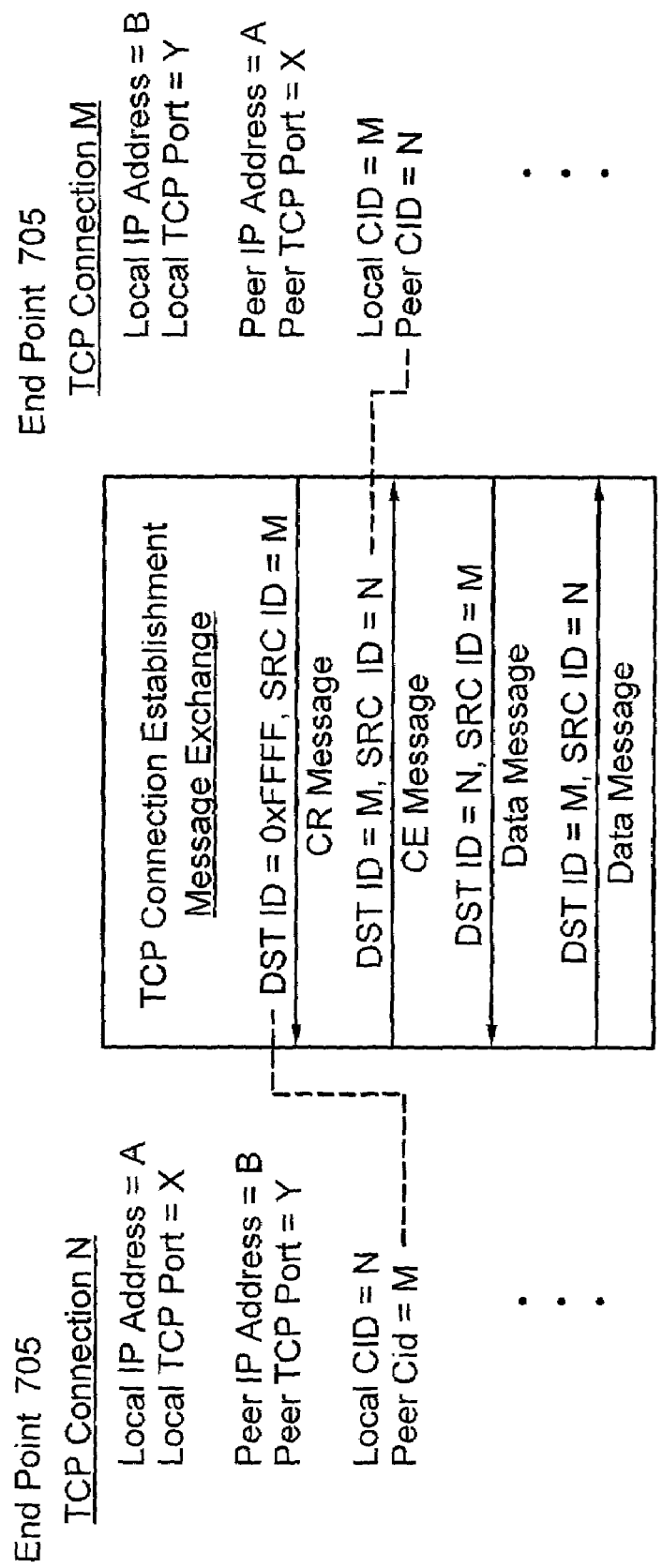
FIG. 15 is a diagram illustrating the assignment of TCP connection identifiers, according to an embodiment of the present invention.

When TSK 280 receives a TSK TCP connection related message with a destination connection ID of 0xFFFF, TSK 280 can use the TCP connection header 1201, if present, and the source connection ID 1212 in the message, combined with the information regarding which backbone connection the TSK message was received from (i.e. the handle passed to TSK 280 by the BPK 282 with the message), to find the appropriate CCB for the connection. The information in the TCP connection header 1201 can be used to find the CCB using a hash function. When there is no TCP connection header 1201, the source connection ID 1212 can be used along with TSK's active hash list for the backbone connection to find the CCB. If there is no CCB and the TSK message is a CR message, a CCB can be allocated. If the message is not a CR message and there is no CCB, the message can be discarded. These methods for looking up a message's CCB can be less efficient than using the local TCP CID. But, these methods may only need to be used for a few messages at the start of a connection. FIG. 15 illustrates the assignment of TCP connection identifiers.

At startup, the platform environment 210 calls the TSK 280 to open each backbone connection that it needs to each TSK peer. A separate call may be made for each backbone connection. The platform environment 210 informs the TCP Spoofing Kernel 280 when the backbone connection becomes active. TSK 280 should never close a backbone connection unless explicitly requested to do so by the platform environment 210.

Every time that TSK 280 is informed that a backbone connection has transition from DOWN to UP, TSK 280 sends a TSK Peer Parameters message to its TSK peer. A TPP message is used to send resource availability information to the PEP End Point peer. The following information may be sent in a TPP message:

The amount of buffer space available for spoofing in the WAN to LAN direction for this backbone connection;

The local number of TCP connection control blocks available for spoofing for this backbone connection.

These values are provided by the platform environment 210 when the backbone connection is opened (and stored in the backbone connection's TCB). Until a PEP End Point 705 has received at least one TPP message from its peer for a given backbone connection, no spoofed TCP connections will be able to use the connection.

If the amount of WAN to LAN buffer space or the number of CCBs available for spoofing on a backbone connection changes, the platform environment 210 will inform TSK 280 of the changes. Whenever TSK 280 receives an indication that one or both of these parameters has changed, the new values for the parameters are stored in the backbone connection's TCB and a new TPP message is sent to the TSK peer.

The TSK 280 uses at least two types of control blocks. TSK backbone connection control blocks are used to store information related to backbone connections established to TSK peers. TCP connection control blocks are used to store information with respect to TCP connections which are being spoofed by TSK 280.

TSK 280 can support some number of backbone connections to TSK peers, determined by the particular PEP End Point platform software build. In general, this number is equal to the number of backbone connections that the PEP End Point platform as a whole supports. Backbone connections may be used for things other than TCP spoofing and, therefore, TSK 280 can support fewer backbone connections than are supported by the PEP End Point 705 as a whole. At startup, the platform environment 210 calls TSK 280 to add backbone connections to the TCP Spoofing Kernel's configuration. For each backbone connection, the platform environment 210 provides the handle that it will use for the connection, derived from the PEP End Point peer's peer index and the priority of the connection. After startup, the platform environment 210 may call TSK 280 to add, change the parameters of, or delete a backbone connection.

When the platform environment 210 calls TSK 280 to open (add) a backbone connection, the environment 210 provides a TCB for the backbone connection. The environment 210 allocates the TCB to allow for platform specific memory management of the TCBs. For example, an IP Gateway 801 can be designed to support up to 16,000 remote site PEP End Point peers (since an IP Gateway can currently support up to 16,000 remote IP subnets) and 64,000 backbone connections. Therefore, up to 64,000 TCBs may be required. On the other hand, a Multimedia Relay, Multimedia VSAT or PES Remote is likely to only have a few PEP End Point peers and, thus, only a few TCBs. Therefore, the IP Gateway implementation of TCB management is likely to be more complex than the Multimedia Relay, Multimedia VSAT or PES Remote implementation of TCB management.

Figure 16:
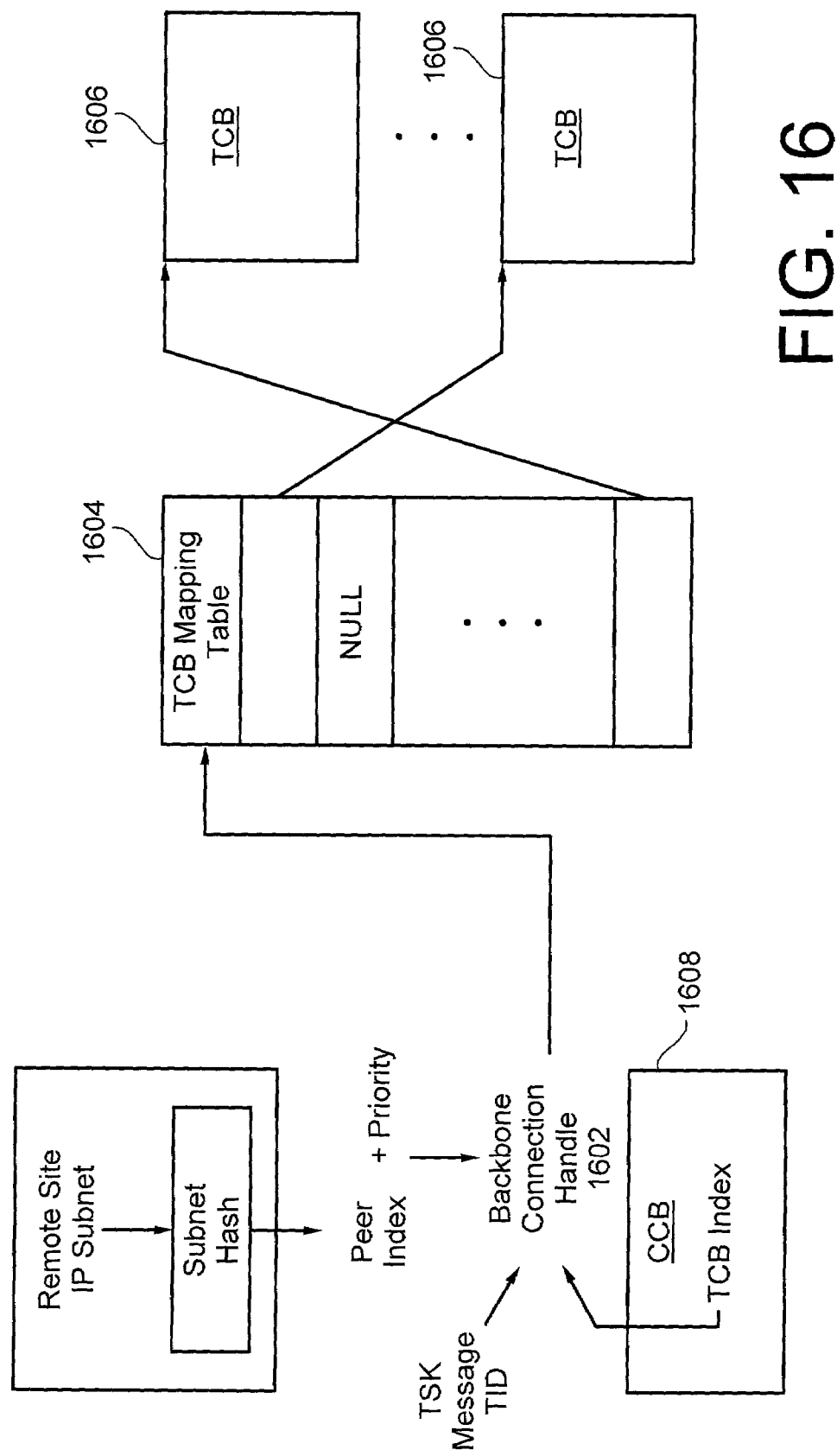
FIG. 16 is a diagram of TCB access via a TCB mapping table, according to an embodiment of the present invention.

TCBs are provided to the TSK 280 by the platform environment 210 when backbone connections are opened. TCBs are returned by TSK 280 to the platform environment 210 when backbone connections are closed. As indicated elsewhere, the allocation and deallocation of TCBs is done by the platform environment 210 in order to allow the use of an allocation strategy (e.g., dynamic versus static) appropriate for the particular platform.) A TCB mapping table, created and maintained by TSK 280, is used to access allocated TCBs. The size of the mapping table (and the number of TCBs required) is determined by the software build of the PEP End Point 705. The TSK backbone connection handle provided by the platform environment 210 is used as the index into the mapping table with the indexed table entry pointing to the TCB. This is illustrated in FIG. 16. The handle 1602 is passed by the environment 210 to TSK 280 when the backbone connection is referenced (either directly or by the way of a TCP connection's CCB). The handle is also passed to TSK 280 by the BPK 282 whenever a TSK message is received from the handle's backbone connection. The handle is also used as the TSK backbone connection identifier (TID) used as the source connection ID value in TSK messages sent to the TSK peer.

A TCB 1606 is used to store the configuration information passed to the TSK 280 by the platform environment 210 about the backbone connection. It also includes the connection's current state (UP or DOWN) and a pointer to the head and tail of the linked list of CCBs belonging to TCP connections which are currently using the backbone connection. Access to the list of CCBs may be required in order to find the TCP connections which are affected when backbone connections fail or are deleted.

Connection control blocks 1608 can be used to store information related to specific TCP connections. CCBs 1608 can be managed by the platform environment 210 because many details of their management are platform specific. The platform environment 210 can provide mechanisms for allocating and deallocating CCBs and a function for mapping a received TCP segment to its corresponding CCB. When a TCP segment is passed to the TSK 280, the platform environment 210 can pass a pointer to the appropriate CCB 1608 to TSK 280 along with the TCP segment. A NULL pointer can be passed if there is no CCB 1608 currently associated with the particular TCP connection. The mapping of received TSK messages to CCBs, however, can be done by TSK itself.

TSK 280 can support some number of CCBs 1608, determined by configuration and/or by compilation as appropriate for the particular PEP End Point 705 platform and software build. In order for a TCP connection to be spoofed, a CCB 1608 should be available in both TSK peers. Ideally, the number of CCBs 1608 will be large to ensure that all TCP connections which the operator desires to be spoofed can be spoofed. In practice, the memory constraints of some of PEP End Point 503 platforms may limit the number of CCBs 1608 such that occasionally a TCP connection cannot be spoofed because no CCB 1608 is available. When a TCP connection which should be spoofed cannot be spoofed because of a lack of CCB 1608, an appropriate statistic is incremented and the TCP connection is carried unspoofed. TSK peers exchange information on the number of CCBs 1608 available for spoofed TCP connections using a particular backbone connection at startup (and whenever parameters change or the backbone connection restarts) via TSK Peer Parameters messages. The smaller value of the two TSK peers is then used as the limiting value for that backbone connection. Both TSKs 280 track the number of CCBs 1608 currently allocated (per backbone connection). If a new TCP connection is detected but the current number of CCBs 1608 allocated (for this backbone connection) is at the "negotiated" limit, the TSK 280 treats the connection as if no CCB 1608 is available (even if one is).

Because of propagation delay or because the PEP End Point is sharing its pool of CCBs 1608 among all of its peers, it is possible for a CCB 1608 to be available when a TCP <SYN> segment is received by a TSK 280 but for a corresponding CCB 1608 to not be available at the TSK peer. The handling of this error scenario is described below.

Unlike TCBs 1606 which can be accessed via the TCB mapping table 1604 both for TCP segments received from the local LAN and for TSK messages received from a backbone connection, CCBs 1608 may require different mechanisms for being accessed via TCP segments versus TSK messages. Exemplary mechanisms are described below.

CCBs 1608 which are not currently associated with any TCP connection can be stored by the platform environment 210 in a CCB free pool. Free CCBs can be stored using various platform dependent methods. A first method is a pool of memory from which CCBs are created using a malloc function or equivalent. With this method, the number of free CCBs 1608 can be tracked numerically or via the amount of buffer space set aside for use in creating CCBs 1608. CCBs 1608 can be returned to the free pool using a free function or equivalent. A second method is by means of a FIFO queue. With this method, all of the CCBs 1608 are created at platform startup and then chained together using their next CCB pointers. The CCB next CCB pointer is described below. A CCB 1608 can be allocated by removing it from the head of the FIFO queue and a CCB 1608 can be freed by placing it at the end of the FIFO queue.

A CCB 1608 which is associated with a TCP connection can be considered active. Active CCBs 1608 are referenced in various ways. For mapping TSK messages received from its TSK peer to CCBs 1608, TSK 280 can use a CCB mapping table. The CCB mapping table can also be used by TSK 280 in a round robin fashion to access CCBs 1608 to check for TCP connection timeouts. For mapping TCP segments received from the local host to CCBs 1608, a CCB hash function 1702 can also be used to find CCB pointers. The CCB hash function 1702 can also be used, in some cases, to find the CCBs for received TSK messages when the CCB mapping table cannot be used.

Figure 17:
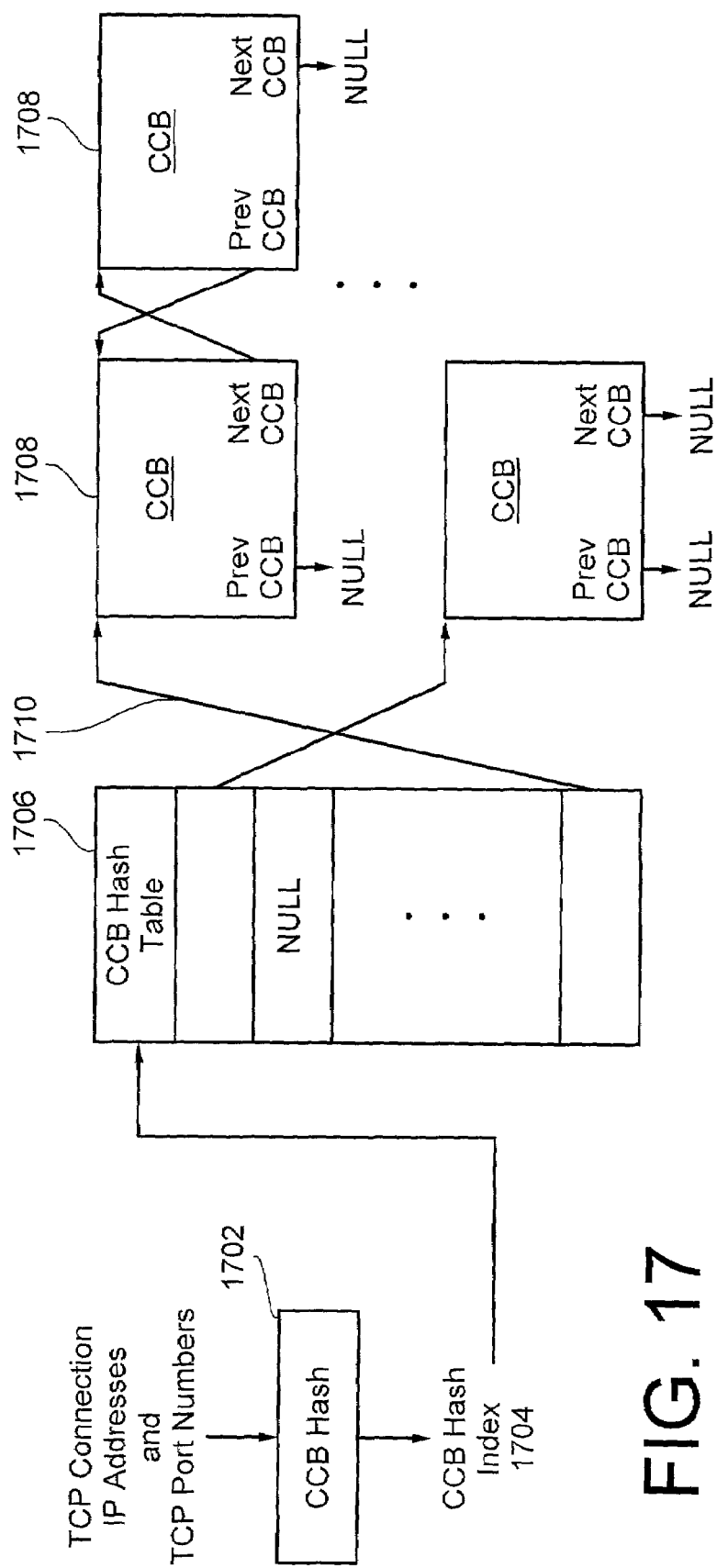
FIG. 17 is a diagram illustrating CCB access via a CCB hash function, according to an embodiment of the present invention.

For being accessed when a TCP segment is received from the local LAN, a hash function 1702 can be used. The hash function 1702 produces an index 1704 into a CCB hash table 1706. The CCB hash table 1706 points to a doubly linked list of CCBs 1708 which match the hash value. Each CCB 1608 can include a next CCB pointer field which is used by the platform environment 210 to implement the linked list. FIG. 17 illustrates CCB access via the CCB hash function 1702. The maintenance of the CCB pointers 1710 used by the hash function 1702 may be the responsibility of the platform environment 210. The platform environment 210 can simply pass a pointer to the appropriate CCB to the TSK 280 along with a TCP segment it passes to TSK 280. The environment 210 can also provide a function call interface which TSK 280 can call to use the hash function itself. This interface can be used by TSK 280 to find a CCB 1608 using the information in the TCP connection header 1201 of a received TSK message 1200.

The fact that the platform environment 210 is responsible for managing the CCB hash table 1706 means that the platform environment 210 should have access to the some of the fields in the CCB 1608. To keep the platform environment 210 from needing to know the complete format of the CCB 16087, the fields in the CCB 1608 which are accessible to the platform environment 210 can be placed at the front of the CCB 1608. The platform environment 210 may then be responsible for maintaining the following exemplary CCB fields:
the next and previous CCB pointer;
the IP addresses and TCP port numbers which uniquely identify the TCP connection; and
the backbone connection handle used to map to the TCB of the backbone connection being used to carry this spoofed connection (i.e. the TID of the peer).

In general, the IP addresses and TCP port numbers of received TCP segments can be used as input into the CCB hash function 1702. However, the hash function 1702 used can be platform specific. For example, because it will be supporting a large number of TCP connections to different remote sites, the IP Gateway 801 hash function should give emphasis to the subnet portion of the IP addresses. However, the subnet portion of the IP addresses can be the same for all of the TCP connections associated with a particular remote site. Therefore, a remote site platform environment 210 should give more emphasis to the host part of the IP addresses.

CCBs 1608 can be allocated and deallocated by the TSK 280 via function calls to the platform environment 210. A CCB mapping table 1802, created and maintained by TSK 280, can be used to access CCBs 1608 for purposes of timer processing and when TSK messages are received from the BPK 282. A mapping table 1802 can be used to support the TSK peers. The size of the mapping table 1802 and the number of CCBs 1608 required can be determined by the software build of the PEP End Point 705. In a given PEP End Point 705, the number of entries in the mapping table 1802 and the number of CCBs 1608 available may be the same since TSK 180 should not use a CCB 1608 which it cannot access via the mapping table 1802 and TSK 280 does not need mapping table entries into which it cannot place a CCB 1608. Each entry in the mapping table 1802 has at least two fields:
a CCB pointer; and
a next entry index.

The next index can be used to implement linked lists of CCBs. At least two types of linked lists can be maintained using the next entry index:
a free entry list 1804; and
active CCB lists 1806.

The free entry list can store the list of free mapping table entries. TSK 280 can maintain a pointer to the front and rear of the list and uses these pointers to implement a free entry FIFO queue. When a new CCB 1608 is allocated, an entry from the free entry list 1804 can also be allocated. TSK 280 uses the index of the mapping table entry as the TCP connection's local TCP CID. When a CCB 1608 is deallocated, the CCB's mapping table 1802 entry can be returned to the free list 1804.

Active CCB lists 1806 can be used to chain together the CCBs 1608 of TCP connections which are currently active. The CCBs 1608 of all of the TCP connections which are sharing a particular backbone connection can be linked together. The indices for the first and last entries of a backbone connection's CCB linked list can be stored with the backbone connection state in the TCB associated with the backbone connection. The active CCB lists 1806 can be implemented as doubly linked lists in order to make it easier to remove entries from the middle of the list. However, in the interests of conserving space in the CCB mapping table 1802 and keeping the list maintenance software simpler, singly linked lists 1806 may be used. Active CCB lists can be used for at least two purposes:
to find all of the CCBs 1608 affected by the failure or deletion of a backbone connection. When a backbone connection fails or is deleted, all of the TCP connections using the backbone connection can be terminated; and
to find the appropriate CCB 1608 when a TSK message is received with a destination TCP CID value of 0xFFFF but without a TCP connection header.

For the latter case, TSK 280 can walk down the active CCB list 1806 of the backbone connection from which the TSK message was received looking for a CCB 1608 with a peer CID equal to the source connection ID in the TSK message.

A CCB 1608 can be removed from its active CCB list 1806 when the CCB is deallocated.

Figure 18:
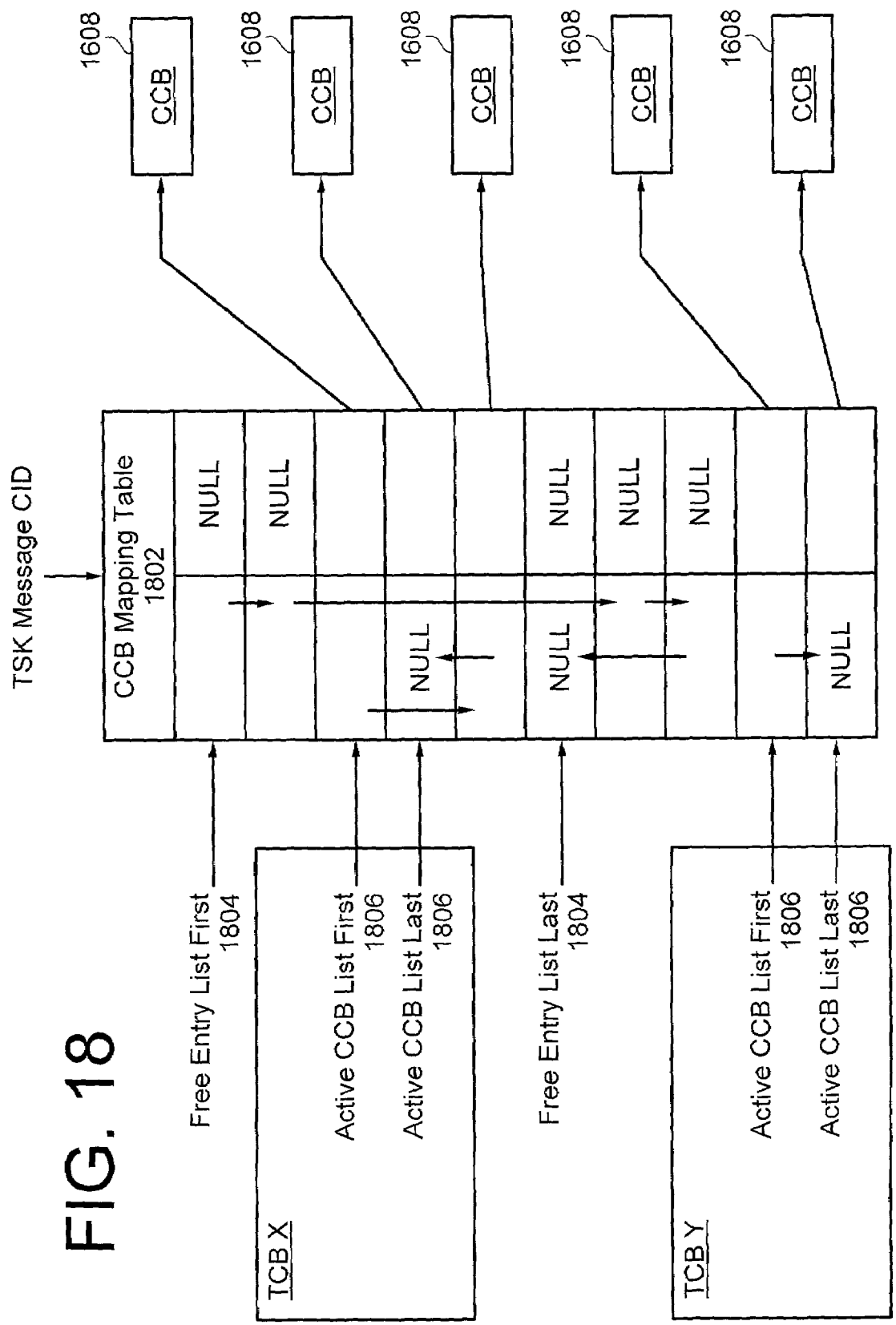
FIG. 18 is a diagram illustrating CCB access via a CCB mapping table, according to an embodiment of the present invention.

FIG. 18 illustrates the use of the CCB mapping table 1802.

A CCB 1608 can be allocated when a new TCP connection is detected which needs to be spoofed. TSK 280 allocates a free entry from the CCB mapping table 1802 and then calls the platform environment 210 to allocate the CCB 1608, providing the IP addresses and TCP port numbers which uniquely identify the connection. The platform environment 210 can allocate a CCB 1608 from the free CCB pool and can use the provided IP addresses and port numbers to determine the correct hash table entry for the CCB 1608. The CCB pointer can then be added to the hash table 1706 (chained to the end of any existing CCBs already mapped to this hash table entry in the event of a hash table collision). Finally, before passing the CCB 1608 back to TSK 280, the platform environment 210 can fill in the CCB's TCB index value. When TSK 280 receives the CCB 1608, it uses the TCB index in the CCB 1608 to find the TCB 1606. The CCB 1608 is then linked into the active CCB list 1806 for the backbone connection associated with the TCP connection's priority. When allocating a CCB 1608 for a new TCP connection detected from the local LAN, before actually placing the CCB 1608 into the CCB mapping array, TSK 280 first checks to make sure that the backbone connection is up. If the backbone connection is down, the connection cannot be spoofed and the CCB 1608 for the connection is returned to the platform environment 210.

When a CCB 1608 is deallocated, it can be dequeued from its active CCB list 1806, its CCB mapping table entry can be returned to the free entry list 1804 and the CCB 1608 can be returned to the platform environment 210. The environment 210, in turn, can remove the CCB 1608 from the CCB hash table 1706 and return the CCB 1608 to the free CCB pool.

The total number of CCBs 1608 available in a PEP End Point platform 705 is configurable. The value may actually be specified in terms of the number of CCBs 1608 available per PEP End Point 705 peer, as part of a PEP End Point profile 701, 703. However, each PEP End Point 705 platform software build will have some maximum number of CCBs 1608 it can support. If the operator configures the number of CCBs 1608 to be larger than the number supported by the software build, the smaller number will be used and an event may be posted to alert the operator that this has occurred. However, in a PEP End Point 501, where the CCB pool is shared among all of the peers, the operator may intentionally configure the per peer CCB limit such that multiplying the limit by the number of peers would require more CCBs 1608 than actually exist to improve performance by statistically sharing the CCBs 1608.

Having the number of CCBs 1608 in a PEP End Point 705 be configurable allows the operator to control the point at which TCP connections stop being spoofed. The total number of TCP connections being carried by the system can reach a point where the total amount of bandwidth divided by the number of TCP connections actively using it is less than the throughput possible for each TCP connection without TCP spoofing. Therefore, the operator may want to set the number of CCBs 1608 such that spoofing only occurs when performance will be improved. However, TCP spoofing performance improvement is not limited to just high data throughput. TCP spoofing includes spoofing the TCP three-way handshake, as discussed above regarding FIG. 4A. Depending on the applications being used, the operator may decide that spoofing the three-way handshake is useful even when throughput is limited by the presence of a large number of TCP connections. In addition, for spoofed TCP connections, when resources (e.g., buffer space) are low, flow control can be applied to spoofed TCP connections (by shrinking the TCP windows being advertised by the PEP End Point 705). This is not possible for unspoofed TCP connections.

In addition to the total number of PEP End Point CCBs 1608, the operator can also configure the percentage of the available CCBs 1608 which can be used with the backbone connection for each priority. This allows the operator to reserve CCBs 1608 for use by higher priority TCP connections.

When a TCP segment is received from the local LAN, the platform environment 210 can use the CCB hash function 1702 to find the CCB 1608 associated with the TCP connection and passes a pointer to this CCB 1608 to the TSK 280 along with the TCP segment. An index into the TCB mapping array stored in the CCB 1608 can then used by TSK 280 when it wants to reference the TCB 1606 associated with the backbone connection being used to spoof the TCP connection. For a TCP segment received from the local LAN, TSK 280 shouldn't need to access the TCB 1606 first to find the connection's CCB 1608.

Figure 19:
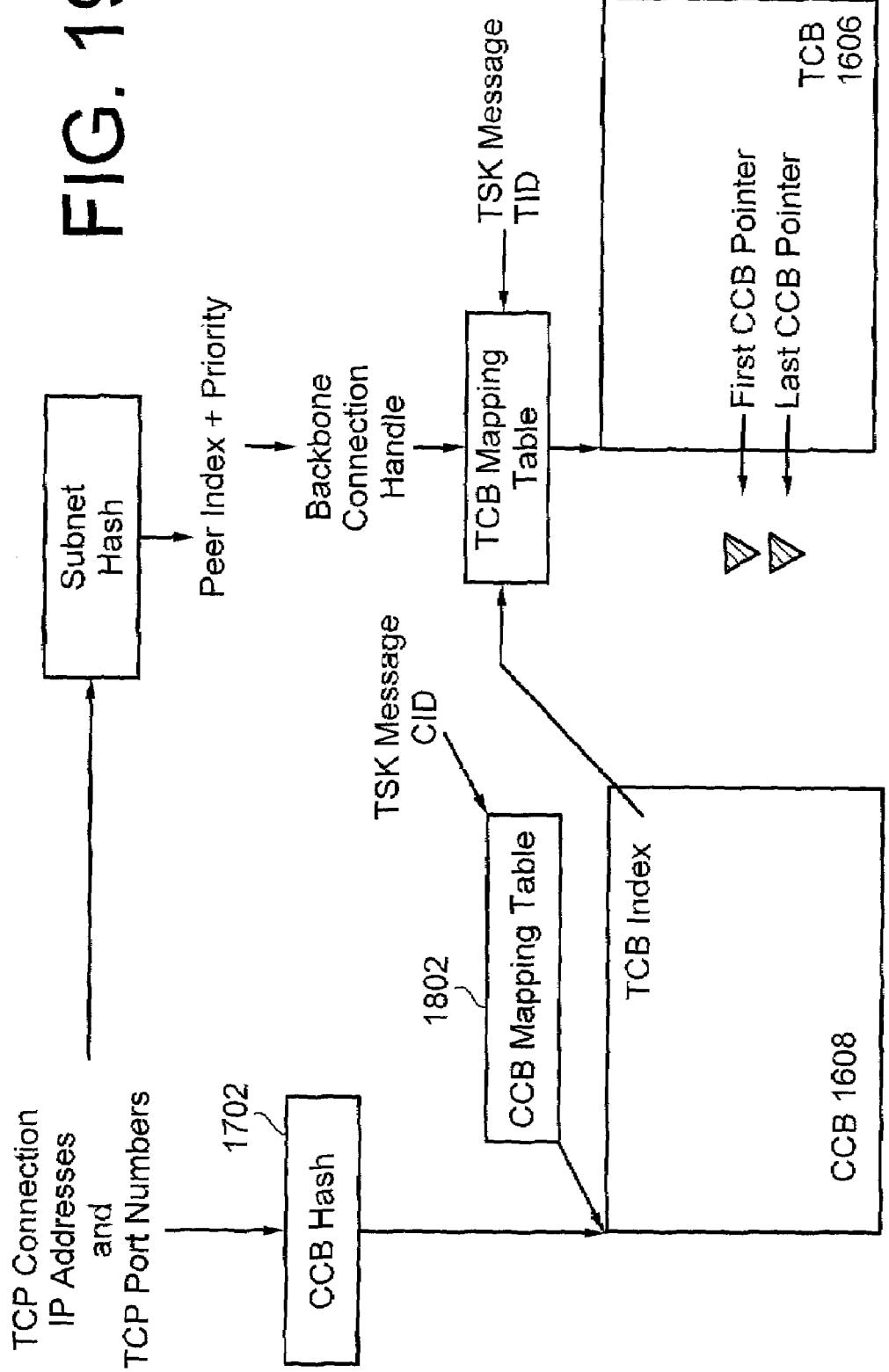
FIG. 19 is a diagram of the relationship between a CCB and a TCB, according to an embodiment of the present invention.

When a TSK message is received from the BPK 282 by TSK 280, TSK 280 can extract the destination TCP CID from the TSK message. If the TCP CID is not 0xFFFF, it can represent the CCB mapping table index for the CCB associated with the TCP connection of the TSK message. If the TCP CID is 0xFFFF, TSK 280 should determine if a new TCP CID is required (because the TSK message may be a Connection Request message), if the message belongs to an existing TCP connection for which the TSK peer has not yet received the TCP CID or if the message should be discarded because neither of the previous two conditions apply. TSK 280 can first check the message to see if there is a TCP connection header 1201 included with the message. If a TCP connection header 1201 is included, TSK 280 can use the information in the TCP connection header 1201 as input into the hash function 1702 to find the CCB 1608. If no TCP connection header 1201 is included in the message, TSK 280 can search the list of active CCBs 1608 currently associated with the backbone connection from which the message was received, searching for a match with the source TCP CID in the TSK message. BPK 282 can pass to TSK 280 the handle to find the appropriate TCB 1606 when it passes the TSK message to TSK. FIG. 19 illustrates the relationship between a CCB 1608 and TCB 1606.

The priority of a spoofed TCP connection can be determined for the connection at the time the connection's CCB, is allocated. TSK 280 only uses the priority to determine the appropriate backbone connection for carrying a spoofed TCP connection. After making this determination, TSK 280 need never references a TCP connection's priority again.

For a CCB 1608 being allocated because of the reception of a Connection Request (CR) message 1506, the priority is set equal to the priority of the backbone connection on which the CR message 1506 was received, i.e., the backbone connection from which the CR message 1506 was received is used as the backbone connection for the spoofed TCP connection. For a CCB 1608 which is about to be allocated due to the reception of a TCP <SYN> segment, the priority is the priority indicated in the selected TCP spoofing parameter profile. However, prior to actually using a CCB 1608 allocated for the connection, TSK 280 checks to make sure that a backbone connection to the appropriate TSK peer is currently up at the priority level indicated in the TCP spoofing parameter profile. If the desired backbone connection is not up (or does not exist), the CCB 1608 is not allocated and the TCP connection is not spoofed. The priority of a TCP connection which is not spoofed may be determined by prioritization rules implemented in the PK 284.

The following describes the handling of spoofed TCP connections.

The TCP Spoofing Kernel 280 can establish a spoofed TCP connection when it receives a TCP <SYN> segment from its local LAN or it receives a Connection Request message from its TSK peer. FIGS. 4A and 4B illustrate spoofed TCP connection establishment with and without three-way handshake spoofing. Three-way handshake spoofing may be disabled to support an end to end MSS exchange.

When a TCP segment is received from the local LAN, the platform environment 210 checks to see if there is already a CCB 1608 assigned to the TCP connection associated with the TCP segment. If there is no CCB 1608, the environment checks to see if the TCP segment is a <SYN> segment being sent to a non-local destination. If so, the <SYN> segment represents an attempt to bring up a new (non-local) TCP connection and the environment passes the segment to the TSK 280 to determine the TCP connection's disposition.

When a TCP <SYN> segment is received from the local LAN for a new TCP connection, the TSK 280 first must determine if the connection should be spoofed. If the connection should be spoofed, TSK 280 can uses the priority indicated in the selected TCP spoofing parameter profile and the peer index (provided by the environment with the TCP <SYN> segment) to construct the handle of the backbone connection which should be used to carry this spoofed TCP connection. The backbone connection handle is then used (via the TCB mapping table) to find the TCB associated with the backbone connection. TSK 280 then checks to see if the backbone connection is up. If the backbone connection is up, TSK 280 checks to see if the number of spoofed TCP connections already using the selected backbone connection is still currently below the CCB resource limit. The CCB resource limit is the smaller of the local number of CCBs (provided as a parameter by the platform environment 210) and the peer number of CCBs (received in the latest TPP message from the TSK peer) available for this backbone connection. If the number of connections is still below the limit, TSK 280 assigns a unique TCP connection identifier (e.g., a free CCB mapping table entry index) to the connection and calls the environment to allocate a TCP connection control block for the connection.

TSK 280 will return the TCP <SYN> segment back to the environment 210 to be forwarded unspoofed in any of the above checks failed. In other words, if:

The selective TCP spoofing rules indicate that the connection should not be spoofed;

There is no backbone connection for the priority at which the TCP connection should be spoofed (indicated by the absence of a TCB for the backbone connection);

There is a backbone connection but the backbone connection is down;

The number of spoofed TCP connections already using this backbone connection is at (or above) the limit; or There is no CCB mapping table 1802 entry available or there is no CCB 1608 available from the CCB free pool, then the TCP connection is forwarded unspoofed.

For the case where there is no backbone connection, TSK 280 can also post an event to alert the operator that there is a mismatch between the configured TCP spoofing parameter profiles and the configured set of backbone connections.

If all of the above checks pass, TSK 280 writes the backbone connection handle into the buffer holding the TCP <SYN> segment 401. This is not done until a CCB 1608 is successfully allocated by the platform environment 210 because the environment 210 does not count the buffer unless a CCB is successfully allocated.) TSK 280 then copies the parameters from the selected TCP spoofing parameter profile into the CCB. Then relevant information (the maximum segment size advertised by the host (if smaller than the configured MSS), the initial sequence number, etc.) is copied out of the TCP <SYN> segment 401 and stored in the CCB 1608. The source and destination IP addresses and source and destination TCP port numbers will already have been placed into the CCB by the platform environment 210 when the CCB was allocated. The environment 210 needs this information to manage CCB hash function collisions.

After allocating and setting up the CCB 1608, the TSK 280 constructs a Connection Request message 403 and sends it to its TSK peer. The CR message 403 basically contains all of the information extracted from the TCP spoofing parameter profile and the TCP <SYN> segment 401 and stored in the local CCB 1608, e.g., the source and destination IP addresses, the source and destination TCP port numbers, the MSS value, etc., with the exception of fields, such as the initial sequence number, which have only local significance. The IP addresses and TCP port numbers are placed into a TCP connection header 1201. In other words, the CR message 403 contains all of the information that the peer TSK will need to set up its own CCB 1608.

Figure 20:
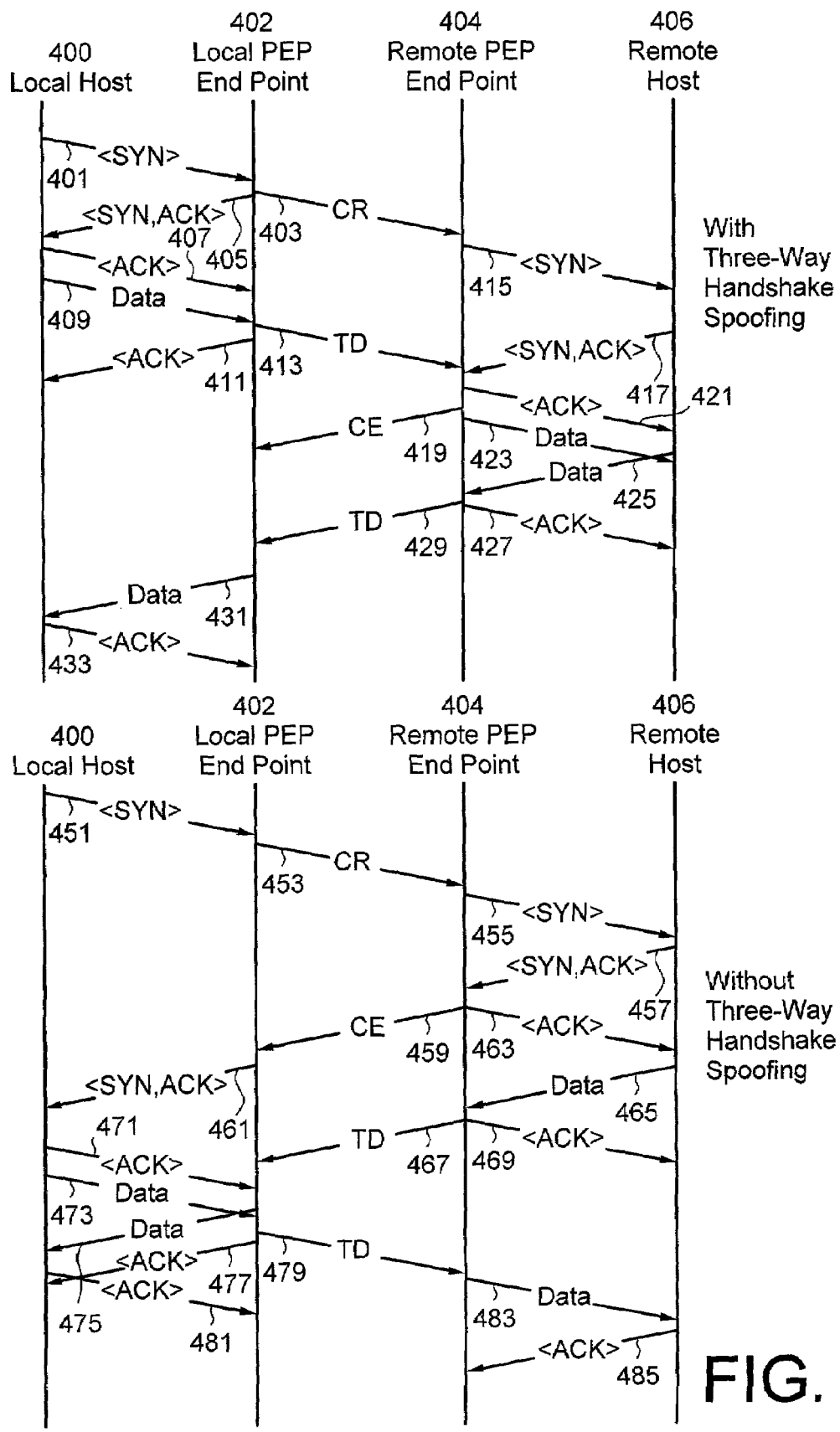
FIG. 20 is a diagram illustrating connection establishment, according to an embodiment of the present invention.

FIG. 20 illustrates completion of the local connection establishment. FIG. 20 is identical to FIGS. 4A and 4B but repeated here for clarity and ease on understanding. TSK 280 needs to send a TCP <SYN,ACK> segment 405 in response to the <SYN> segment 401 received. TSK 280 can do this at the same time it sends the CR message 403, if three-way handshake spoofing is enabled. Otherwise, it may wait for a CE message 459 from its TSK peer 404 before sending the <SYN,ACK> segment 405. TSK 280 picks a random initial sequence number (following the guidelines provided in RFC 793, the entire contents of which are hereby incorporated by reference) to use for sending data. If three-way handshake spoofing is disabled, the MSS value sent in the <SYN,ACK> segment 461 is set equal to the MSS value received in the CE message 459. However, if the MSS value is larger than the configured MSS value the configured MSS value will be sent instead. If three-way handshake spoofing is enabled, the MSS value is determined from the TCP spoofing parameter profile selected for the connection. For this case, TSK 280 must then compare the MSS value received in the CE message 419, when it arrives, to the value it sent to the local host in the TCP <SYN,ACK> segment 405. If the MSS value received in the CE message 419 is smaller than the MSS value sent to the local host, a maximum segment size mismatch exists. MSS mismatch handling is described below.

After sending the TCP <SYN,ACK> segment 405, TSK 280 is ready to start accepting data from the local host. When three-way handshake spoofing is being used, TSK 280 does not need to wait for the CE message 419 to arrive from its TSK peer 404 before accepting and forwarding data. Doing so would defeat the purpose of spoofing the three-way handshake. However, TSK 280 will not accept data from its TSK peer 404 until after the CE message 419 has been received. And, TSK 280 will not forward any data received from its TSK peer 404 to the local host 400 until it has received the TCP <ACK> segment 407 indicating that the local host 400 has received the <SYN,ACK> segment 405.

When a CR message 403 is received from a peer TSK 280, TSK 280 can allocate a CCB for the connection and then store all of the relevant information from the CR message 403 in the CCB 1608. Handling of the case where no CCB is available is described below. TSK 280 then can use this information to generate a TCP <SYN> segment 415 to send to the local host. The MSS in the <SYN> segment 415 can be set to the value received from the TSK peer. When the local host responds with a TCP <SYN,ACK> segment 417, TSK 280 can send a CE message 419 to its TSK peer 402, including in the CE message 419 the MSS sent by the local host in the <SYN,ACK> segment 417. TSK 280 can also respond with a TCP <ACK> segment 421 to complete the local three-way handshake. At this point, TSK 280 is ready to receive and forward data from either direction. If data arrives from its TSK peer before a <SYN,ACK> segment response is received from the local host, the data can be queued and then sent after the <ACK> segment is sent in response to the <SYN,ACK> segment (when it arrives).

There are many TCP connection establishment error scenarios which can be handled by TSK 280. The following describes some exemplary scenarios.

Figure 21:
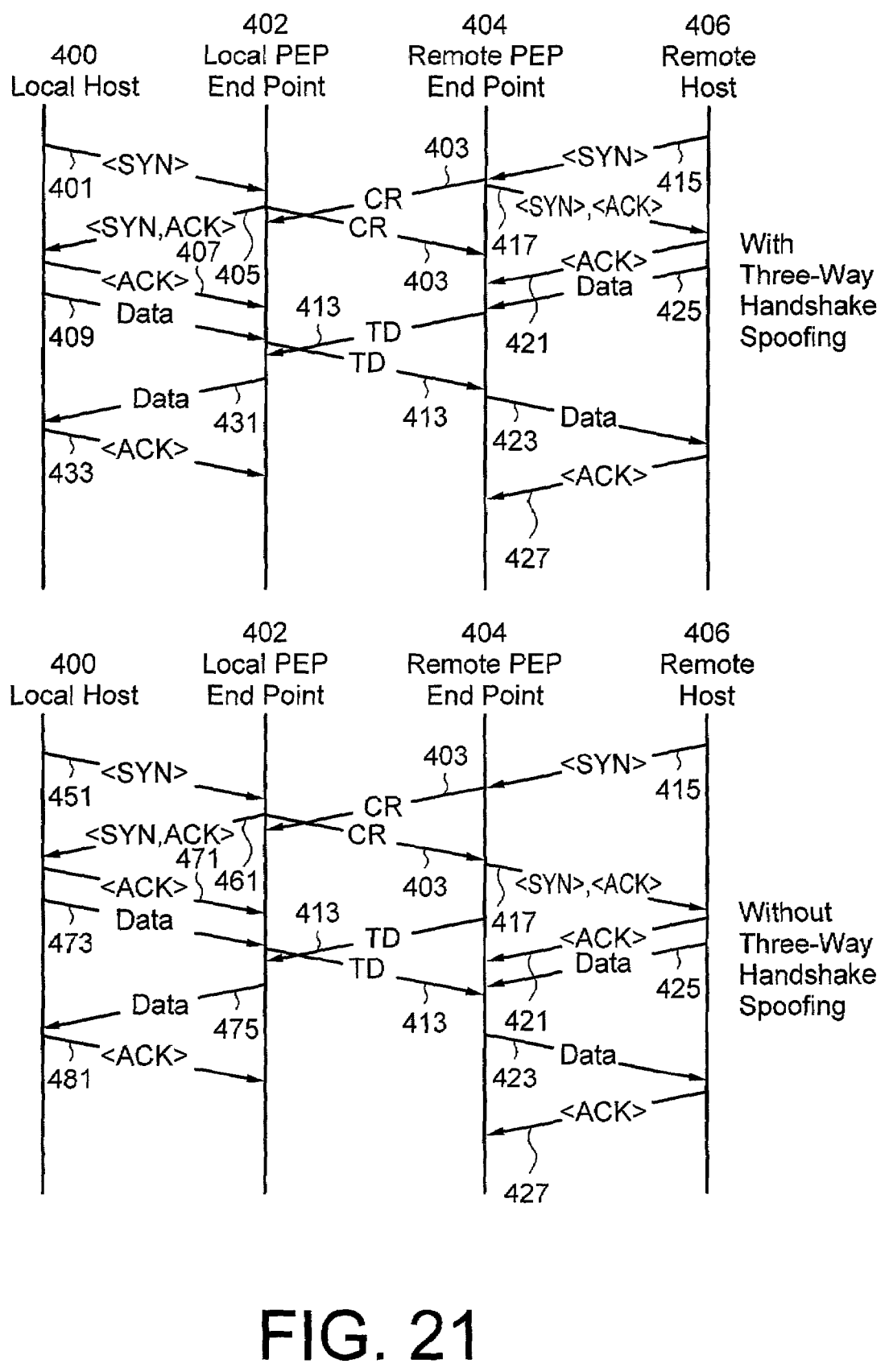

A TCP connection can be uniquely identified by the combination of its associated destination and source IP addresses and destination and source TCP port numbers. It is possible for two hosts to attempt to bring up the same TCP connection at the same time with the TCP <SYN> segment from each host passing each other. With TCP spoofing in the present invention, this may result in two CR messages 403 passing each other. To handle this situation, when TSK 280 receives a CR message 403, prior to allocating a CCB 1608 for the TCP connection, it can first check to see if there is already a CCB 1608 allocated for the TCP connection (by using the CCB hash function 1702 on the IP addresses and TCP port numbers included in the TCP connection header 1201 of the CR message 403). If there already is a CCB 1608 allocated, then TSK 280 can treat the CR message 403 as if it was a CE message 419, extracting its TSK peer's TCP CID from the CR message 403. FIG. 21A illustrates the startup of the same TCP connection from each host.

Figure 22:
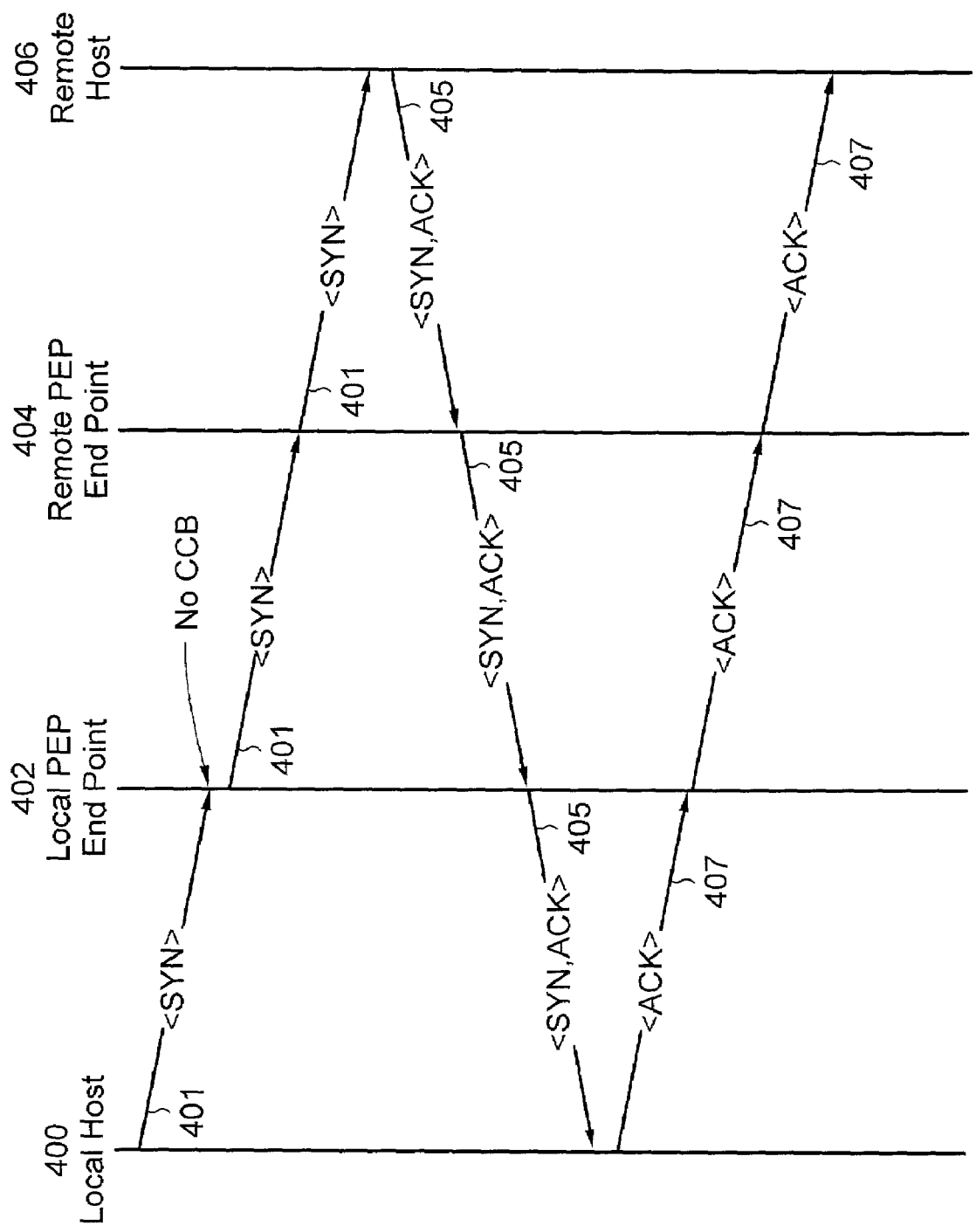
FIG. 22 is a diagram of connection establishment with no local CCB, according to an embodiment of the present invention.

Each TSK peer should be able to allocate a CCB 1608 for each TCP connection in order for the connection to be spoofed. When a TCP <SYN> segment 401 is received for a new connection and no CCB 1608 is available (or the number of CCBs allocated for this TSK peer has reached its limit), the TCP <SYN> segment 401 can be forwarded unspoofed. This is illustrated in FIG. 22. However, due to propagation delay (or the potential overbooking of CCBs if they are shared among TSK peers), it is possible for a CCB 1608 to be available when a TCP <SYN> segment 401 is received but for a CCB 1608 to not be available at the TSK peer.

When a CR 403 is received for a new connection and no CCB 1608 is available, TSK 280 can respond to the CR message 403 with a No Resource (NR) message 439 (with a reason code indicating "no CCB available"). Any subsequent data messages received from the TSK peer corresponding to this TCP connection can simply be discarded.

Figure 23:
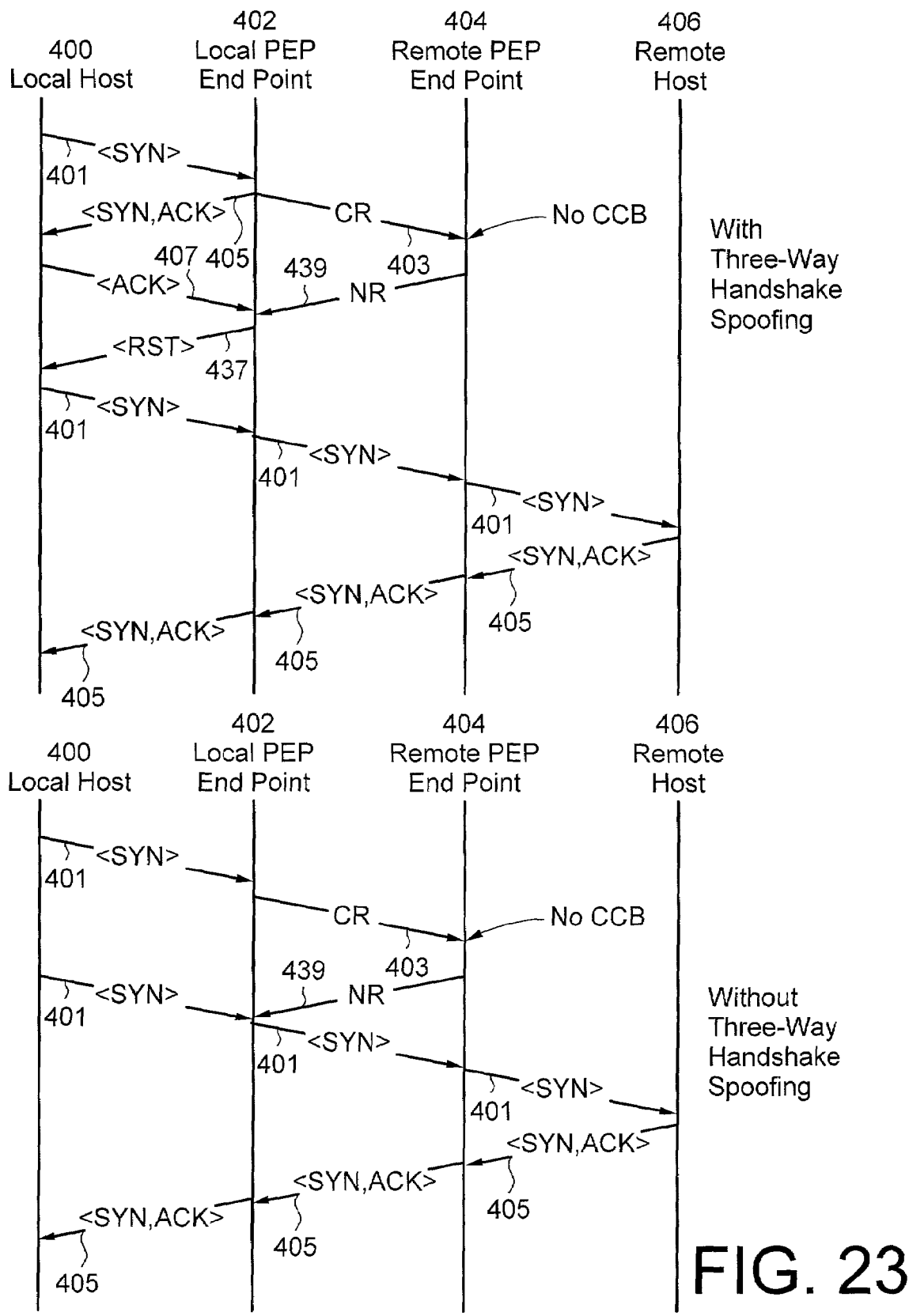
FIG. 23 is a diagram of connection establishment with no peer CCB, according to an embodiment of the present invention.

When TSK 280 receives a NR message 439 with a reason code of "no CCB available" in response to a CR message 403, TSK 280 can set the current state for the TCP connection to "unspoofed" and starts the connection's "unspoofed" timer. A purpose of the "unspoofed" state is to allow TSK 280 to remember that it was unable to spoof this connection and, thus, allow the connection to come up unspoofed on a reattempt by the local host 400. While in the "unspoofed" state, if TSK 280 receives any non-<SYN> segment for the TCP connection before it receives a <SYN> segment 401, TSK 280 can discard the non-<SYN> segment and respond with a <RST> segment 437. If TSK 280 receives a TCP <SYN> segment 401 while in the "unspoofed" state, TCP can forward the <SYN> segment 401 unspoofed and starts waiting for a non-<SYN> segment (in the meantime, forwarding any additional <SYN> segments 401 received unspoofed). When TSK 280 receives a non-<SYN> segment after having received a <SYN> segment 401, TSK 280 can assume that the connection must have been successfully established unspoofed and, therefore, deallocates the connection's CCB 1608 (after forwarding the received segment unspoofed). In any case, when the connection's "unspoofed" timer expires, the connection's CCB can be deallocated. FIG. 23 illustrates connection establishment scenarios when no CCBs are available at the TSK peer.

Because of propagation delay, it is possible for the last available CCB 1608 to be allocated by each TSK peer to different TCP connections if a host on each side of the network sends a TCP <SYN> segment 401 at the same time. This is illustrated in FIG. 24. This situation can result in each connection being forwarded unspoofed even though there is a CCB 1608 at each end of the backbone connection which could be used to spoof one of the connections. However, since this scenario will be rare, the available CCB 1608 will simply be used to spoof the next TCP connection.

When a TSK 280 receives a CR message 403 and sends a TCP <SYN> segment 401 to a local host, it can start a local response timer. If the timer expires before a TCP <SYN,ACK> segment response 405 is received from the host, TSK 280 can resend the <SYN> segment 401 and restart the timer. TSK 280 will retransmit the <SYN> segment 401 N times, where the retry count, N, is either a compile time constant or an operator configurable parameter. If TSK 280 does not receive a <SYN,ACK> segment 405 response after N retries, it can conclude that the host is not reachable. It can send a TCP <RST> segment 437 to the local host in case the problem only exists for traffic from the local host and, thus, the local host did actually receive the <SYN> segment) 401, send a CT message 435 to its TSK peer (with a reason code indicating "no response from local host") and then close the connection, discarding any data segments which were received from its TSK peer and queued for later delivery and deallocating the connection's CCB 1608.

The behavior of a TSK 280 when it receives a CT message 435 can depend on whether or not the kernel has already locally established the TCP connection (i.e. by sending the TCP <SYN,ACK> segment). If TSK 280 has not locally established the TCP connection, TSK 280 can simply close the connection and deallocate the connection's CCB. Nothing need be sent to the local host. If TSK 280 has locally established the TCP connection, TSK 280 can send a TCP <RST> segment 437 to the local host and then closes the connection.

Figure 25:
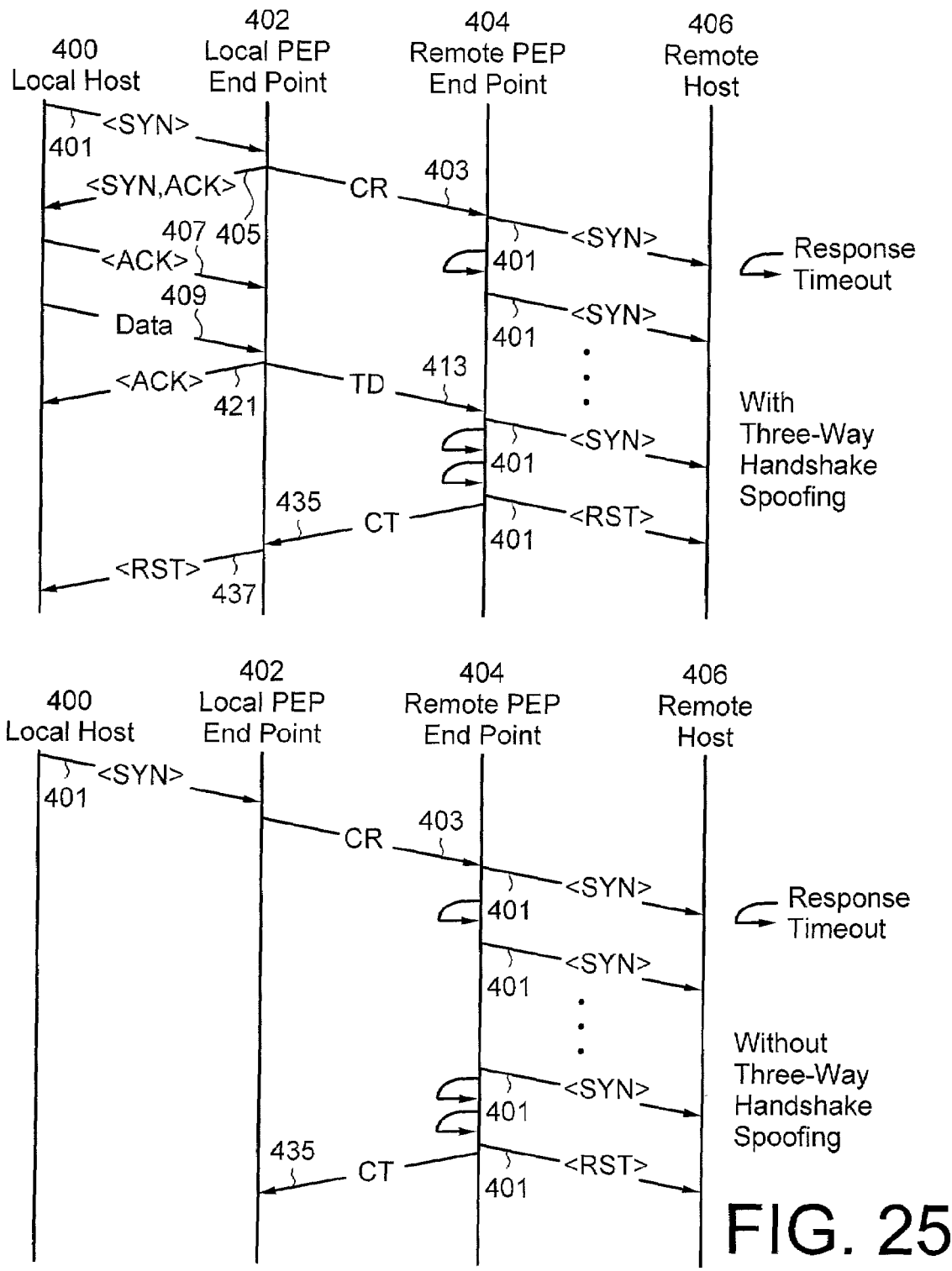
FIG. 25 is a diagram of no response from a destination host, according to an embodiment of the present invention.

The no response from destination host error scenario is illustrated in FIG. 25.

When TSK 280 receives a TCP <SYN> segment 401 and sends a TCP <SYN,ACK> segment 405 in response, it can start a local response timer. If the timer expires before a TCP <ACK> segment 405 response is received from the host to complete the three-way handshake, TSK 280 can resend the <SYN,ACK> segment 405 and restart the timer. TSK 280 can retransmit the <SYN,ACK> segment 405 N times, where the retry count, N, is either a compile time constant or an operator configurable parameter. If TSK 280 does not receive an <ACK> segment 407 response after N retries, it can conclude that the host is not reachable. It can send a TCP <RST> segment 437 to the local host just in case the problem only exists for traffic from the local host and, thus, the local host did actually receive the <SYN,ACK> segment 405, send a CT message 435 to its TSK peer (with a reason code indicating "no response from local host") and close the connection, discarding any data segments which were received from its TSK peer (after the CE message 419 was received from the TSK peer) and queued for later delivery before deallocating the connection's CCB 1608.

Figure 26:
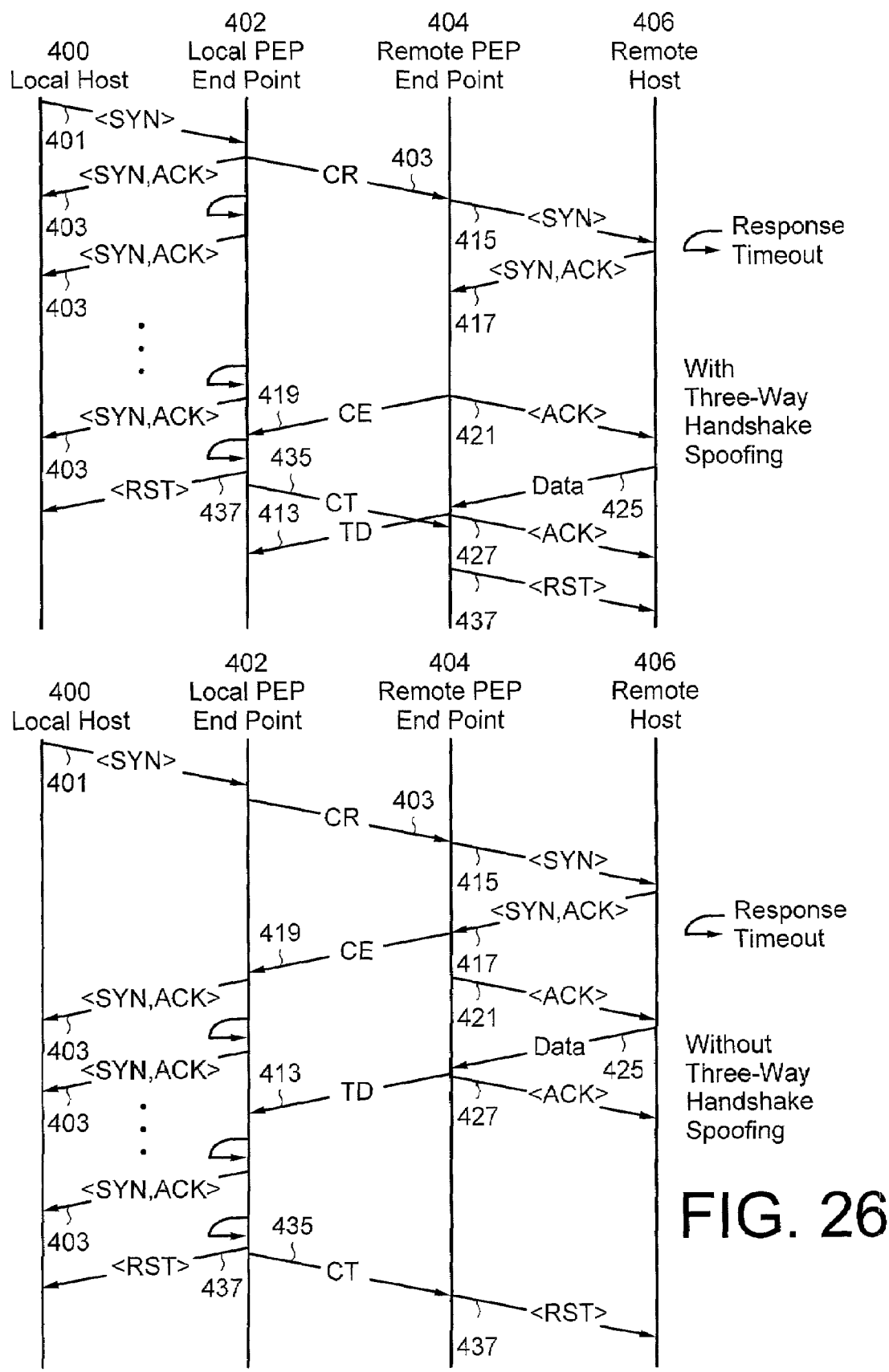
FIG. 26 is a diagram of no response from a source host, according to an embodiment of the present invention.

When the TSK peer receives the CT message 435, it can send a TCP <RST> segment 437 to the local host and closes the connection. The no response from source host error scenario is illustrated in FIG. 26.

After a TCP connection has been established between a local host and the TSK 280, the host and TSK 280 can send data to each other. When a data segment is received, the platform environment 210 will pass a pointer to the CCB 1608 to TSK 280 along with the received TCP segment. The existence of a CCB 1608 for the segment's TCP connection (for any type of TCP segment other than a <SYN> segment 401) can be used as the indication as to whether or not the connection is being spoofed. The presence of a CCB 1608 does not guarantee that the TCP connection is being spoofed (as indicated in the discussion above re the "unspoofed" state). The absence of a CCB 1608 can indicate that the TCP connection is not being spoofed.

Figure 27:
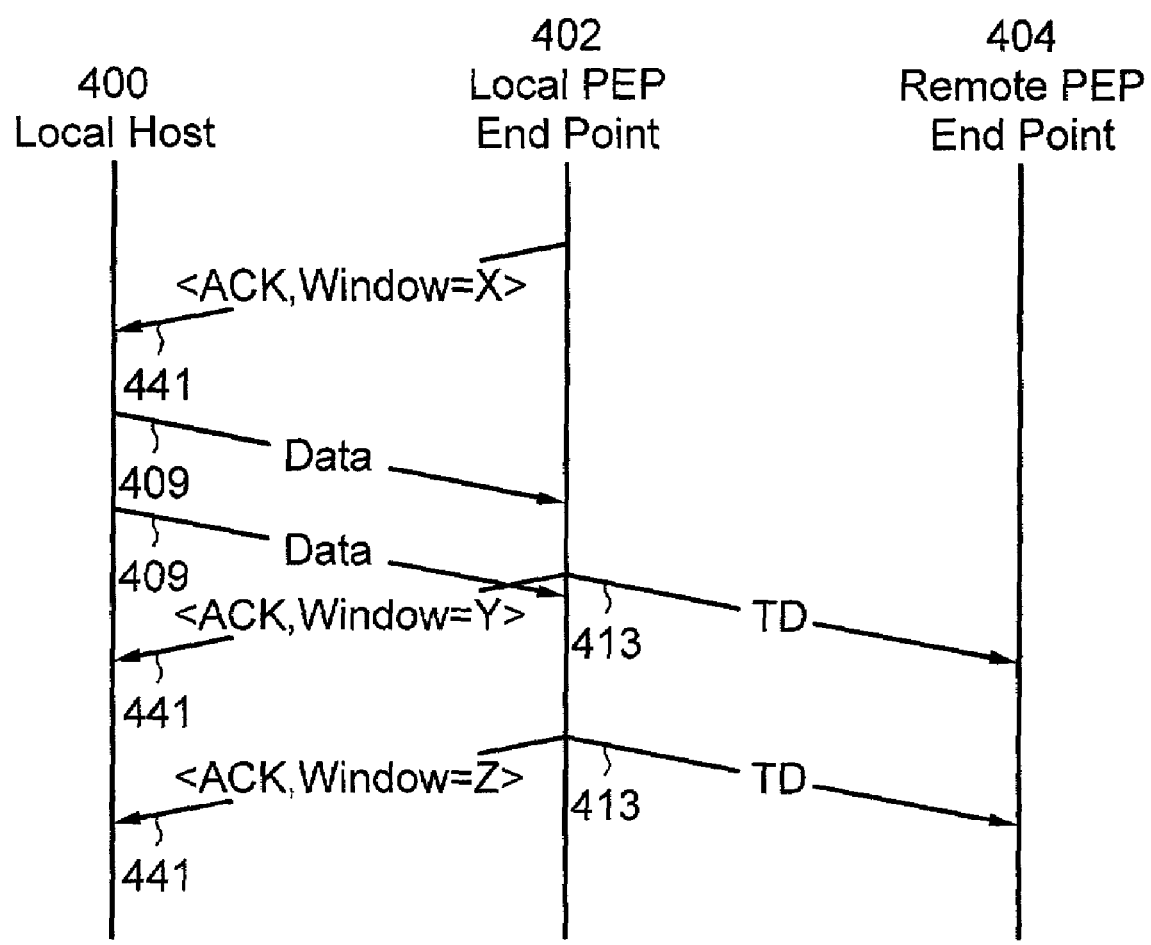
FIG. 27 is a diagram of spoofed data reception, according to an embodiment of the present invention.

With respect to sending data to the host (and recovering from any dropped data segments), TSK 280 should follow all of the relevant Internet Engineering Task Force (IETF) standards which relate to TCP, including the standards which govern slow start and congestion avoidance. With respect to receiving data from the host, TCP can advertise a receive window 441 to the host and locally acknowledges data received from the host. Acknowledged data can be forwarded by TSK 280 to its TSK peer. This is illustrated in FIG. 27.

The receive window 441 advertised by TSK 280 to the local host in any given TCP <ACK> segment 405 can be the minimum of the windows determined from several calculations. These windows can be determined by the receive window size configured in the TCP connection's selected TCP spoofing profile the previous window size advertised and the amount of buffer space available for TCP spoofing.

A host will normally terminate a TCP connection by sending a TCP <FIN> segment 443. A <FIN> segment 443 indicates that the host has no more data to send but does not terminate the connection until the other host also sends a <FIN> segment 443 indicating that it also has no more data to send. In some cases, a host may terminate a connection by sending a TCP <RST> segment 437. A <RST> segment 437 immediately terminates a TCP connection. In general, a TCP connection will only be terminated using a <RST> segment 437 when the application intentionally wants to interrupt the flow of TCP data or the application is sure that there is no more data which needs to be transferred and wants to terminate the TCP connection faster than a <FIN> segment 443 exchange allows. TSK 280 handling of these connection termination messages is described below.

When TSK 280 receives a TCP <FIN> segment 443, it can enter a local FIN wait state, send a TCP <ACK> segment 407 to acknowledge reception of the <FIN> segment 443 and send a Termination Pending (TP) 445 message to its TSK peer. After receiving the <FIN> segment 443, TSK 280 can discard any TCP data received on the TCP connection from the local host. However, TSK 280 can continue to accept and forward data it receives from its TSK peer until it receives a TP message 445 from the TSK peer. When TSK 280 receives a TP message 445 from its TSK peer, it can enter a local FIN pending state. TSK 280 can then continue to send any data segments which have not been transmitted and acknowledged. After all data has been sent and acknowledged, TSK 280 can then send a TCP <FIN> segment 443 to the local host. If there is no data remaining when the TP message is received, the <FIN> segment 443 can be sent immediately. When the local host acknowledges the <FIN> segment 443, TSK 280 can start the connection's "time-wait" timer and enters the "time-wait" state.

Figure 28:
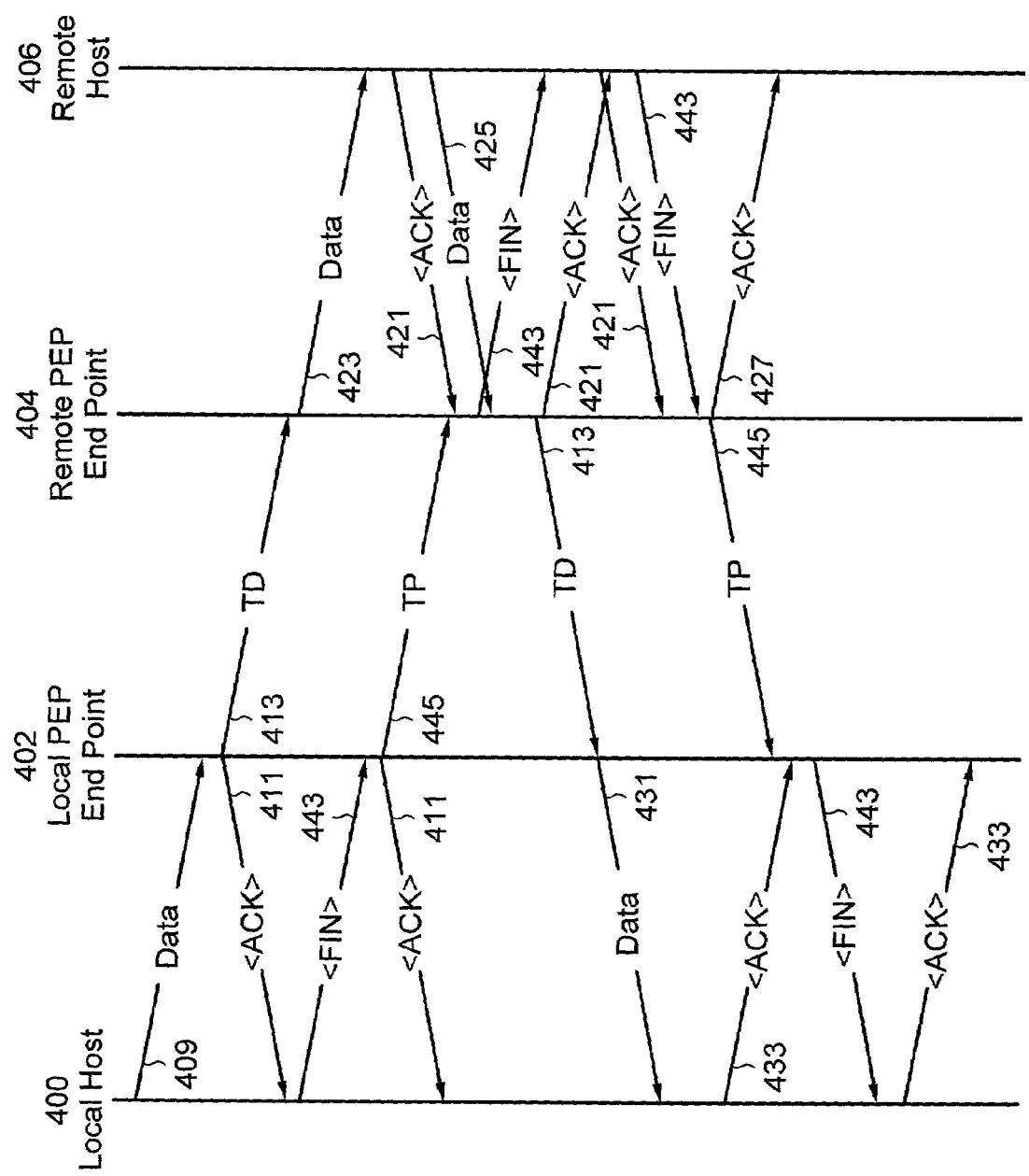
FIG. 28 is a diagram of normal connection termination, according to an embodiment of the present invention.

When TSK 280 receives a TP message 445 from its TSK peer while it is in the data transfer state, it can enter a peer FIN wait state. TSK 280 can then continue to send any data segments which have not been transmitted and acknowledged. After all data has been sent and acknowledged, TSK 280 can send a TCP <FIN> segment 443 to the local host and enter a peer FIN pending state. If there is no data remaining when the TP message is received, the <FIN> segment 443 can be sent immediately and TSK 280 can go to the peer FIN pending state. TSK 280 can continue to accept, acknowledge and forward data received from its local host until the local host sends a TCP <FIN> segment 443. When the local host sends the TCP <FIN> segment 443 while TSK 280 is in the peer FIN pending state, TSK 280 can send a TCP <ACK> segment 441 to acknowledge reception of the <FIN> segment 443 and sends a TP message 445 to its TSK peer. TSK 280 then can start its "time-wait" timer and enter the "time-wait" state. FIG. 28 illustrates spoofed TCP connection <FIN> segment 443 handling.

It is possible for the final segment, e.g. the <RST> segment 437 or the <ACK> segment 433 sent in response to a <FIN> segment 443, sent to close a connection to be lost. The purpose of the "time-wait" state is to hold on to the CCB 1608 long enough to resend the final segment if any new segments for the same connection are received from the local host. For TCP in general, the "time-wait" state also provides some protection against the arrival of stale segments which have been significantly delayed transiting the network. This problem should be rare but could occur in the presence of temporary routing loops.

When the "time-wait" state is entered, the segment sent at the time the state was entered is (logically) queued. This segment can be resent in response to any segments (other than <SYN> segments 401) received from the local host for the connection. If no segment was sent at the time the "time-wait" state was entered, a TCP <RST> segment 437 can be sent in response to all non-<SYN> segments received from the local host for the connection. If a TCP <SYN> segment 401 is received, TSK 280 can process the <SYN> segment 401 in the same manner it does for a <SYN> segment 401 received in the "closed" state, with the exception that TSK 280 can reuse the existing CCB 1608 rather than allocate a new CCB 1608. Note that the "closed" state is a logical state, i.e. it represents the state when there is no CCB 1608 allocated for a TCP connection. A TCP connection's state variable is not actually set to "closed". TSK 280 cannot assume that the CCB 1608 (and, hence, CID) being used by its TSK peer has not already been deallocated. Even if the two TSK peers are using the same value for the "time-wait" timeout, propagation delay makes it likely that the two TSK peers do not start their "time-wait" timers at the same time.

Whenever the "time-wait" state is entered, the "time-wait" timer is started. The "time-wait" timeout is configured as part of a TCP connection's selected TCP spoofing parameter profile. When the "time-wait" timer expires, the CCB 1608 can be moved from its backbone connection's active CCB list to the CCB free pool.

When TSK 280 receives a TCP <RST> segment 437 from a host, it can terminate the TCP connection being spoofed. The buffers from any data segments not acknowledged or not transmitted can be freed, a CT message 435 is sent to the TSK peer (with a reason code indicating "<RST> segment 437 received from local host"), the connection can be closed and the connection's CCB 1608 is deallocated.

Figure 29:
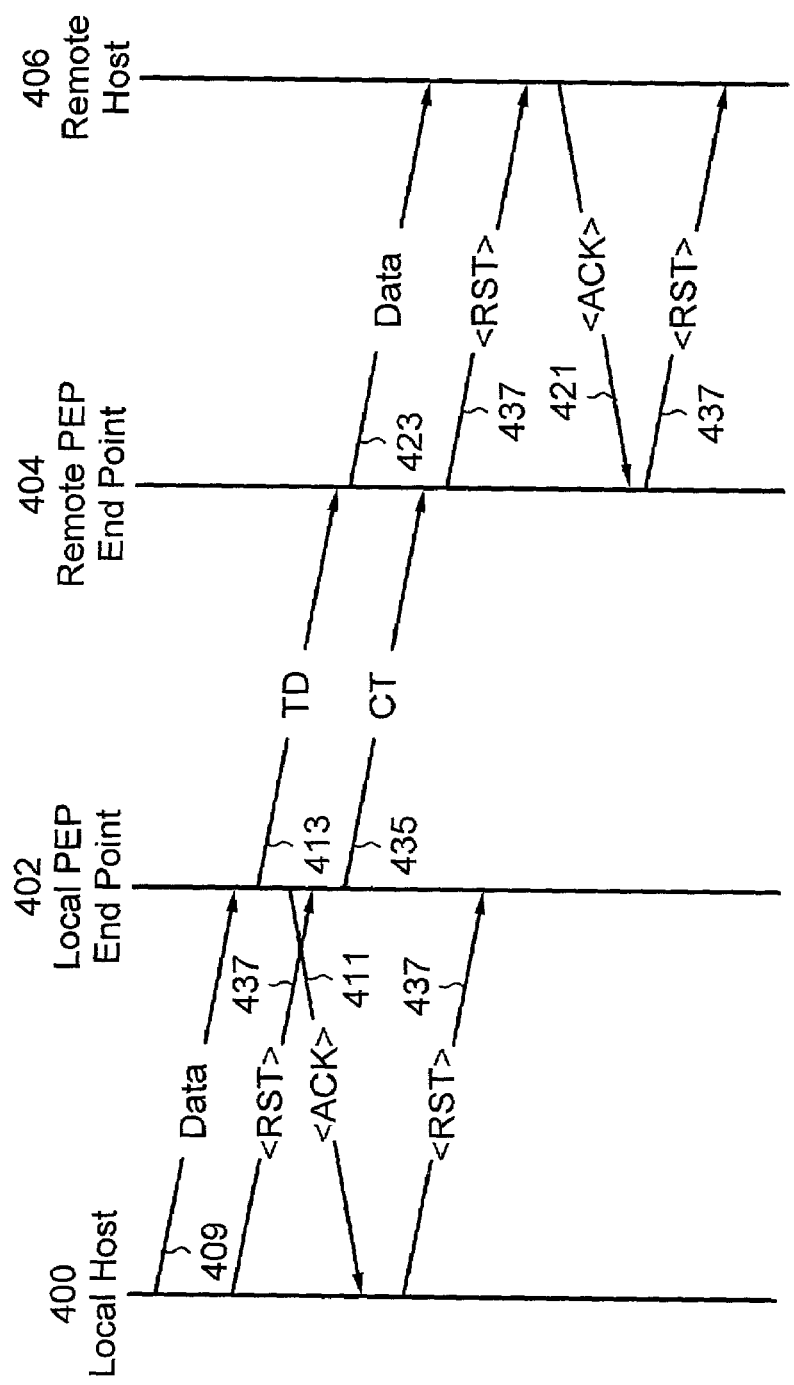
FIG. 29 is a diagram of local host <RST> segment connection termination, according to an embodiment of the present invention.

When the TSK peer receives the CT message 435, it can free up the buffers from any data segments not acknowledged or not transmitted and sends a TCP <RST> segment 437 to its local host. TSK 280 then can close the connection and deallocates the connection's CCB 1608. FIG. 29 illustrates spoofed TCP connection <RST> segment 437 handling.

There are many TCP connection termination error scenarios which can be handled by the TSK 280. There are also many error scenarios which can lead to the termination of TCP connections. The following describes some of these exemplary scenarios.

Figure 30:
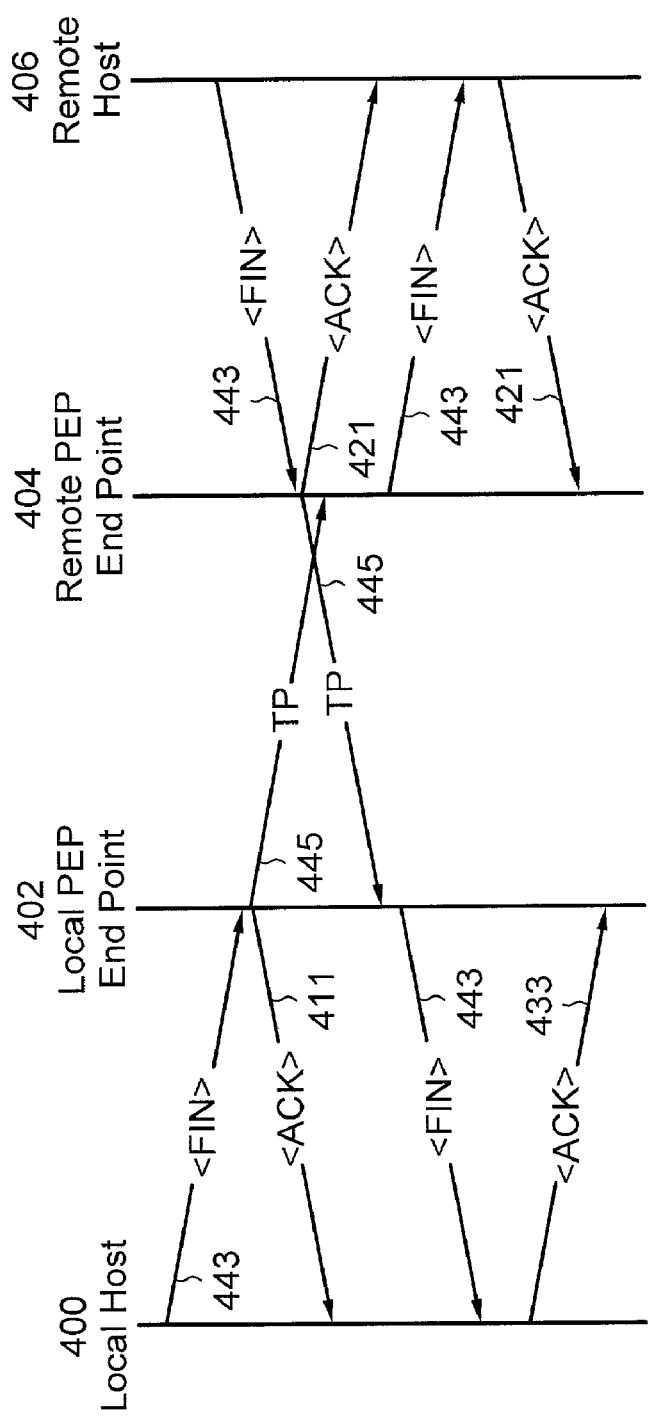
FIG. 30 is a diagram of simultaneous normal connection termination, according to an embodiment of the present invention.

It is possible for both of the hosts involved in a TCP connection to decide to terminate the connection. If this occurs, the TCP <FIN> segments 443 from each host may pass each other. With TCP spoofing in the present invention, this can result in TP messages 445 passing each other. This does not cause any problems because the TSK peers cannot tell that the TP messages 445 passed each other. Each TSK peer sees the normal case of receiving a TP message 445 after having sent a TP message 445. FIG. 30 illustrates a simultaneous normal connection termination.

Figure 31:
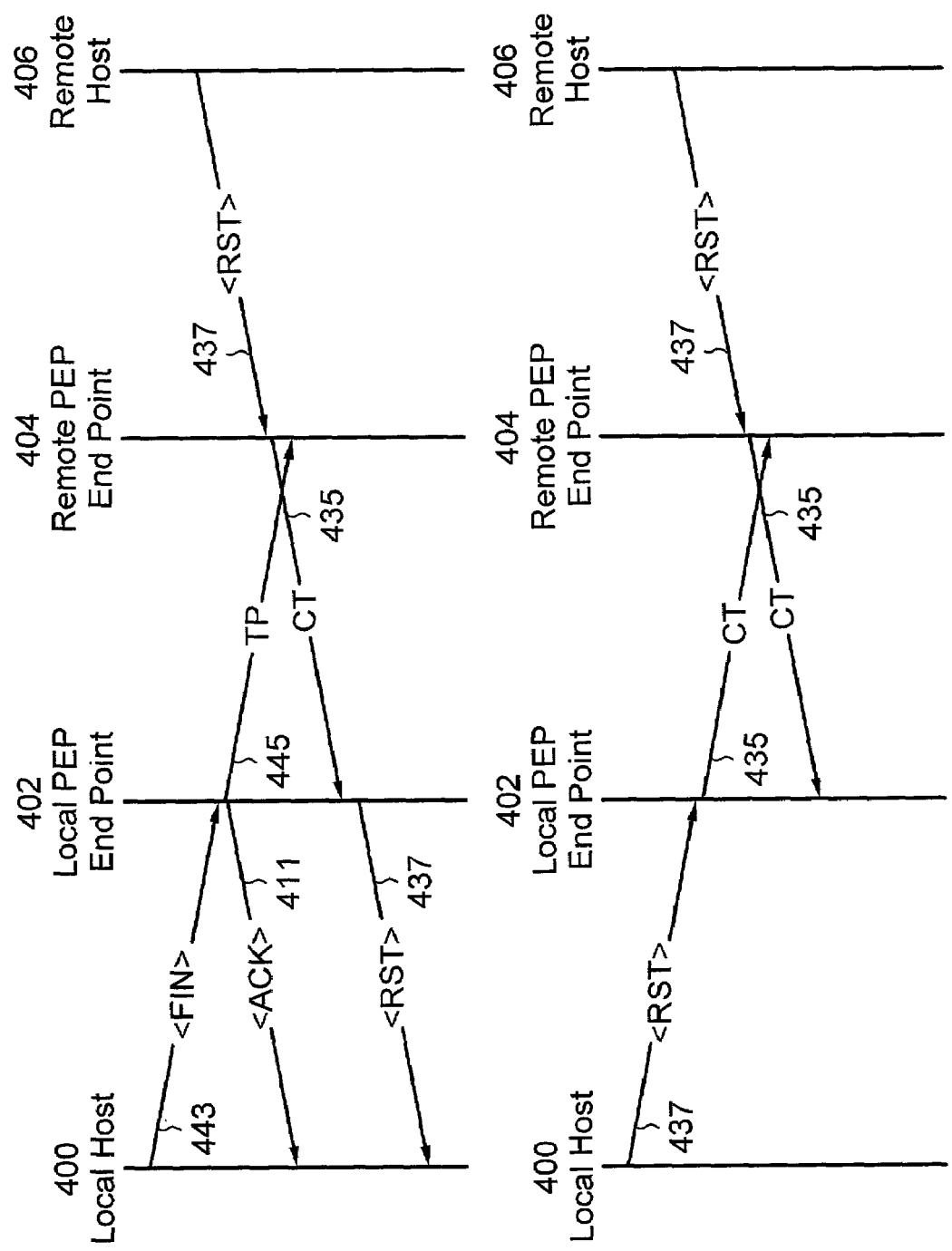
FIG. 31 is a diagram of simultaneous <RST> segment connection termination, according to an embodiment of the present invention.

It is also possible for both of the hosts involved in a TCP connection to decide to terminate the connection with one (or both) of the hosts sending a TCP <RST> segment 437 rather than a <FIN> segment 443. With TCP spoofing in the present invention, this can result in a TP message 445 passing a CT message 435 (or two CT messages 435 passing each other). This also does not cause any problems. The TSK 280 receiving the <RST> segment 437 can close the connection when it sends the CT message 435 and, thus, can simply discard the TP 445 (or CT 435) message when it is received. A TSK 280 receiving a <FIN> segment 443 can send a <RST> segment 437 to its local host and close the connection when it receives the CT message 435. FIG. 31 illustrates exemplary scenarios involving termination with TCP <RST> segments 437.

After TSK 280 has both sent and received a TCP <FIN> segment 443, it can enter the "time-wait" state. However, because it is possible for the delivery of data to be delayed to a local host, it is possible for one of the TSK peers to enter the "time-wait" state while the other TSK peer is still trying to deliver data. In an extreme case, it is possible for one TSK's "time-wait" timer to expire for the TCP connection, freeing the TCP connection's CCB 1608, while its TSK peer is still trying to deliver data. This can be avoided by requiring a final handshake between the TSK peer's prior to exiting the "time-wait" state. But, the extra overhead for this handshake is not desirable, especially given that this scenario should be rare. This still would not prevent the local host which has also both sent and received a <FIN> segment 443 from exiting its "time-wait" state.

Not including a final handshake can introduce some additional error scenarios which can be handled by TSK 280. One scenario is that a CCB 1608 becomes available at one TSK peer without being available at the other. This could lead to an unsuccessful attempt to spoof a new TCP connection. However, this case can already be handled for other reasons by TSK 280.

Figure 32:
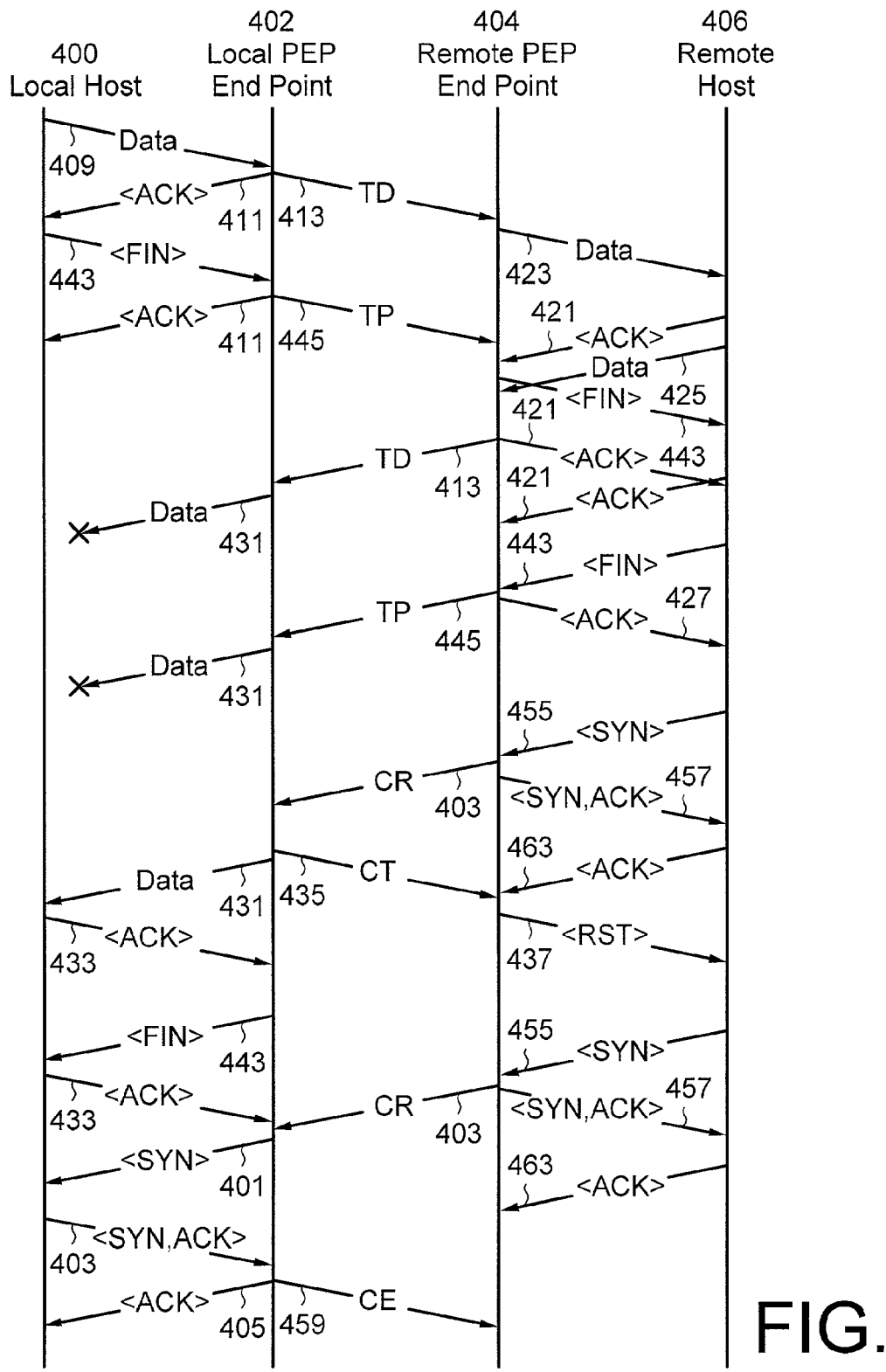
FIG. 32 is a diagram of a premature connection restart, according to an embodiment of the present invention.

A slightly more complicated scenario arises if the local host tries to restart the exact same TCP connection which existed before. In this case, the TSK peer which was not able to terminate the connection promptly could receive a CR message 403 for an existing connection while it is still delivering the data from the previous incarnation of the connection. TSK 280 can recognize that this has occurred because it uses the CCB hash function 1702 on the information provided in the TCP connection header 1201 of the CR message 403 to search for an existing CCB 1608. This check can prevent TSK 280 from trying to bring up a second instance of the same TCP connection. When TSK 280 receives a CR message 403 prior to successful termination of the previous incarnation of a connection, it can reject the CR message 403 by sending a CT message 435 to its TSK peer (with a reason code indicating "previous incarnation of this connection still pending"). The TSK peer then can handle the reception of a CT message 435 in response to a CR message 403 in the same manner that it does for other reasons for receiving a CT message 435. TSK 280 can continue to reject any new attempts to restart the same connection until it either successfully delivers the data or it tears down the connection due to an unrecoverable error (e.g. it reaches the maximum retry count while trying to retransmit a data segment). FIG. 32 illustrates one of many exemplary versions of the premature connection restart scenario.

TSK 280 resources (e.g. CCBs) are generally very valuable because they are limited. Thus, it is desirable for TSK 280 to be able to detect when a host has died in order to free up the resources being used by the TCP connections associated with the host. Therefore, when the TSK 280 sends a TCP segment to its local host which requires a response, it can start a response timer to wait for the response. If no response is received before the timer expires, TSK 280 retransmits the TCP segment for which it is waiting for a response. TSK 280 can retransmit the TCP segment N times, where the retry count, N, is either a compile time constant or an operator configurable parameter. If TSK 280 does not receive an appropriate response after N retries, it can conclude that the host is not reachable. It will then send a TCP <RST> command 437 to the local host and a CT message 435 (with a reason code indicating "no response from local host") to its TSK peer. TSK 280 then can free up the buffers of any data segments not acknowledged or not transmitted and closes the connection, deallocating the connection's CCB 1608.

When the TSK peer receives the CT message 435, it can send a TCP <RST> segment 437 to its local host, if appropriate, free up the buffers from any data segments not acknowledged or not transmitted and close the connection, deallocating the connection's CCB 1608.

Figure 33:
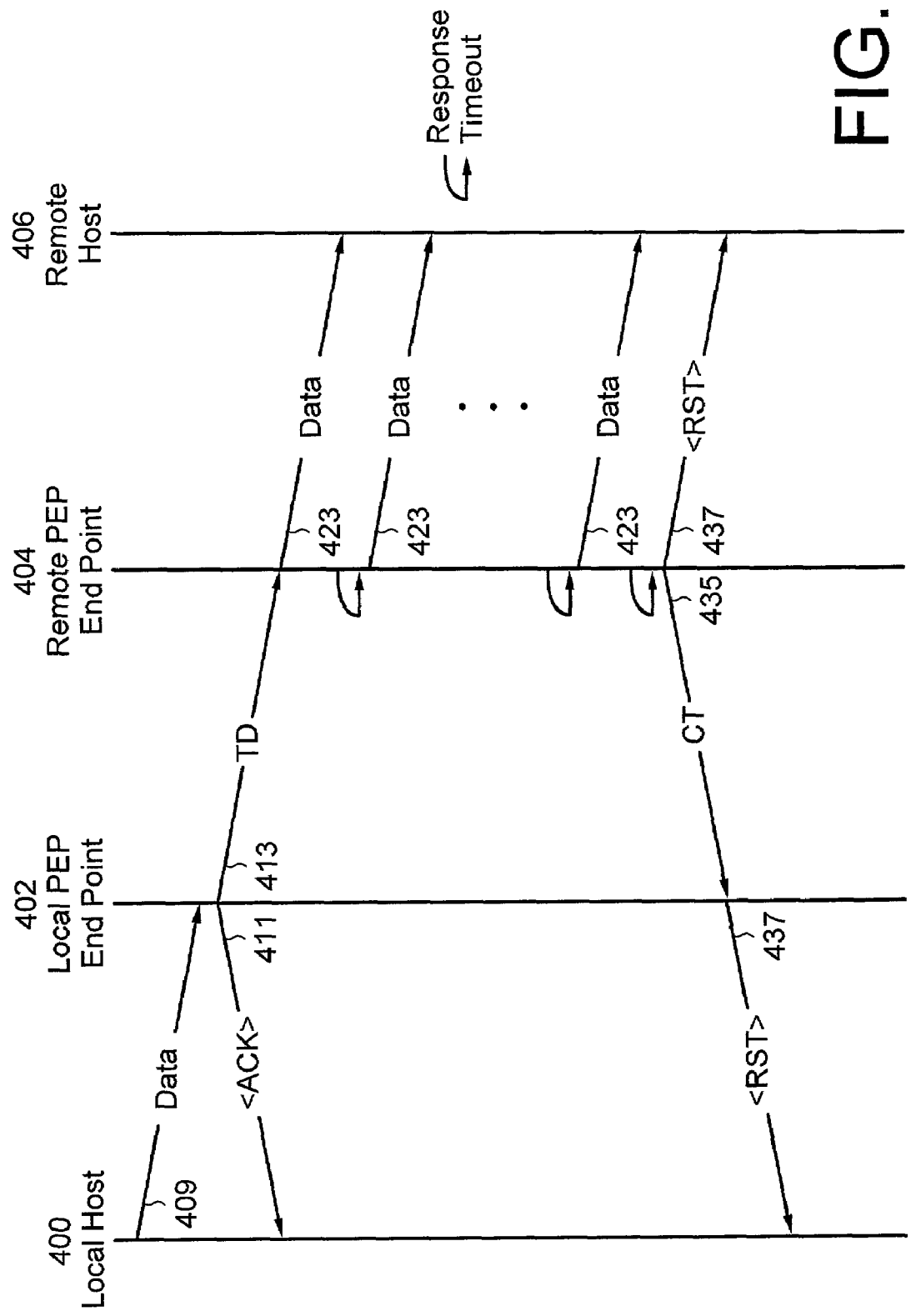
FIG. 33 is a diagram illustrating connection termination due to no response from a host, according to an embodiment of the present invention.

FIG. 33 illustrates no response from local host handling for spoofed TCP connections in the data transfer state. FIGS. 25 and 26, discussed above, illustrate other no response from host error scenarios.

The response timer can provide a mechanism for detecting that a host has died when there is data (or some other message) outstanding. However, if a TCP connection is idle, i.e. if there is currently no data being transferred on the connection, the response timer may not be running. The host having died could even be the reason why there is no data being carried. To detect when hosts associated with idle connections die, the TSK 280 can run a keepalive timer whenever a connection is idle. When the keepalive timer expires, TSK 280 can send a keepalive message to the local host. The length of the keepalive timer is configured as part of a connection's selected TCP spoofing parameter profile and can range from minutes to hours. The sending of keepalive messages can also be completely disabled. After sending a TCP keepalive message, the TSK 280 can start its response timer and follows the procedure to detect if the local host is still alive.

A TCP keepalive message can be a zero length TCP data segment, sent with a sequence number equal to the last byte already sent and acknowledged. When the host receives this data segment, it can discard it (because it represents data already received and acknowledged). However, the host can respond to this data segment with an <ACK> segment just in case the data segment was resent because its last <ACK> segment was lost. TCP keepalive messages are described in RFC 1122, the entire contents of which is hereby incorporated by reference.

Backbone connections may fail due to link failures between two PEP End Points 705 or because of a failure of a PEP End Point 705 itself. If at any time the BPK 282 indicates (via the environment 210) that a backbone connection has failed, TSK 280 can terminate all of the TCP connections which are associated with the failed backbone connection. For each such TCP connection, TSK 280 can send a TCP <RST> segment 437 to its local host, free up the buffers from any data segments not acknowledged or not transmitted and close the connection, deallocating the connection's CCB 1608. TSK 280 can also terminate the TCP connections which are associated with a backbone connection which it needs to close for some reason (e.g. because the operator deleted it).

TSK 280 can be provided periodically, by the platform environment 210, with a background processing opportunity. One of the functions performed by TSK 280 during its background processing opportunity can be to check for TCP connection timeouts. In one exemplary embodiment, whenever TSK 280 starts a timer, it can set the expiration time of the timer to be equal to the timeout value plus the current system time. To check to see if a timer has expired, TSK 280 can compare the expiration time of the timer to the current system time provided by the platform environment 210. System time may be represented in terms of timer ticks. The platform environment 210 converts timeout parameters provided (in units of deciseconds) by the network manager into system tick counts prior to passing the parameters to TSK 280.

TSK 280 can make use of the CCB mapping table 1802 to find CCBs 1608 which need timer processing. TSK 280, in a round robin fashion, can walk through the mapping table 1802 (as an array) looking for valid CCB pointers. When a valid CCB pointer is found, TSK 280 can check the CCB 1608 to see if any timeouts have occurred and, if so, processes the timeouts. To keep from holding onto control of the CPU for too long a period of time, TSK 280 can limit the number of CCBs 1608 it checks and the number of timeouts it processes during each background call. The specific limits may be different for each PEP End Point platform.

The PEP End Point platform environment 210 passes an IP packet received from the local LAN interface 803, 903, 1003, 1103 which has a protocol type of TCP to TSK 280 if TCP spoofing is globally enabled and the TCP segment meets one or both of the following conditions:

A TCP connection control block exists for the TCP connection to which the TCP segment belongs;

The TCP segment is a <SYN> segment 401, destined to a non-local destination. (Local TCP connections, for example, TCP connections between hosts located local to the LAN ports of a VSAT, and TCP connections which are not associated with a known non-local destination subnet are not forwarded to TSK 280.)

A TCP segment which does not match either condition is either forwarded locally or of forwarded unspoofed (as appropriate) by the platform environment 210. TSK 280 applies selection criteria to TCP <SYN> segments 401 to determine whether or not a connection should be spoofed. For all TCP segments, if a connection control block exists for the connection then the connection has already had selection criteria applied. This includes <SYN> segments 401. TCP <SYN> segments 401 generally mark the initiation of a new connection but, from the point of view of the TCP state machine, a <SYN> segment 401 can be received in the middle of an existing connection to resynchronize or restart the connection. TCP <SYN> segments 401 which fail the selection criteria are returned back to the platform environment 210 to be forwarded unspoofed. The subsequent TCP segments received for these TCP connections will then be received with no CCB 1608 present and, thus, will also be forwarded unspoofed.

There are at least five exemplary criteria which can be specified by the operator in a selective TCP spoofing rule. The first exemplary criterion is destination IP address. Selective TCP spoofing can be performed based on destination IP addresses. A mask can be associated with each IP address to support multiple addresses matching a single rule. For example, a mask of 0.0.0.255 with an address of 0.0.0.1 could be used to select any IP address of the form x.x.x.1 and a mask of 255.255.255.0 with an address of 10.1.1.0 could be used to select all IP addresses in the 10.1.1.0 subnet. A mask of 0.0.0.0 represents a "don't care" value for the IP address field, i.e., a mask of 0.0.0.0 matches all IP addresses.

A second exemplary criterion is source IP address. Selective TCP spoofing can be performed based on source IP addresses. As with destination IP addresses, a mask can be associated with each IP address to support multiple addresses matching a single rule.

A third exemplary criterion is TCP port number. Selective TCP spoofing can be performed based on TCP port numbers. TCP port numbers can identify the type of application being carried by a TCP connection. Currently assigned TCP port numbers can be tracked at the following location:

http://www.isi.edu/in-notes/iana/assignments/port-numbers.

Port number rules can apply to both the TCP destination and source port numbers, i.e. a TCP port number rule can apply if either the destination or source port number matches. A value of 0 is used as the "don't care" value for the TCP port number fields, i.e., a port number value of 0 in a rule matches all TCP port numbers.

A fourth exemplary criterion is TCP options. Selective TCP spoofing can be performed based on the TCP options which are present.

A fifth exemplary criterion is IP DS field. Selective TCP spoofing can be performed based on the differentiated services (DS) field in the IP header. A bit mask is used in conjunction with a configured DS field value in order to specify meaningful bits. A mask of 0 represents a "don't care" value for the DS field, i.e., a mask of 0 matches all DS field values. The use of the IP header DS field is described in RFCs 2474 and 2475, the entire contents of which are hereby incorporated by reference.

In addition to supporting selective TCP spoofing rules for each of these criteria, AND and OR combination operators can also be supported to link the criteria together. For example, using the AND combination operator, a rule can be defined to disable TCP spoofing for FTP data (TCP port number 20) received from a specific host. Also, the order in which rules are specified can be significant. It is possible for a connection to match the criteria of multiple rules. Therefore, the TSK 280 can apply the rules in the order specified by the operator, taking the action of the first rule which matches. A default rule can also exist which defines the action to be taken for TCP connections which do not match any of the defined rules.

After checking the selective TCP spoofing rules to see if a TCP connection should be spoofed, before actually attempting to spoof the connection, a couple of additional checks can be made:

Is there a CCB 1608 available?

Is the appropriate backbone protocol connection to the destination PEP End Point up?

If there is no CCB 1608 available or the backbone protocol connection to the PEP End Point 705 associated with the destination IP address of this connection is down, spoofing is probably not possible.

Selective TCP spoofing rules can be defined by the operator in a selective TCP spoofing selection profile 3402. PEP End Points 705 can then be defined to use a particular TCP spoofing selection profile 3402. All of the PEP End Points 705 in a network can be configured to use the same profile. Or, different profiles may be used by different subsets of PEP End Points 705. There is no requirement that the same TCP spoofing selection profile be used by the two PEP End Points 705 at the ends of a backbone connection. Not requiring that the same selective TCP spoofing rules be used by each PEP End Point 705 allows the operator to add one more dimension to the rules. The added dimension can be allowing selective TCP spoofing to be based on which end of the backbone link the connection originates from. For example, an FTP TCP connection originating from a remote site can be treated differently than an FTP TCP connection originating from the hub site. This capability can be useful but should be used with care to avoid unexpected side effects regarding what does and does not get spoofed.

Selective TCP spoofing rules can be used to select an appropriate TCP spoofing selection profile 3042. A TCP spoofing parameter profile 3404 can indicate whether connections which are mapped to the profile should be spoofed and, if so, defines the spoofing parameters which should be applied to the connections which match the rule. TCP spoofing parameter profile 3404 parameters include (but are not necessarily limited to):

Three-way handshake spoofing—This parameter indicates whether or not three-way handshake spoofing is enabled or disabled;

Connection priority—This parameter indicates the priority which should be used for connections which are selected to this profile.

Priority disposition—This parameter indicates the appropriate handling, discard or forward unspoofed, of TCP connections which map to this TCP spoofing profile if a backbone connection at the indicated connection priority is not currently available;

TCP protocol related parameters—These parameters are related to TCP protocol operation and include the maximum MSS which should be used, keepalive, response and time-wait timeouts, etc.

As indicated above, a TCP spoofing parameter profile 3404 can also indicate whether or not TCP spoofing is enabled. However, since all of the rest of the TCP spoofing parameter profile parameters may be meaningless when TCP spoofing is disabled, only one TCP spoofing parameter profile 3404 with TCP spoofing disabled is needed. Rather than require that such a profile be created, an "unspoofed" profile can always exist for selection by a selective TCP spoofing rule. This approach can eliminate the need for an explicit TCP spoofing enabled or disabled parameter in the TCP spoofing parameter profile. TCP spoofing can always be enabled in every TCP spoofing parameter profile except the "unspoofed" profile.

A TCP spoofing selection profile 3042 may include a default rule which the operator can configure to select the TCP spoofing parameter profile 3404 which should be used for any TCP connections which do not match any of the configured selective TCP spoofing rules. The default value may select the "unspoofed" TCP spoofing parameter profile if TCP connections which do not match any of the selective TCP spoofing rules should not be spoofed.

Figure 34:
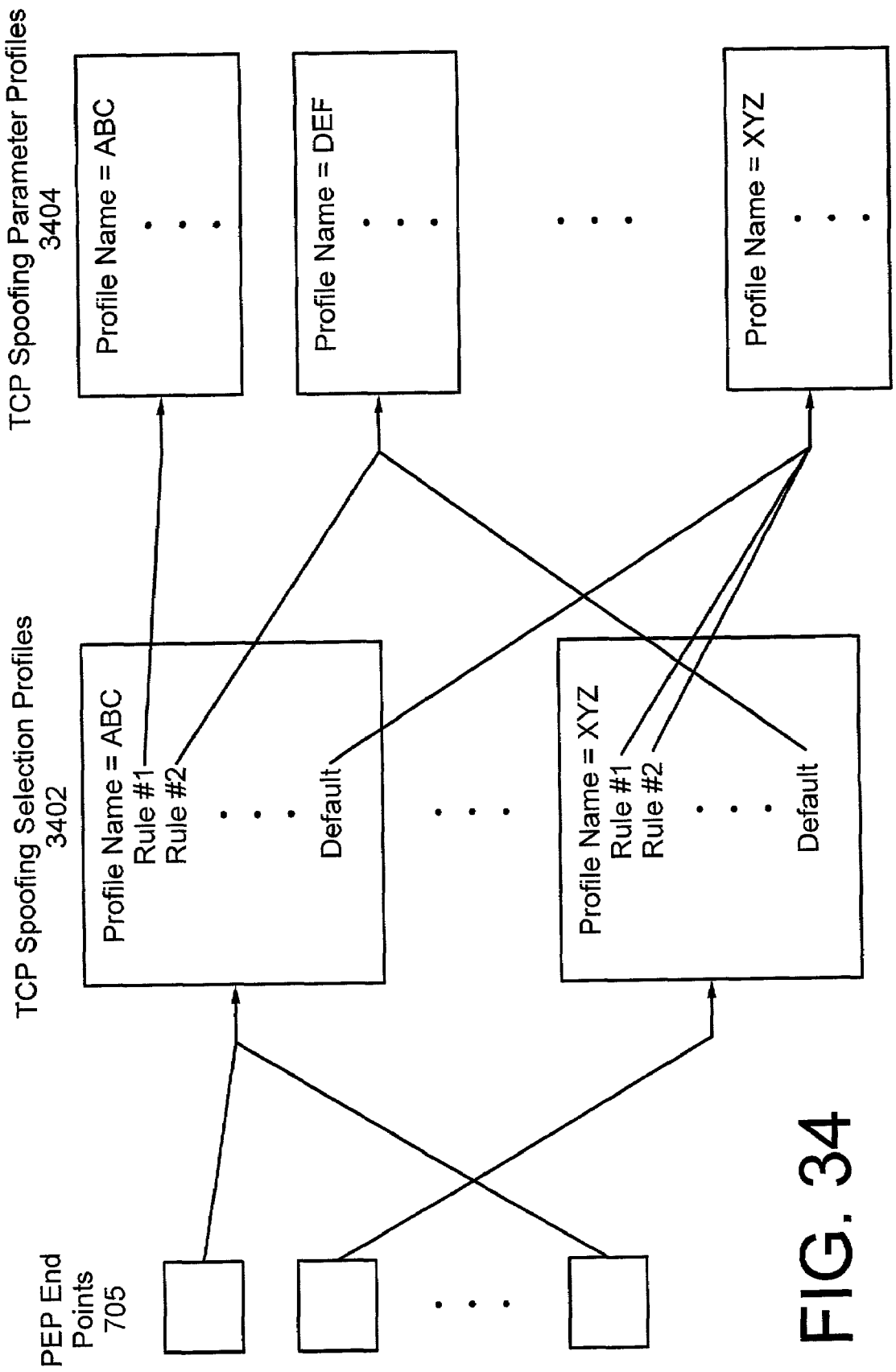
FIG. 34 is a diagram of the relationship between PEP End points, TCP spoofing selection profiles, and TCP spoofing parameter profiles, according to an embodiment of the present invention.
Figure 35:
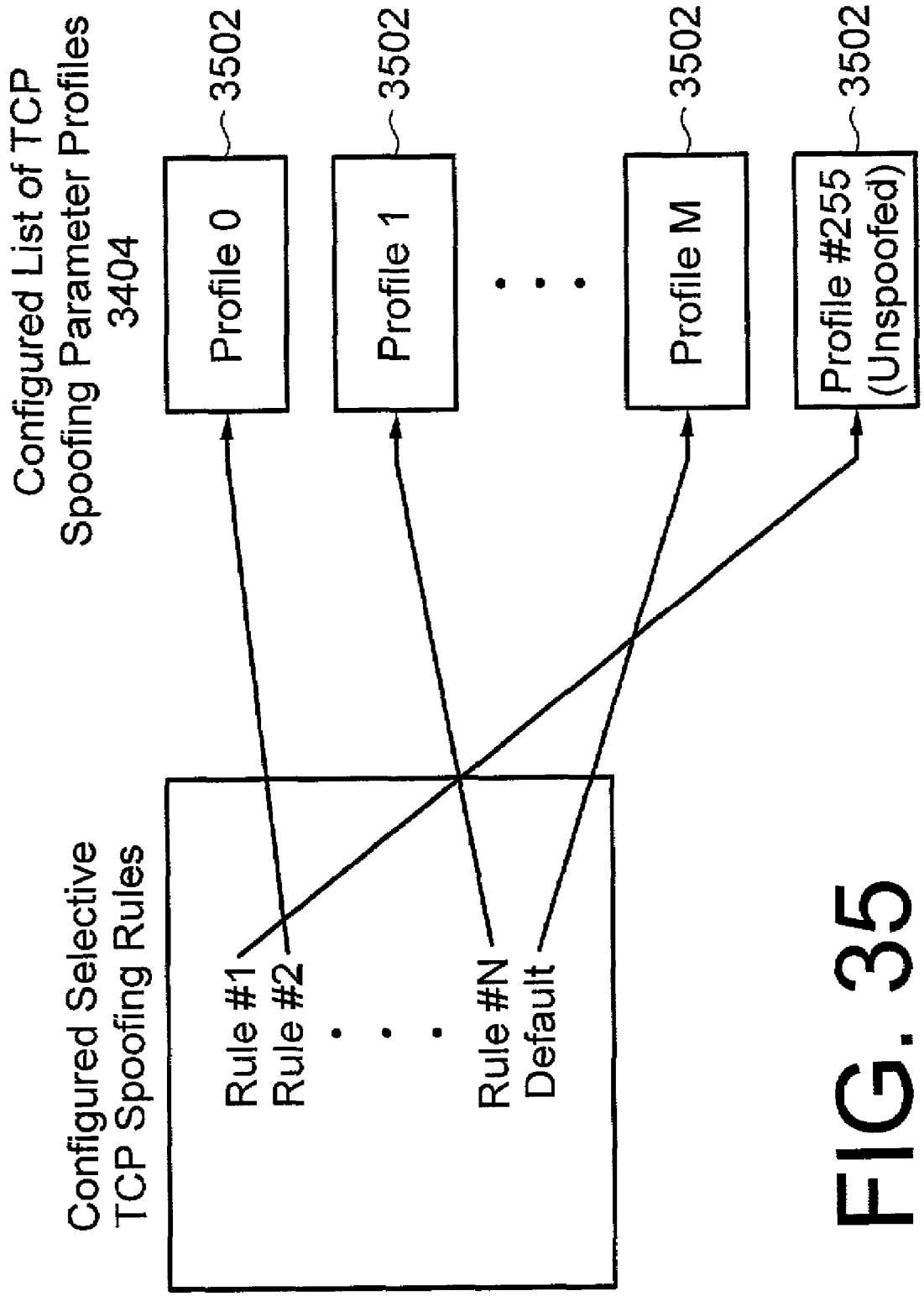
FIG. 35 is a diagram of selective TCP spoofing rules to TCP spoofing parameter profile mapping, according to an embodiment of the present invention.

FIG. 34 illustrates an exemplary relationship between PEP End Points 905, TCP spoofing selection profiles 3402 and TCP spoofing parameter profiles 3402. TCP spoofing parameter profiles 3402 can be referenced by name by the operator when they are configured but the names can be converted into index numbers for use by TSK 280. An index number of 255 may be used to indicate the "unspoofed" TCP spoofing parameter profile 3502. This is illustrated in exemplary FIG. 35.

When TSK 280 spoofs the three way handshake by responding to a TCP <SYN> segment 401 without waiting for a response to be received from the distant host, it can send an operator configured maximum segment size to the host in an MSS option in the TCP <SYN,ACK> segment 403. Later, after its TSK peer completes its local three-way handshake, TSK 280 can receive the maximum segment size value sent by the distant host to the TSK peer. If the distant host indicates an MSS smaller than the MSS sent to the local host by TSK (for example, TSK sent an MSS option of 1460 while the distant host sent an MSS option of 536), a maximum segment size mismatch exists.

A maximum segment size mismatch can lead to TSK 280 receiving a TCP data segment from the backbone connection which is larger than the maximum segment size advertised by its local host. TSK 280 could just forward it anyway. And, in many cases, this would work because the host's buffer size is actually equal to the MTU. However, in some cases, the larger segment size would overflow the host's buffer causing the segment to be discarded. Each retransmission of the segment would be similarly discarded.

To avoid this problem, TSK 280 includes a capability to resize data segments it receives from the its TSK peer before sending them to the local host. This capability is described below. However, resizing segments requires CPU and may add complexity to the TSK 280. TSK 280 can depend upon operator configuration to prevent the problem. The operator configures the MSS to be used for a connection in a TCP spoofing parameter profile and uses selection rules to map the connection to the profile.

While knowing which hosts to map to which MSS values seems somewhat labor intensive (appearing to require the operator to determine this value for all of the hosts of the network), in practice, it is not that difficult. First, most TCP implementations (with the number increasing over time) support an MSS which is based on the MTU of the paths being used by the connection with the default value being the MSS (1460 bytes) supported by the Ethernet MTU (1500 bytes). In addition, when a host initiates a TCP connection, it sends an MSS option in its TCP <SYN> segment 401. Thus, TSK 280 learns the MSS of the initiating host when it attempts to bring up a connection. It is only the responding host's MSS which needs to be "guessed" by TSK 280 in order to spoof the TCP three-way handshake. A TSK peer which receives a CR message 403 can use the MSS value in the CR message to initiate the connection on its side of the link. In general, since most VSAT-based intranet TCP connections are initiated from client site applications (e.g. web browsers), this means that it is only the server side hosts for which the operator needs to know the MSS values supported. And, since the server site hosts tend to be servers, the server sites hosts are likely to support the maximum (for Ethernet) MSS value of 1460 bytes.

However, even though configuring the MSS should not be difficult, spoofing in the present invention includes an additional mechanism which can be used in cases where the operator cannot be sure of the MSS. This mechanism is the ability to disable three-way handshake spoofing, allowing the MSS of a connection to be determined end to end. The operator can disable three-way handshake spoofing via a parameter in the TCP spoofing parameter profile 3404. By default, three-way handshake spoofing will be enabled to gain the performance benefits it provides.

As indicated above, spoofing the three-way handshake can potentially lead to MSS mismatch if the PEP End Point 705 advertises a larger MSS in the TCP <SYN,ACK> segment 405 it sends than the distant host ultimately advertises in its <SYN,ACK> segment 405.

To dynamically recover from an MSS mismatch, if TSK 280 receives a TCP data segment from the backbone connection which is larger than the maximum segment size that it can send to the local host on the connection, TSK 280 could break the segment into several smaller segments before forwarding them to the local host. This could be done at the TCP layer, not at the IP layer, i.e., this is not done via IP packet fragmentation.

Figure 36:
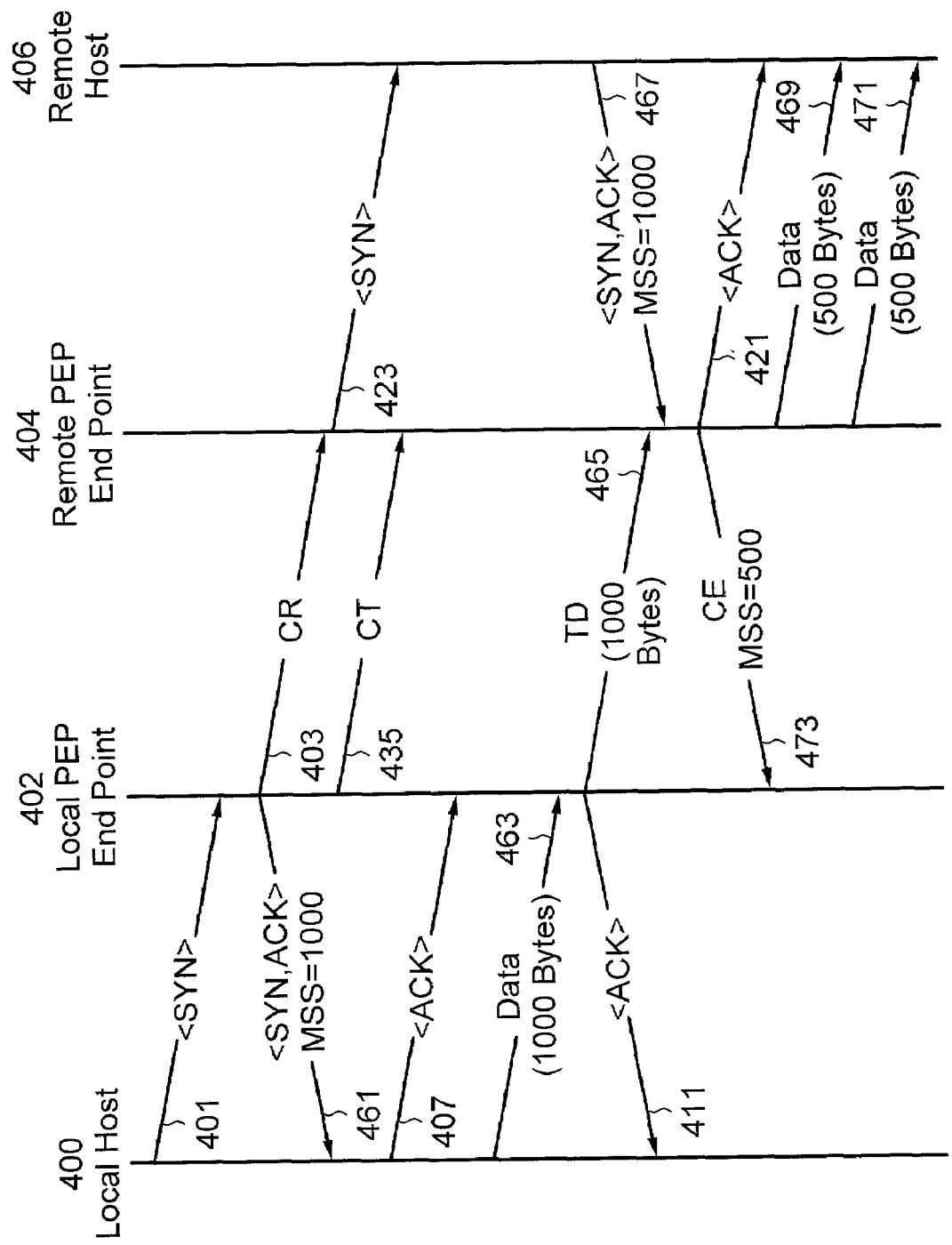
FIG. 36 is a diagram illustrating dividing a segment into two or more smaller segments, according to an embodiment of the present invention.

Breaking a large segment into two or more smaller segments is illustrated in FIG. 36. With three-way handshake spoofing enabled, TSK 280 will respond to a TCP <SYN> segment 401 with a TCP <SYN,ACK> segment 461 which indicates an MSS value equal to the value configured in the selected TCP spoofing parameter profile 3404. If the remote host 406 responds to the TCP <SYN> segment 415 sent by the remote PEP End Point 404 with a TCP <SYN,ACK> segment 467 which has an MSS less than that sent by the local PEP End Point 402 to the local host 400, the local host 400 may send a TCP data segment 463 which is larger than the MSS sent by the remote host 406. When this occurs, the TSK 280 in the remote PEP End Point 404 must break the large TD message 465 into multiple smaller TCP data segments 469, 471 before forwarding them to the remote host 406.

Breaking larger segments into small enough segments guarantees that the segments will be accepted by the local host. But, breaking larger segments into smaller segments does have a CPU penalty associated with it for the PEP End Point 705. The extent of the CPU penalty for a particular PEP End Point platform can be dependent on the buffering strategy used with the platform. For example, if a chain of small physical buffers is used, breaking a large segment into smaller segments mainly involves breaking the buffer chain in appropriate places and can be done with no data copies. However if a single large physical buffer is used, breaking a larger segment into smaller segments would involve data copies.

While maximum segment size mismatches incur a CPU penalty, sending larger segments over the backbone connection improves bandwidth efficiency by reducing header overhead. In some cases, it may be more desirable to use bandwidth efficiently at the expense of the use of CPU in the PEP End Points 705. To this end, if segment resizing is implemented, the operator may intentionally configure the MSS to be used for a TCP connection to be larger than the MSS actually supported by the host.

If an MSS mismatch occurs, if configured to do so by the operator, the TCP Spoofing Kernel 280 could attempt to get the sending end host to reduce the size of the MSS it is using to send data across the wide area network. A mechanism which could be used to do this is based on the Path MTU (PMTU) discovery algorithm described in RFC 1191, the entire contents of which are incorporated by reference. PMTU discovery works by setting the "Don't Fragment" bit in the IP header of all of the IP packets being sent, including TCP data segments. Then, if a packet is received by a router which is too big for the MTU of the next hop of the path, the router sends an ICMP "Datagram Too Big" message. The ICMP "Datagram Too Big" message also includes an indication of the next hop MTU. This allows the host to break the original TCP data segments into smaller segments and resend them.

To address a maximum segment size mismatch, TSK 280 could attempt to invoke the PMTU discovery behavior of the end host. If TSK 280 receives a CE message 419 from its TSK peer with an MSS less than the MSS it has already locally sent to the end host, TSK 280 would generate an ICMP "Datagram Too Big" message to the host indicating an MTU value which corresponds to the smaller MSS. Hopefully, the host would react by starting to send smaller TCP data segments. If it does not, the TSK 280 peer could be forced to continuously break larger segments into smaller segments. But, this is no different than if no ICMP message was sent. Note that even when the ICMP "Datagram. Too Big" message does work, the end host may have already sent some large TCP data segments which would have been locally acknowledged by TSK 280. These large data segments would need to be broken into smaller segments before being transmitted to the destination host. But, the CPU to do this would only need to be expended for the first few data segments.

Figure 37:
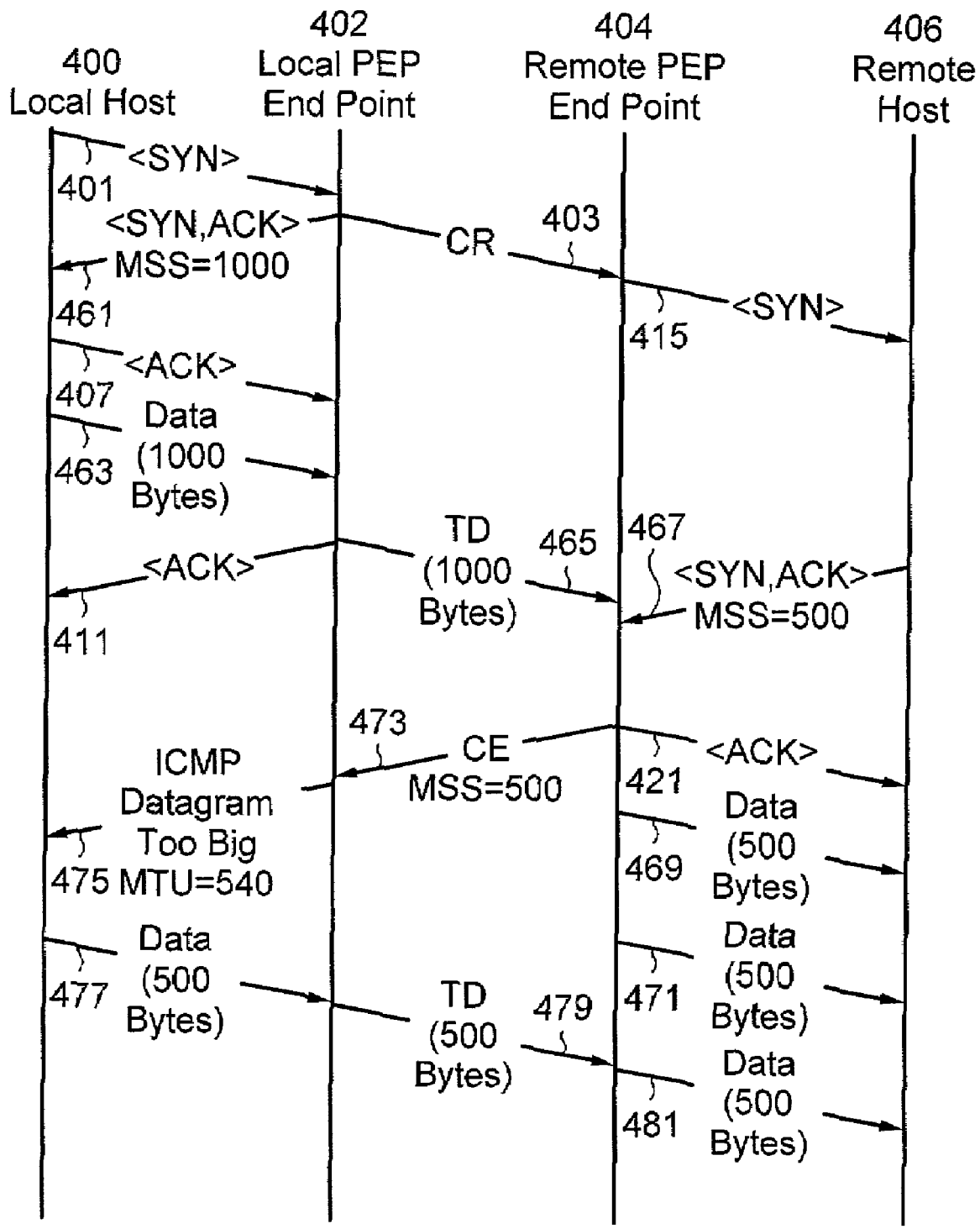
FIG. 37 is a diagram illustrating reduction of the maximum segment size, according to an embodiment of the present invention.

Reducing the maximum segment size being used by the host is illustrated in FIG. 37. When the local PEP End Point 402 receives the CE message 473 which indicates that a smaller MSS is being used by the remote host 406 than was indicated to the local host 400, TSK 280 can send an ICMP "Datagram Too Big" message 475 indicating that the MTU of the network is only equal the MSS sent by the remote host 406 plus the size the IP and TCP headers (40 bytes). The local host 400 can then start sending TCP data segments 477 which match the MSS being used by the remote host 406.

As indicated above, attempting to reduce the maximum segment size being sent by a host would be controlled by operator configuration. By default, MSS reduction would be enabled. But the operator could disable it for specific connections by means of the TCP spoofing parameter profiles selected for the connections. The operator might choose to turn off the MSS reduction ICMP messages either because of some unforeseen side effect of their use with particular hosts or because of a decision to expend the CPU in the PEP End Points 705 for breaking large segments into smaller segments in order to gain the wide area bandwidth efficiency associated with using larger packets over the WAN.

If, for some reason, a host ignores the MSS value sent to it by TSK and sends a segment larger than the configured MSS to TSK, TSK can discard the segment. This may eventually cause the TCP connection to fail, requiring operator intervention to correct. But, not discarding such segments could cause the backbone connection to fail and a backbone connection failure will affect many TCP connections instead of just one.

When TSK 280 needs to determine a window size to advertise in a TCP segment, it starts by calling the platform environment 210 to get the current LAN to WAN buffer space availability for the backbone connection associated with the spoofed TCP connection. TSK 280 then divides this number by the number of TCP connections which are currently using the backbone connection. (TSK keeps track of the number of TCP connections using a backbone connection in the backbone connection's TCB, incrementing the count whenever a CCB is allocated and decrementing the count whenever a CCB is deallocated.) TSK 280 then converts this value from buffers into bytes by multiplying the number of buffers by the MSS being used by the local host to send TCP segments TSK 280. This value represents the potential window size which can be advertised. However, TSK 280 must make two additional checks before using this value. First, the potential value is compared to the window size limit. If the potential value is larger than the window size limit, the window size limit is advertised instead. If the potential value is smaller than the window size limit, TSK 280 then checks to see if advertising the potential value would shrink the window to a value smaller than previously advertised (i.e., would move the right edge of the rotating window to the left). A TCP receiver is not supposed to shrink its window. Therefore, if the potential value would shrink the window, TSK 280 instead advertises the smallest possible window which does not shrink the previously advertised window (i.e., the value which represents keeping the right edge of the window in the same place).

Figure 38:
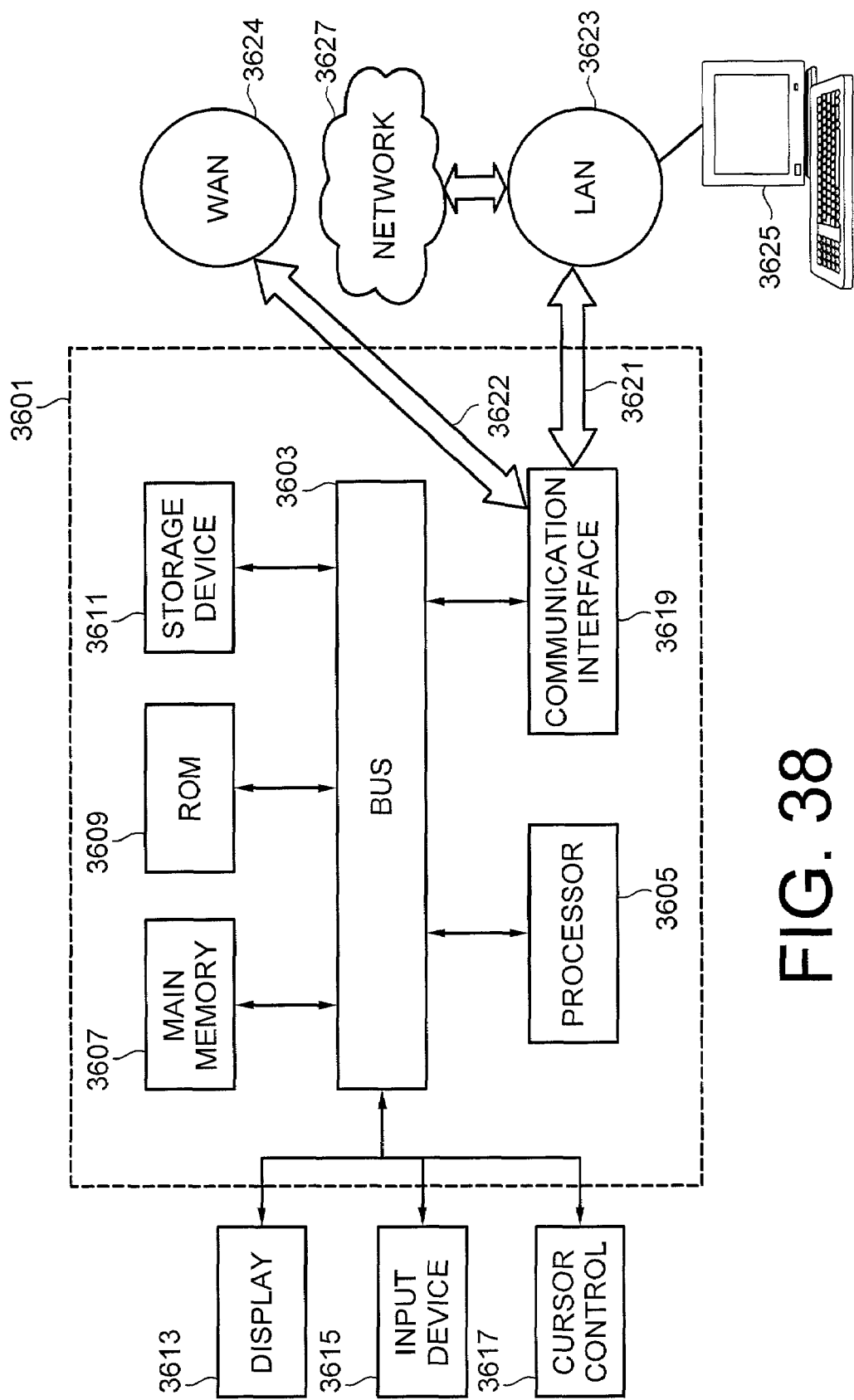
FIG. 38 is a diagram of a computer system that can perform PEP functions, in accordance with an embodiment of the invention.
Figure 39:
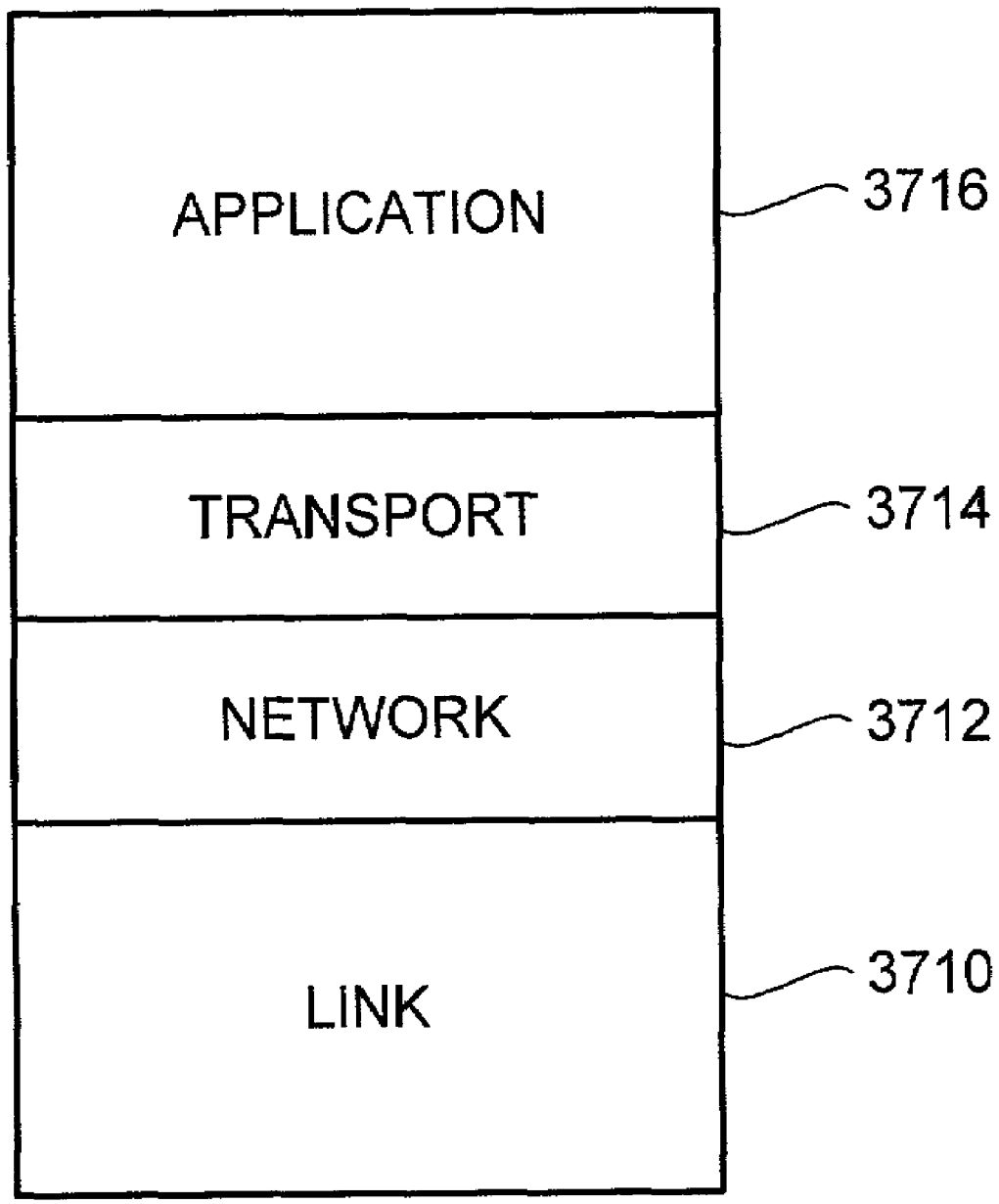
FIG. 39 is a diagram of the protocol layers of the TCP/IP protocol suite.
Figure 40:
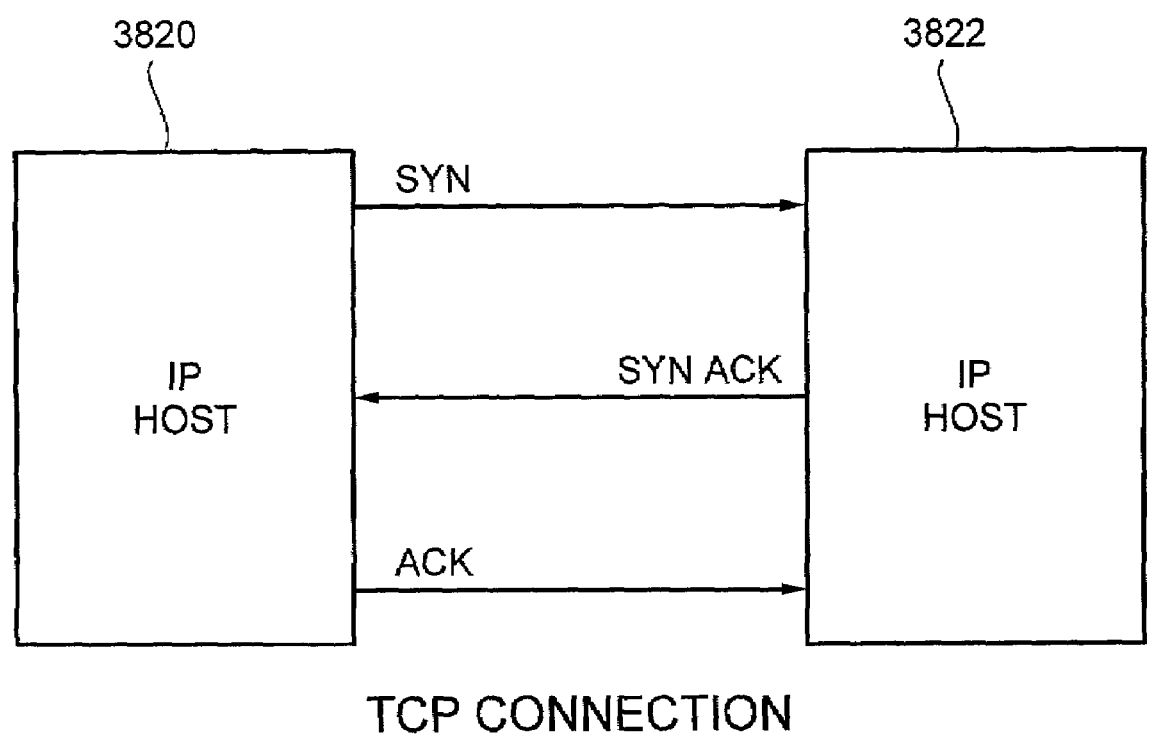
FIG. 40 is a diagram of a conventional TCP 3-way handshake between IP hosts.

FIG. 38 illustrates a computer system 3601 upon which an embodiment according to the present invention may be implemented. Such a computer system 3601 may be configured as a server to execute code that performs the PEP functions of the PEP end point 210 as earlier discussed. Computer system 3601 includes a bus 3603 or other communication mechanism for communicating information, and a processor 3605 coupled with bus 3603 for processing the information. Computer system 3601 also includes a main memory 3607, such as a random access memory (RAM) or other dynamic storage device, coupled to bus 3603 for storing information and instructions to be executed by processor 3605. In addition, main memory 3607 may be used for storing temporary variables or other intermediate information during execution of instructions to be executed by processor 3605. Main memory 3607 may also be used to share PEP control blocks and buffers used to store packets. Computer system 3601 further includes a read only memory (ROM) 3609 or other static storage device coupled to bus 3603 for storing static information and instructions for processor 3605. A storage device 3611, such as a magnetic disk or optical disk, is provided and coupled to bus 3603 for storing information and instructions.

Computer system 3601 may be coupled via bus 3603 to a display 3613, such as a cathode ray tube (CRT), for displaying information to a computer user. An input device 3615, including alphanumeric and other keys, is coupled to bus 3603 for communicating information and command selections to processor 3605. Another type of user input device is cursor control 3617, such as a mouse, a trackball, or cursor direction keys for communicating direction information and command selections to processor 3605 and for controlling cursor movement on display 3613.

Embodiments are related to the use of computer system 3601 to perform the PEP functions of the PEP end point 210. According to one embodiment, this automatic update approach is provided by computer system 3601 in response to processor 3605 executing one or more sequences of one or more instructions contained in main memory 3607. Such instructions may be read into main memory 3607 from another computer-readable medium, such as storage device 3611. Execution of the sequences of instructions contained in main memory 3607 causes processor 3605 to perform the process steps described herein. One or more processors in a multi-processing arrangement may also be employed to execute the sequences of instructions contained in main memory 3607. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 3605 for execution the PEP functions of the PEP end point 210. Such a medium may take many forms, including but not limited to, non-volatile media, volatile media, and transmission media. Non-volatile media includes, for example, optical or magnetic disks, such as storage device 3611. Volatile media includes dynamic memory, such as main memory 3607. Transmission media includes coaxial cables, copper wire and fiber optics, including the wires that comprise bus 3603. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 3605 for execution. For example, the instructions may initially be carried on a magnetic disk of a remote computer. The remote computer can load the instructions relating to execution of the PEP functions of the PEP end point 210 into its dynamic memory and send the instructions over a telephone line using a modem. A modem local to computer system 3601 can receive the data on the telephone line and use an infrared transmitter to convert the data to an infrared signal. An infrared detector coupled to bus 3603 can receive the data carried in the infrared signal and place the data on bus 3603. Bus 3603 carries the data to main memory 3607, from which processor 3605 retrieves and executes the instructions. The instructions received by main memory 3607 may optionally be stored on storage device 3611 either before or after execution by processor 3605.

Computer system x01 also includes one ore more communication interfaces 3619 coupled to bus 3603. Communication interfaces 3619 provide a two-way data communication coupling to network links 3621 and 3622 which are connected to a local area network (LAN) 3623 and a wide area network 3624, respectively. A WAN 3624, according to one embodiment of the present invention, may be a satellite network. For example, communication interface 3619 may be a network interface card to attach to any packet switched LAN. As another example, communication interface 3619 may be an asymmetrical digital subscriber line (ADSL) card, an integrated services digital network (ISDN) card, a cable modem, or a modem to provide a data communication connection to a corresponding type of telephone line. Wireless links may also be implemented. In any such implementation, communication interface 3619 sends and receives electrical, electromagnetic or optical signals that carry digital data streams representing various types of information.

Network link 3621 typically provides data communication through one or more networks to other data devices. For example, network link 3621 may provide a connection through local area network 3623 to a host computer 3625 or to data equipment operated by an Internet Service Provider (ISP) 3627. ISP 3627 in turn provides data communication services through the Internet 505. In addition, LAN 3623 is linked to an intranet x29. The intranet x29, LAN x23 and Internet 505 all use electrical, electromagnetic or optical signals that carry digital data streams. The signals through the various networks and the signals on network link 3621 and through communication interface 3619, which carry the digital data to and from computer system 3601, are exemplary forms of carrier waves transporting the information.

Computer system 3601 can send messages and receive data, including program code, through the network(s), network link 3621 and communication interface 3619. In the Internet example, a server x31 might transmit a requested code for an application program through Internet 505, ISP 3627, LAN 3623 and communication interface 3619.

The received code may be executed by processor 3605 as it is received, and/or stored in storage device 3611, or other non-volatile storage for later execution. In this manner, computer system 3601 may obtain application code in the form of a carrier wave.

Computer system 3601 can transmit notifications and receive data, including program code, through the network(s), network link 3621 and communication interface 3619.

The techniques described herein provide several advantages over prior approaches to improving network performance, particularly in a packet switched network such as the Internet. A local PEP end point and a remote PEP end point communicate to optimize the exchange of data through a TCP spoofing functionality. Ease of configuration of the end points is provided through the use of profiles.

Obviously, numerous modifications and variations of the present invention are possible in light of the above teachings. It is therefore to be understood that within the scope of the appended claims, the invention may be practiced otherwise than as specifically described herein.

What is claimed is:

1. A method for routing information in a communication system that includes a platform and a spoofing apparatus configured to perform a plurality of performance enhancing functions over connections established within the communication system, the method comprising:
   receiving the information from the platform;
   receiving one or more spoofing parameters and a spoofing selection parameter for specifying a rule for applying the spoofing parameters, wherein the spoofing parameters include information for specifying whether spoofing is enabled for a selected one of the connections and priority information specifying priority treatment of the selected connection, wherein the spoofing apparatus maintains a profile that contains the spoofing selection parameter and the spoofing parameters, the profile including a maximum segment size;

compensating for maximum segment size mismatch between the selected connection and a connection to an end host by dynamically resizing, based on the profile, data segments which comprise the information before forwarding the data segments to the end host; and routing the information in accordance with the profile.

2. The method of claim 1, further comprising: determining a path that the information takes to reach its destination based on the profile.

3. The method of claim 2, further comprising: determining the path by applying spoofing rules.

4. The method of claim 3, wherein the spoofing rules are mapped to the profile.

5. The method of claim 2, wherein the path is determined based on connection control blocks.

6. The method of claim 5, wherein connection control blocks are allocated using a hash function.

7. The method of claim 5, wherein connection control blocks are allocated using a mapping table.

8. The method of claim 1, further comprising:
receiving the at least one of spoofing selection parameters and spoofing parameters as a data structure from the platform.

9. The method of claim 1, further comprising:
receiving at least one of spoofing selection parameters and spoofing parameters from the platform at start-up or when the platform receives updated spoofing selection or spoofing parameters.

10. The method of claim 1, further comprising:
applying multiple spoofing rules using boolean operators.

11. The method of claim 1, wherein the profile further includes a parameter for disabling three-way handshake spoofing.

12. A communication system comprising:
a platform configured to provide performance enhancing functions over connections established within the communication system, the platform supplying information and one or more spoofing parameters and a spoofing selection parameter for specifying a rule for applying the spoofing parameters, wherein the spoofing parameters include information for specifying whether spoofing is enabled for a selected one of the connections and priority information specifying priority treatment of the selected connection; and a spoofing apparatus communicating with the platform, the spoofing apparatus being configured to receive the information and the spoofing selection parameter and the spoofing parameters from the platform, wherein the spoofing apparatus has a profile that specifies spoofing selection parameter and the spoofing parameters, wherein the communication system is configured to route the information in accordance with the profile, the profile including a maximum segment size, wherein maximum segment size mismatch between the selected connection and a connection to an end host is compensated by dynamically resizing, based on the profile, data segments which comprise the information before forwarding the data segments to the end host.

13. The communication system of claim 12, wherein the spoofing apparatus determines a path that the information takes to reach its destination.

14. The communication system of claim 13, wherein the spoofing apparatus determines the path by applying spoofing rules.

15. The communication system of claim 14, wherein the spoofing rules are mapped to the profile.

16. The communication system of claim 13, wherein the path is determined based on connection control blocks.

17. The communication system of claim 16, wherein connection control blocks are allocated using a hash function.

18. The communication system of claim 16, wherein connection control blocks are allocated using a mapping table.

19. The communication system of claim 12, wherein the spoofing apparatus receives the at least one of spoofing selection parameters and spoofing parameters as a data structure from the platform.

20. The communication system of claim 12, wherein the spoofing apparatus receives at least one of spoofing selection parameters and spoofing parameters from the platform at start-up or when the platform receives updated spoofing selection or spoofing parameters.

21. The communication system of claim 12, wherein the spoofing apparatus can apply multiple spoofing rules, combined using boolean operators.

22. The communication system of claim 12, wherein the profile further includes a parameter for disabling three-way handshake spoofing.

23. A spoofing apparatus for routing information in a communication system that includes a platform configured to perform a plurality of performance enhancing functions over connections established within the communication system, the apparatus comprising:

means for receiving the information and one or more spoofing parameters and a spoofing selection parameter for specifying a rule for applying the spoofing parameters, wherein the spoofing parameters include information for specifying whether spoofing is enabled for a selected one of the connections and priority information specifying priority treatment of the selected connection, means for maintaining a profile containing the spoofing selection parameter and the spoofing parameters, the profile including a maximum segment size;

means for compensating for maximum segment size mismatch between the selected connection and a connection to an end host by dynamically resizing, based on the profile, data segments which comprise the information before forwarding the data segments to the end host; and means for routing the information in accordance with the profile.

24. The spoofing apparatus of claim 23, wherein the spoofing apparatus determines a path that the information takes to reach its destination.

25. The spoofing apparatus of claim 24, wherein the spoofing apparatus determines the path by applying spoofing rules.

26. The spoofing apparatus of claim 25, wherein the spoofing rules are mapped to the profile.

27. The spoofing apparatus of claim 24, wherein the path is determined based on connection control blocks.

28. The spoofing apparatus of claim 27, wherein connection control blocks are allocated using a hash function.

29. The spoofing apparatus of claim 27, wherein connection control blocks are allocated using a mapping table.

30. The spoofing apparatus of claim 23, wherein the spoofing apparatus receives the at least one of spoofing selection parameters and spoofing parameters as a data structure from the platform.

31. The spoofing apparatus of claim 23, wherein the spoofing apparatus receives at least one of spoofing selection parameters and spoofing parameters from the platform at start-up or when the platform receives updated spoofing selection or spoofing parameters.

32. The spoofing apparatus of claim 23, wherein the spoofing apparatus can apply multiple spoofing rules, combined using boolean operators.

33. The spoofing apparatus of claim 23, wherein the profile further includings a parameter for disabling three-way handshake spoofing.

34. A computer-readable storage medium carrying one or more sequences of one or more instructions for routing information in a communication system that comprises a platform and a spoofing apparatus configured to perform a plurality of performance enhancing functions, the one or more sequences of one or more instructions comprising instructions which, when executed by one or more processors, cause the one or more processors to
   receiving the information from the platform and one or more spoofing parameters and a spoofing selection parameter for specifying a rule for applying the spoofing parameters, wherein the spoofing parameters include information for specifying whether spoofing is enabled for a selected one of the connections and priority information specifying priority treatment of the selected connection, wherein the spoofing apparatus maintains a profile that contains the spoofing selection parameter and the spoofing parameters; and to route the information in accordance with the profile, the profile including a maximum segment size; and
   compensate for maximum segment size mismatch between the selected connection and a connection to an end host by dynamically resizing, based on the profile, data segments which comprise the information before forwarding the data segments to the end host.

35. The computer-readable storage medium of claim 34, further comprising: determining a path that the information takes to reach its destination based on the profile.

36. The computer-readable storage medium of claim 35, further comprising: determining the path by applying spoofing rules.

37. The computer-readable storage medium of claim 36, wherein the spoofing rules are mapped to the profile.

38. The computer-readable storage medium of claim 35, wherein the path is determined based on connection control blocks.

39. The computer-readable storage medium of claim 38, wherein connection control blocks are allocated using a hash function.

40. The computer-readable storage medium of claim 38, wherein connection control blocks are allocated using a mapping table.

41. The computer-readable storage medium of claim 34, further comprising: receiving the at least one of spoofing selection parameters and spoofing parameters as a data structure from the platform.

42. The computer-readable storage medium of claim 34, further comprising: receiving at least one of spoofing selection parameters and spoofing parameters from the platform at start-up or when the platform receives updated spoofing selection or spoofing parameters.

43. The computer-readable storage medium of claim 34, further comprising: applying multiple spoofing rules using boolean operators.

44. The computer-readable storage medium of claim 34, wherein the profile further includes a parameter for disabling three-way handshake spoofing.

* * * * *